(12) United States Patent
Kim et al.

(10) Patent No.: US 10,578,349 B2
(45) Date of Patent: Mar. 3, 2020

(54) REFRIGERATOR AND CONTROL METHOD FOR REFRIGERATOR AND METHOD FOR OPENING A REFRIGERATOR DOOR

(71) Applicant: LG ELECTRONICS INC., Seoul (KR)

(72) Inventors: Jinsung Kim, Seoul (KR); Hongsik Kwon, Seoul (KR); Minsub Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 15/532,766

(22) PCT Filed: Apr. 27, 2016

(86) PCT No.: PCT/KR2016/004426
§ 371 (c)(1),
(2) Date: Jun. 2, 2017

(87) PCT Pub. No.: WO2016/175563
PCT Pub. Date: Nov. 3, 2016

(65) Prior Publication Data
US 2019/0086141 A1    Mar. 21, 2019

(30) Foreign Application Priority Data

Jan. 5, 2016   (KR) .................. 10-2016-0001259

(51) Int. Cl.
*F25D 23/02*    (2006.01)
*F25D 27/00*    (2006.01)
(Continued)

(52) U.S. Cl.
CPC ............. *F25D 23/028* (2013.01); *B21D 5/00* (2013.01); *F25D 23/02* (2013.01); *F25D 23/025* (2013.01);
(Continued)

(58) Field of Classification Search
CPC ...... F25D 23/02; F25D 23/028; F25D 27/005; F25D 2323/02; F25D 2327/00; F25D 2327/001; F25D 2700/04
See application file for complete search history.

(56) References Cited

U.S. PATENT DOCUMENTS

2007/0035521 A1    2/2007  Jui et al.
2007/0132552 A1*   6/2007  Kurpinski ........... B60R 25/2036
                                                        340/5.72
(Continued)

FOREIGN PATENT DOCUMENTS

CN    201419904    3/2010
CN    201575653    9/2010
(Continued)

OTHER PUBLICATIONS

KR 2014-0082961 (English Translation) (Year: 2014).*
(Continued)

*Primary Examiner* — Jonathan Bradford
(74) *Attorney, Agent, or Firm* — Fish & Richardson P.C.

(57) ABSTRACT

Provided is a refrigerator and control method for refrigerator and method for opening a refrigerator door. While a user is holding an object in both hands, a door may be automatically and additionally opened using another part of a body other than hands.

21 Claims, 49 Drawing Sheets

(51) Int. Cl.
*B21D 5/00* (2006.01)
*F25D 29/00* (2006.01)
(52) U.S. Cl.
CPC .......... *F25D 27/005* (2013.01); *F25D 29/005* (2013.01); *F25D 2323/021* (2013.01); *F25D 2323/023* (2013.01); *F25D 2327/001* (2013.01); *F25D 2700/02* (2013.01); *F25D 2700/04* (2013.01)

(56) References Cited

U.S. PATENT DOCUMENTS

| | | | | |
|---|---|---|---|---|
| 2011/0012744 | A1* | 1/2011 | Buss | B60J 5/101 340/686.6 |
| 2013/0099715 | A1* | 4/2013 | Fuhge | E05F 15/611 318/484 |

FOREIGN PATENT DOCUMENTS

| | | |
|---|---|---|
| CN | 102483289 | 5/2012 |
| CN | 203578467 | 5/2014 |
| DE | 9313658 U1 | 11/1993 |
| EP | 1936303 U1 | 6/2008 |
| KR | 2001074381 | 8/2001 |
| KR | 10-2006-0004552 | 1/2006 |
| KR | 20080054174 U1 | 6/2008 |
| KR | 10-2011-0040030 | 4/2011 |
| KR | 10-2013-0028839 | 3/2013 |
| KR | 2013034582 | 4/2013 |
| KR | 2013139021 | 12/2013 |
| KR | 10-2014-0082961 | 7/2014 |
| KR | 10-2014-0097799 | 8/2014 |
| KR | 2014102808 U1 | 8/2014 |
| WO | WO2011026817 | 3/2011 |
| WO | WO2015015355 U1 | 2/2015 |

OTHER PUBLICATIONS

Chinese Office Action in Chinese Application No. 201680002089.2, dated Oct. 23, 2018, 17 pages.
Extended European Search Report in European Application No. 16786749.8, dated Apr. 6, 2018, 8 pages.
International Search Report and Written Opinion in International Application No. PCT/KR2016/004426, dated Aug. 1, 2016, 12 pages.
Chinese Office Action in Chinese Application No. 201680002089.2, dated May 13, 2019, 18 pages (with English translation).

* cited by examiner

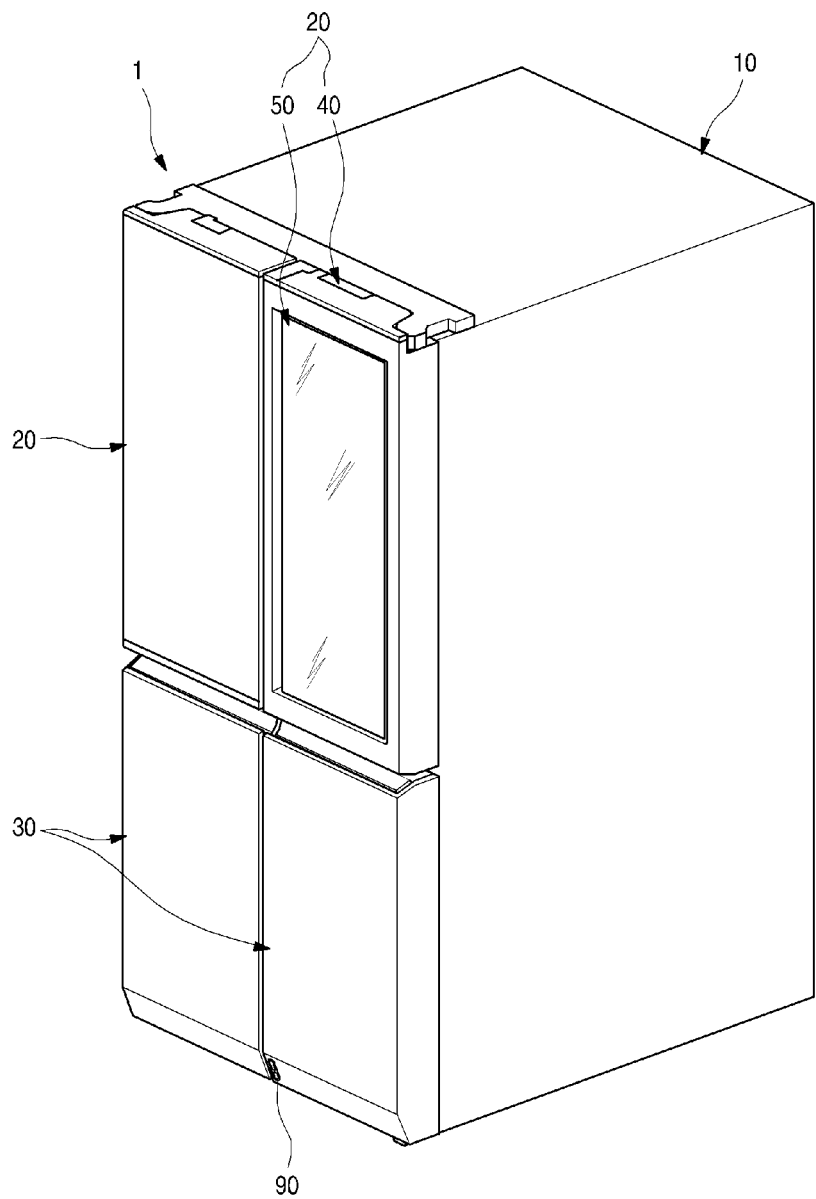
[Fig. 1]

[Fig. 2]
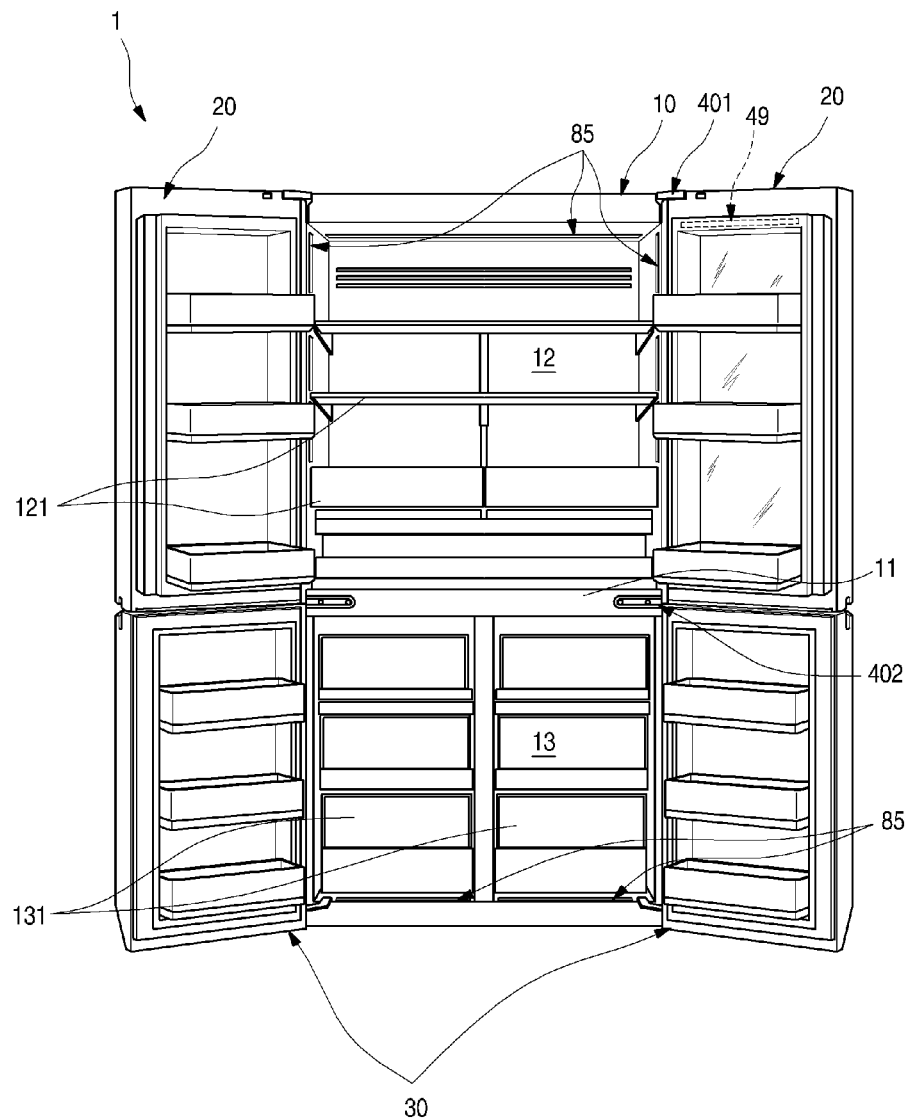

[Fig. 3]
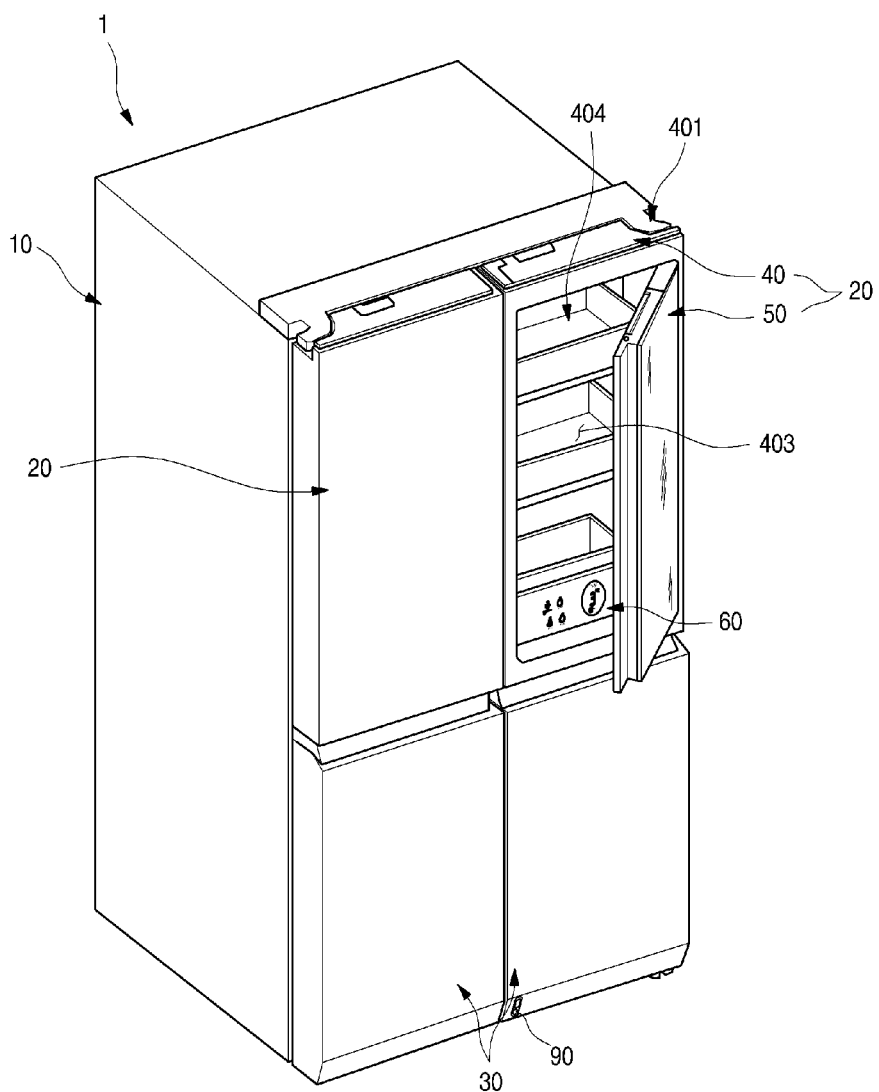

[Fig. 4]
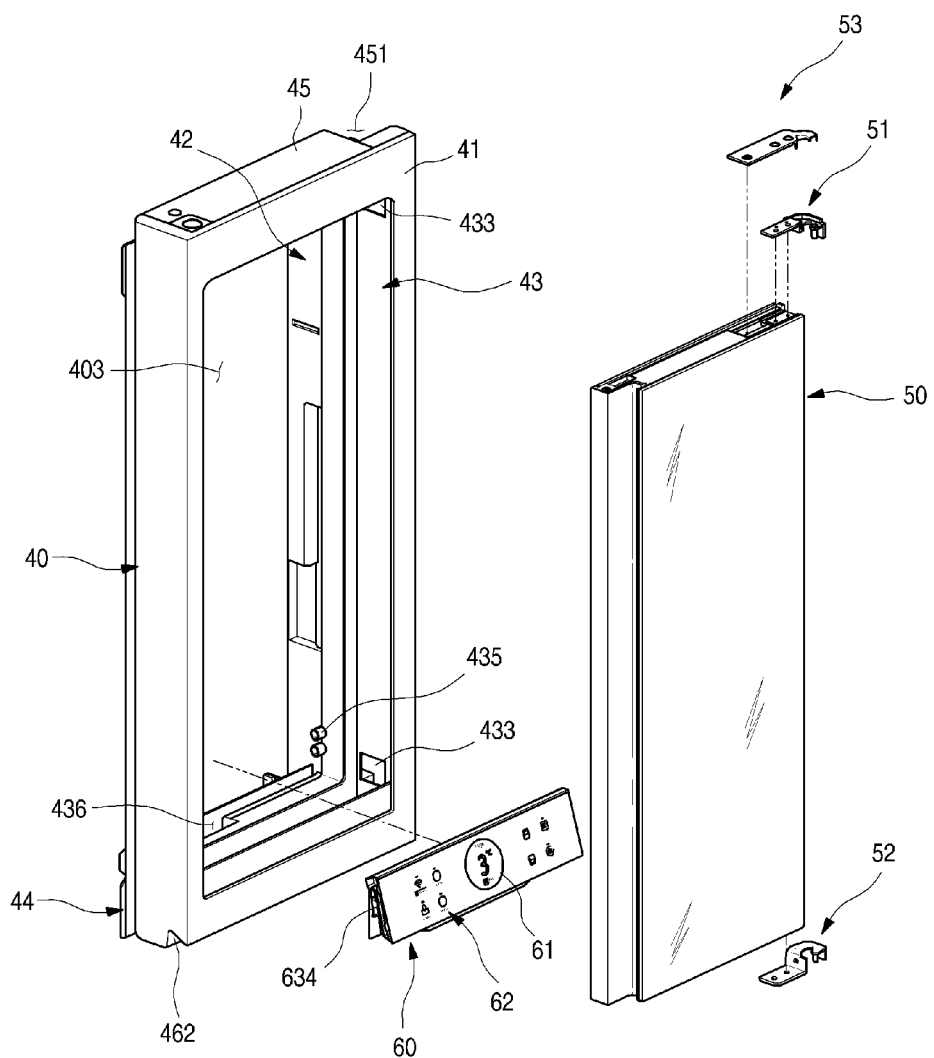

[Fig. 5]
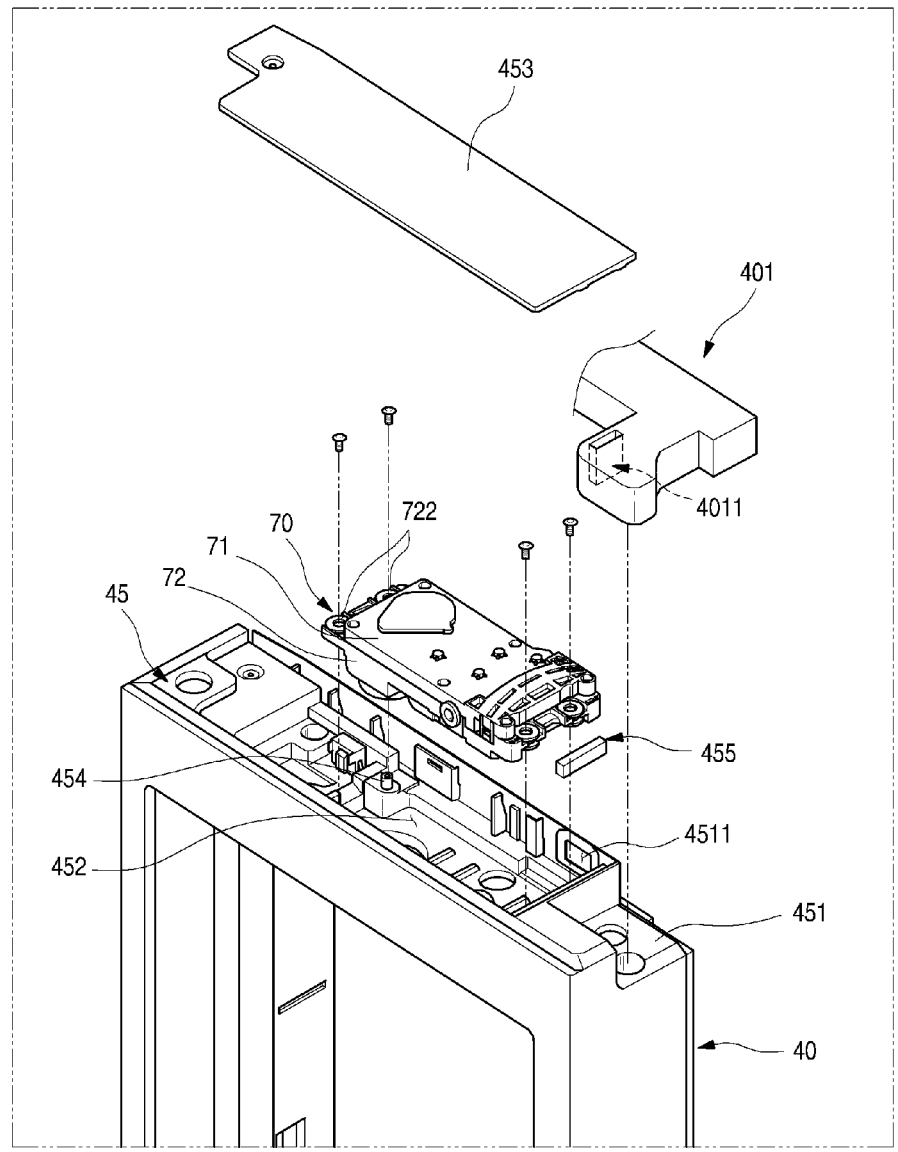

[Fig. 6]
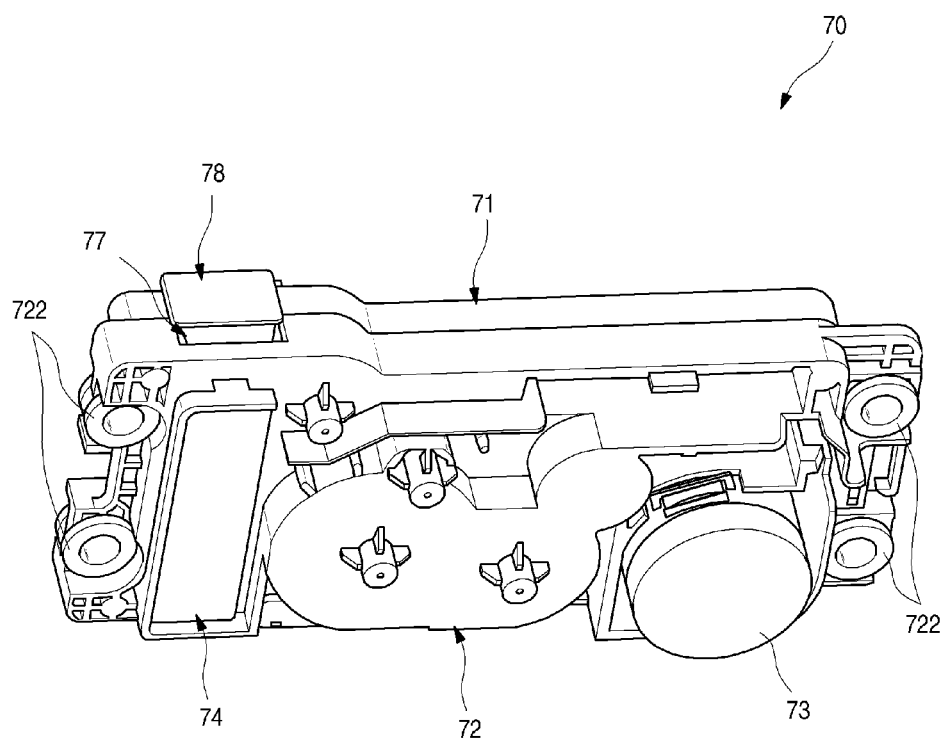

[Fig. 7]
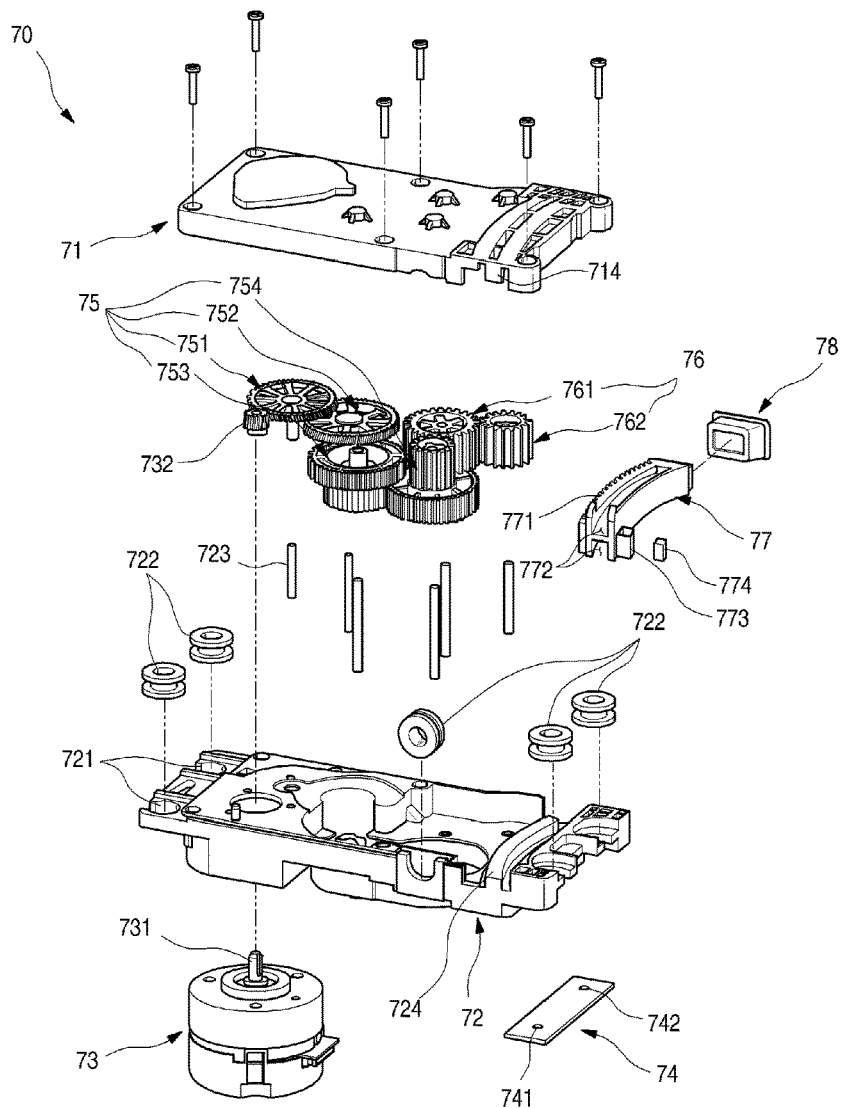
[Fig. 8]
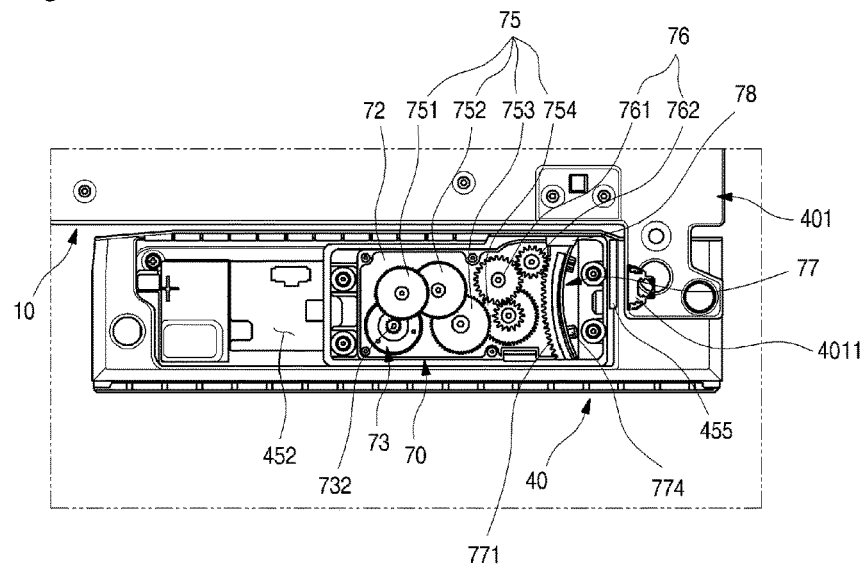

[Fig. 9]
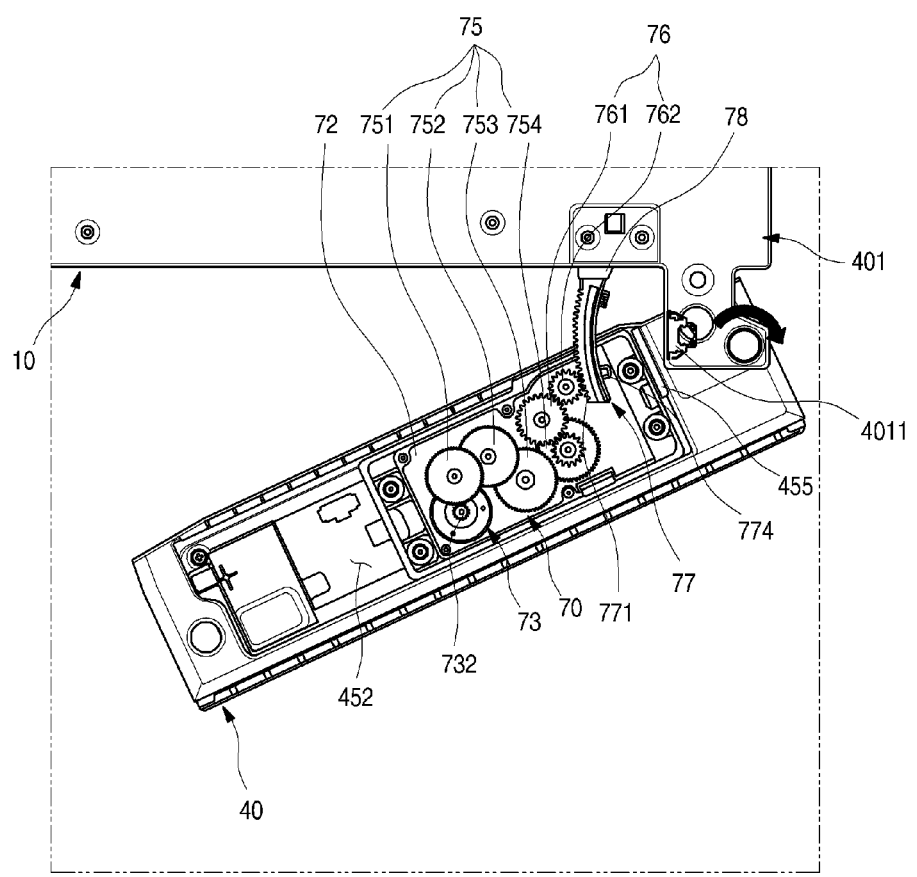

[Fig. 10]
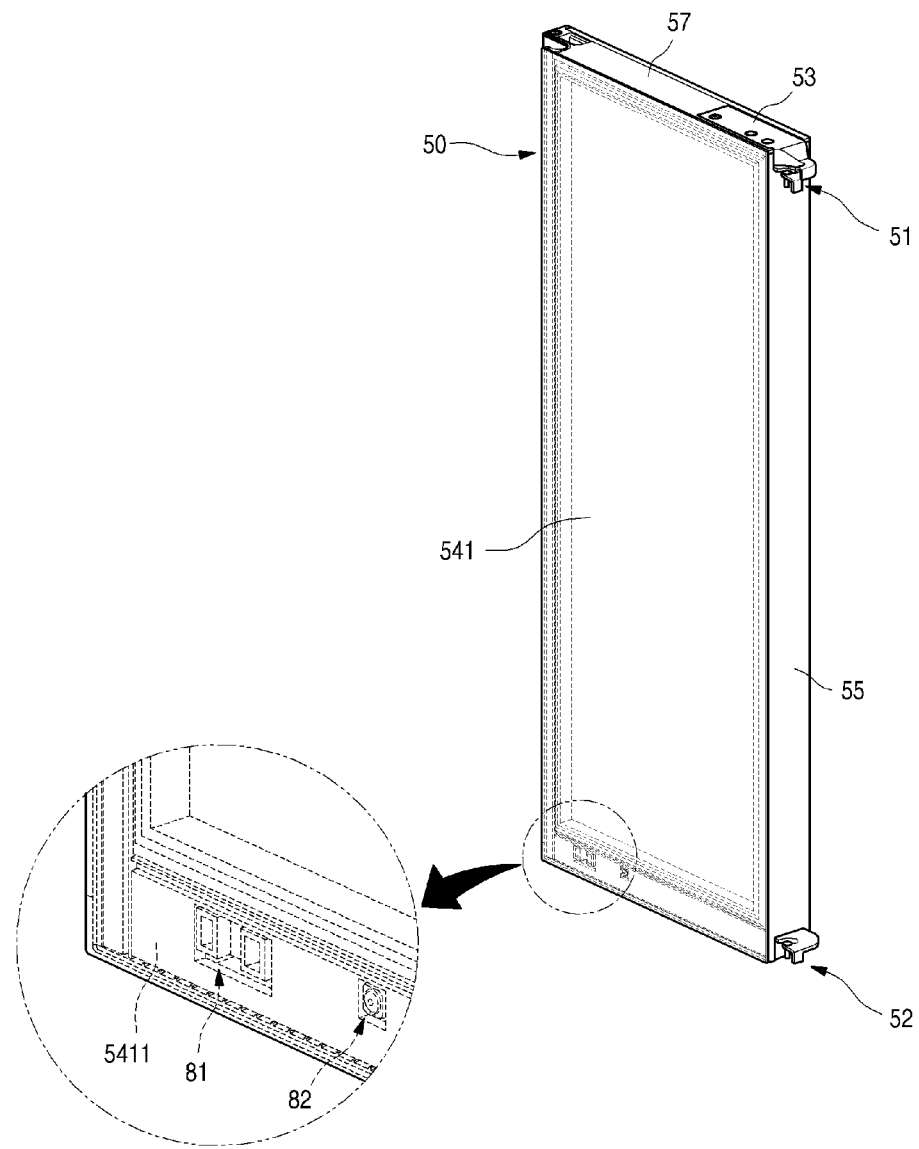
[Fig. 11]
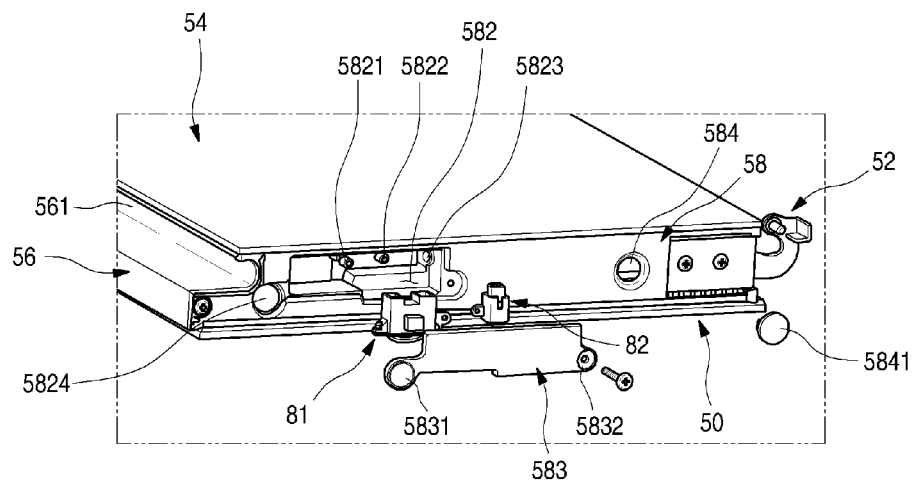

[Fig. 12]
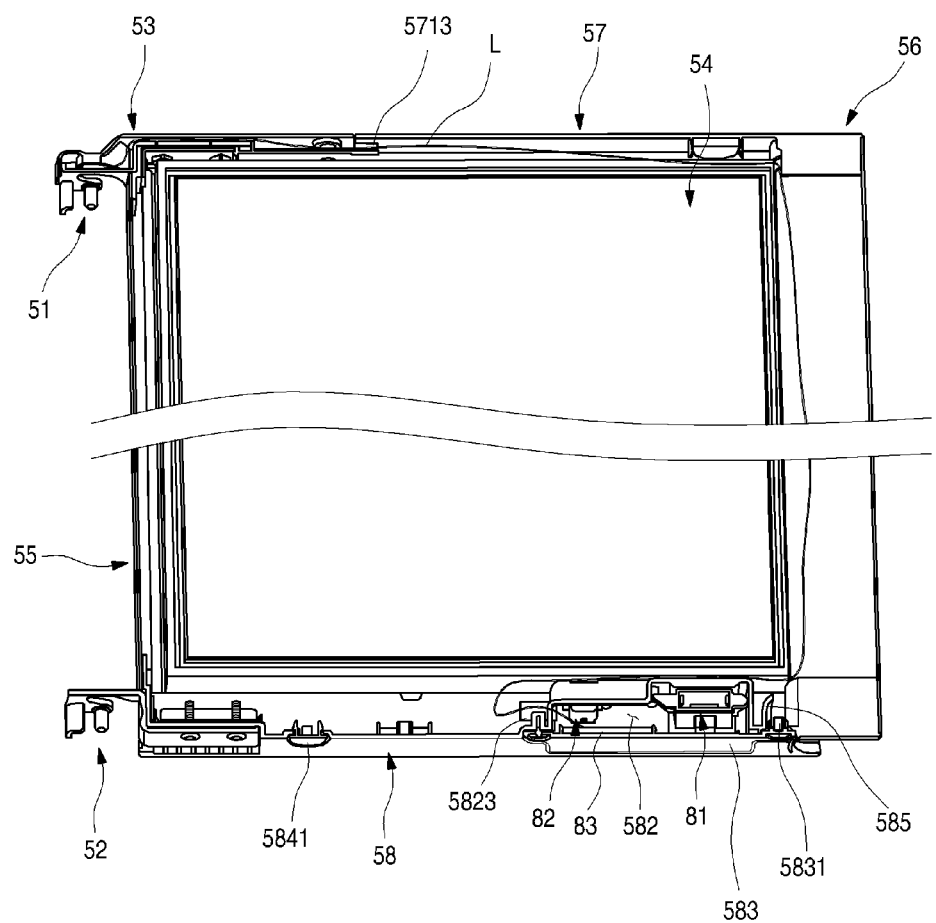

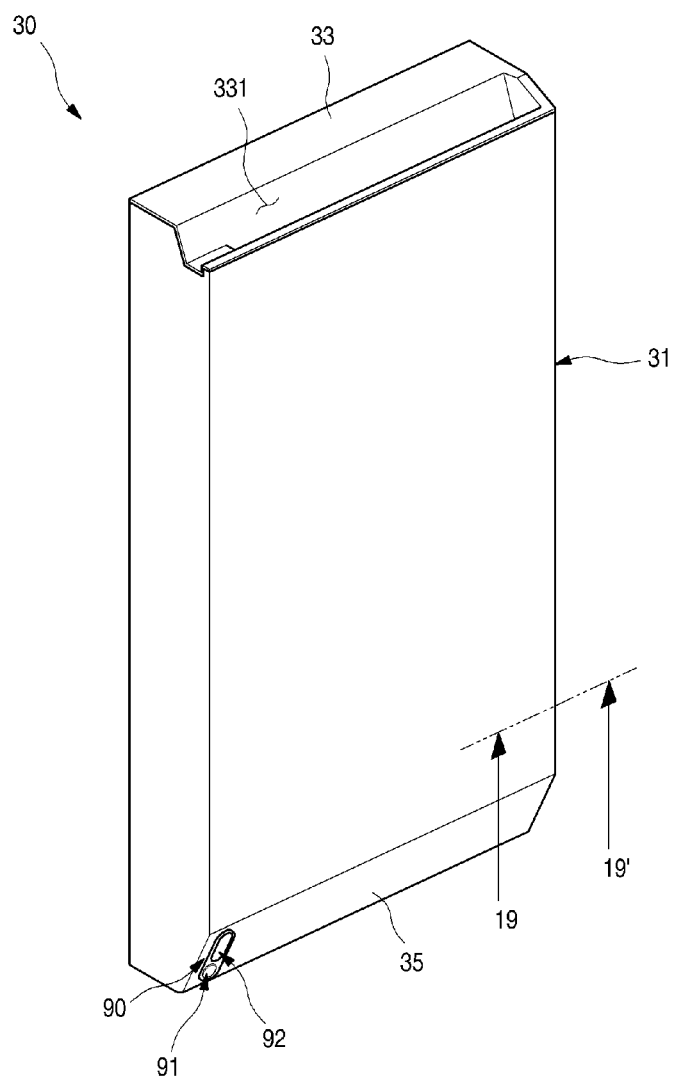
[Fig. 13]

[Fig. 14]
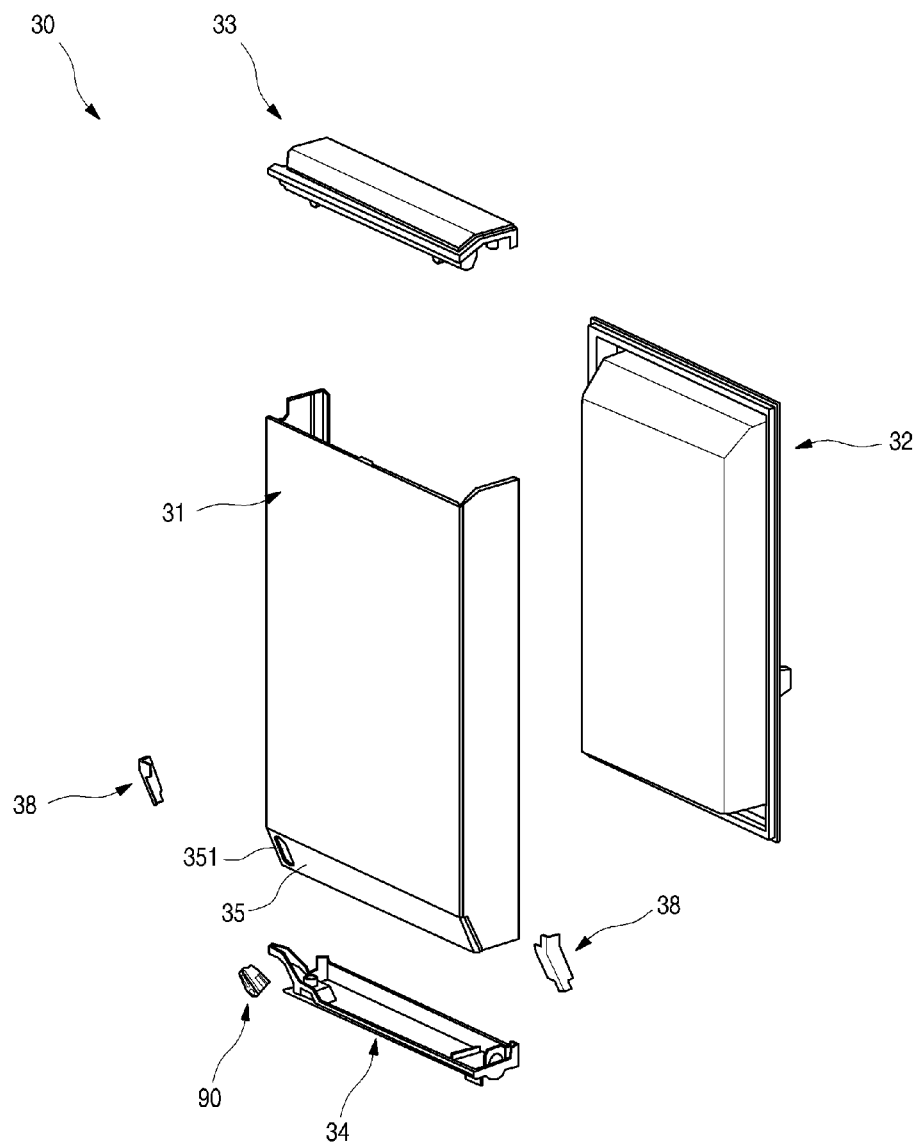

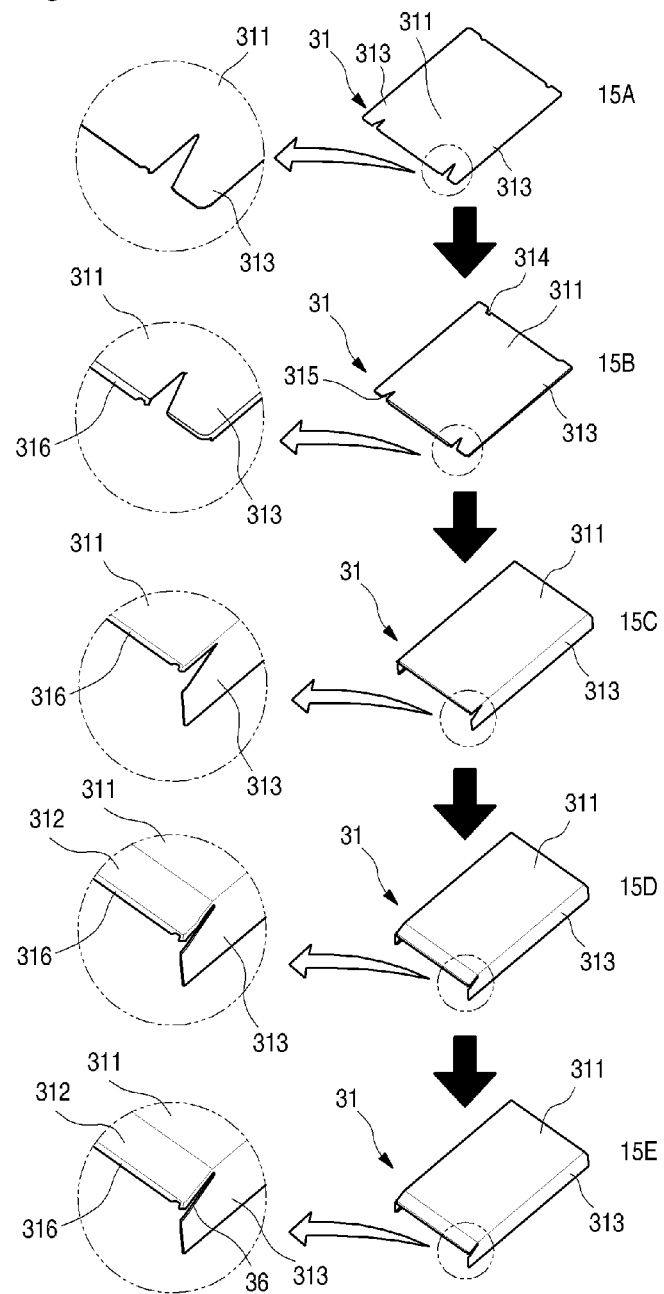
[Fig. 15]

[Fig. 16]
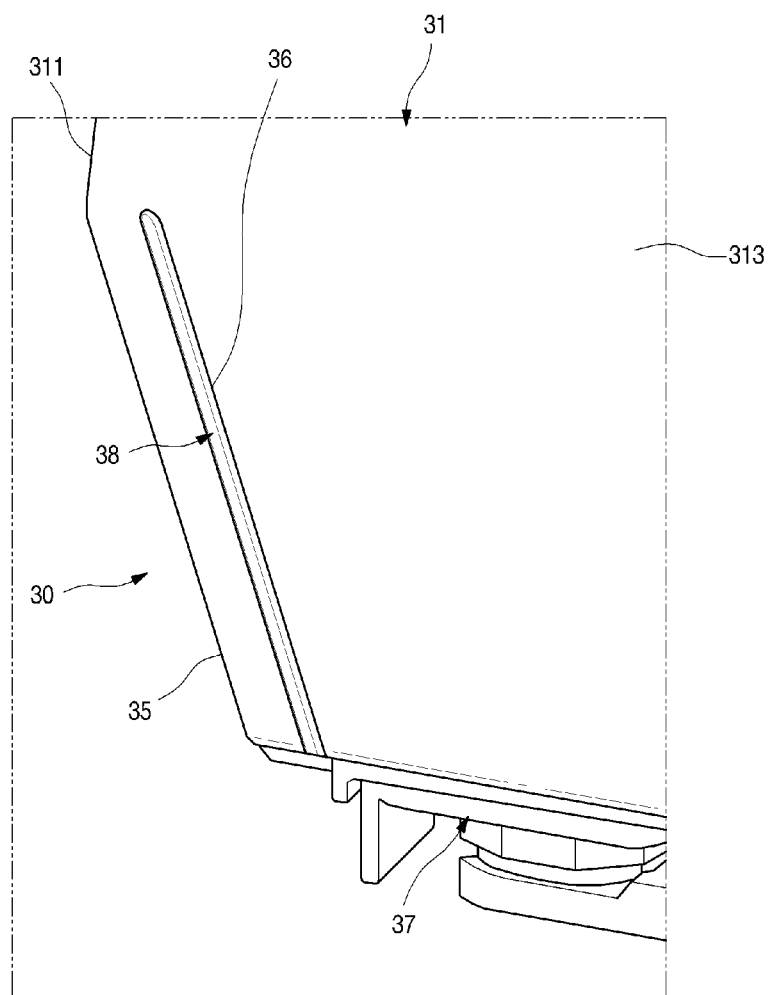

[Fig. 17]
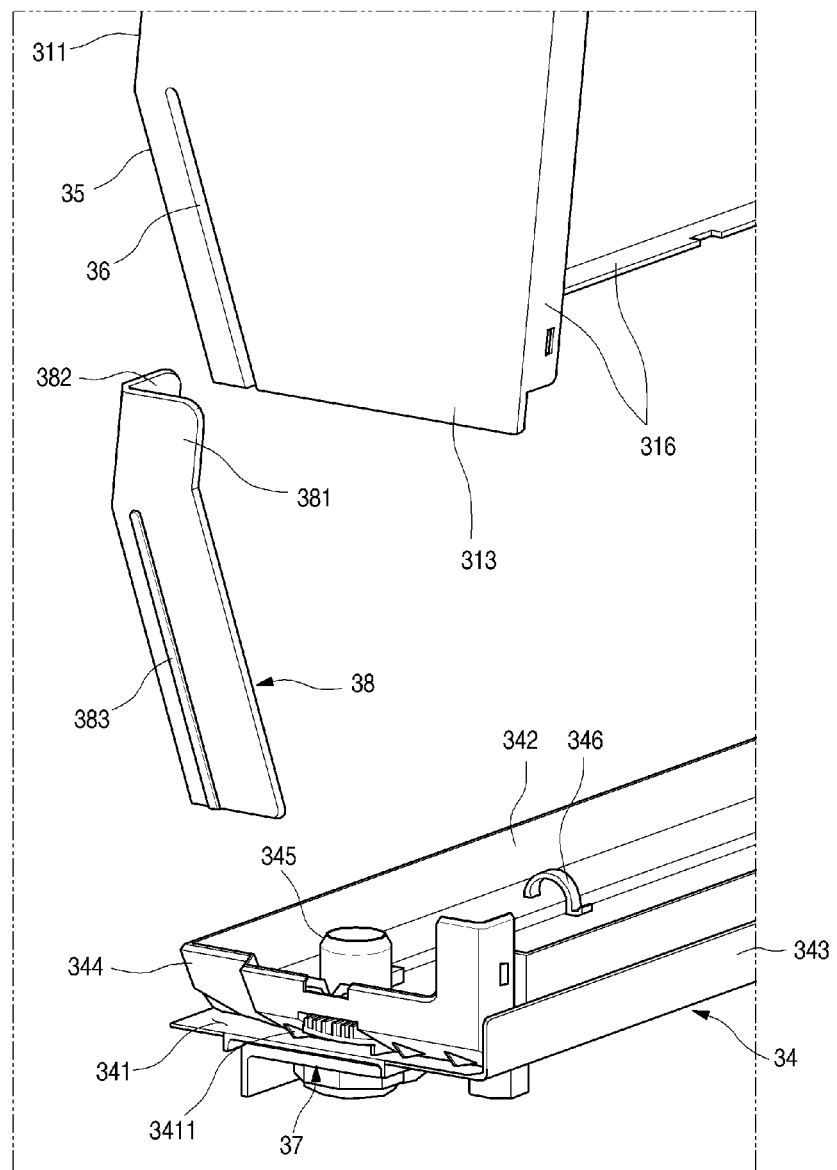

[Fig. 18]
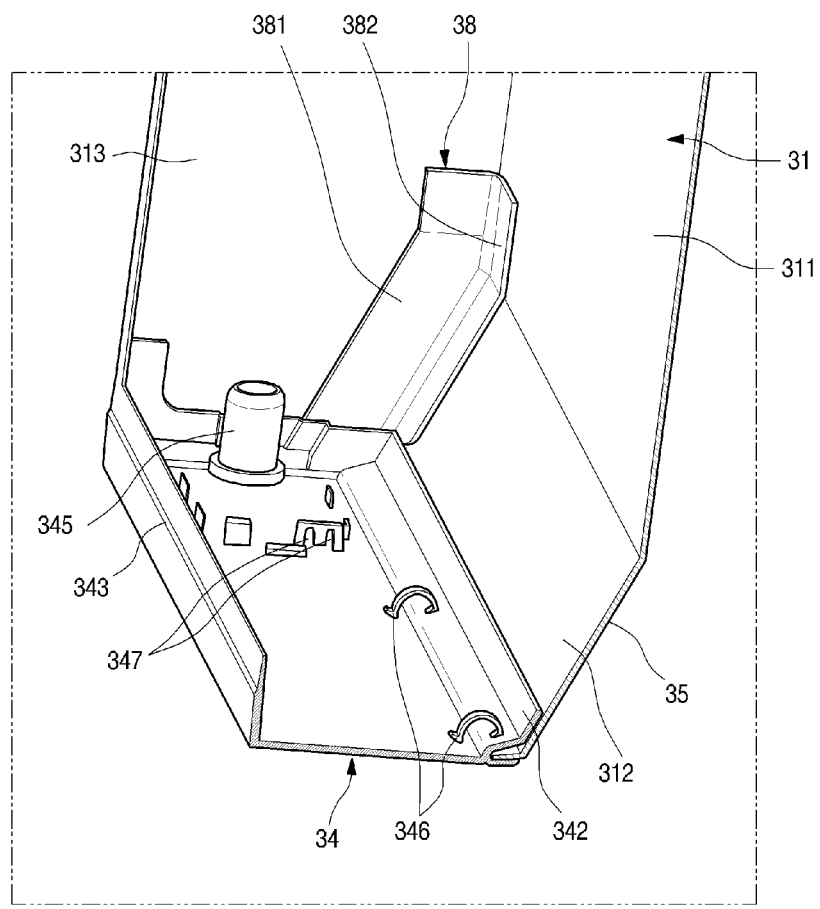

[Fig. 19]
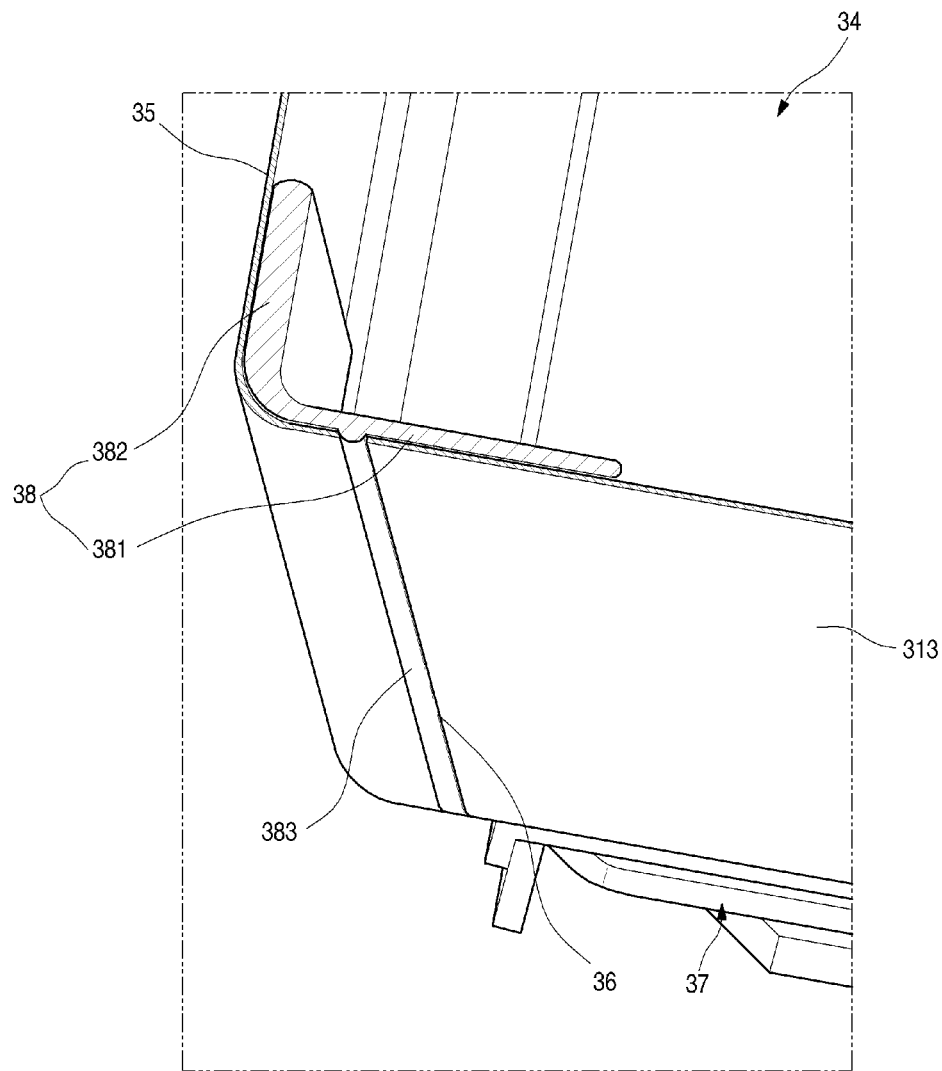
[Fig. 20]
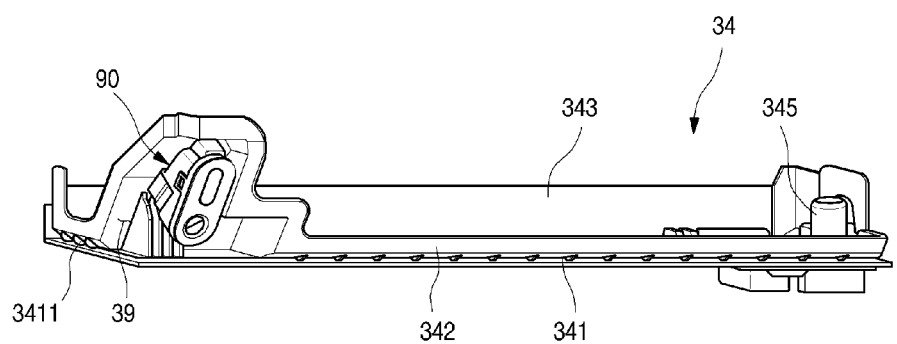

[Fig. 21]
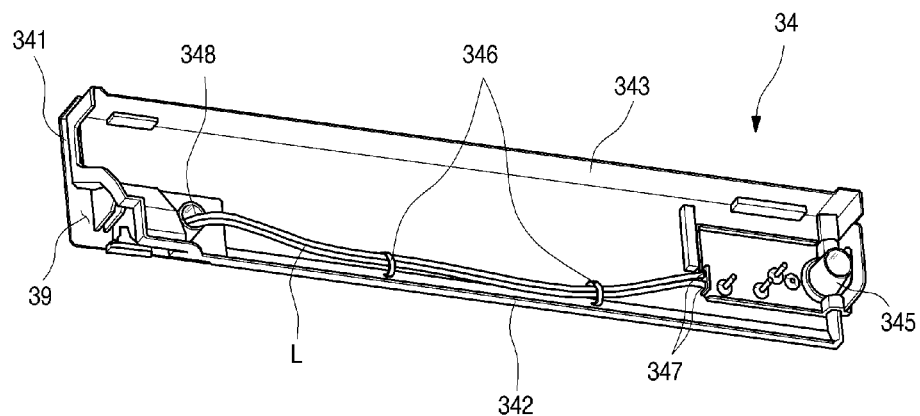
[Fig. 22]
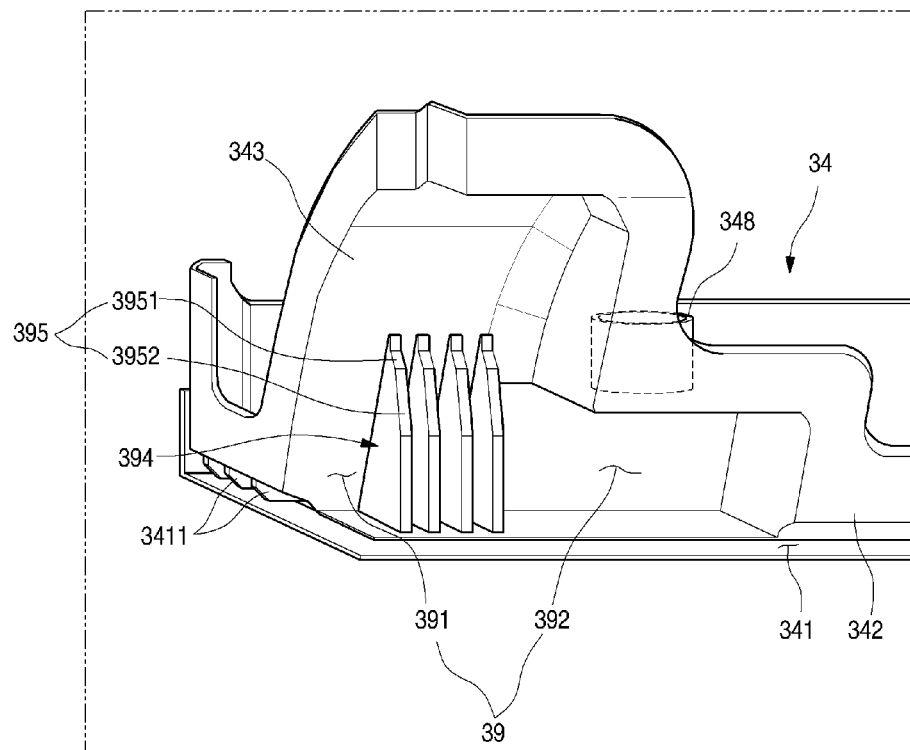

[Fig. 23]
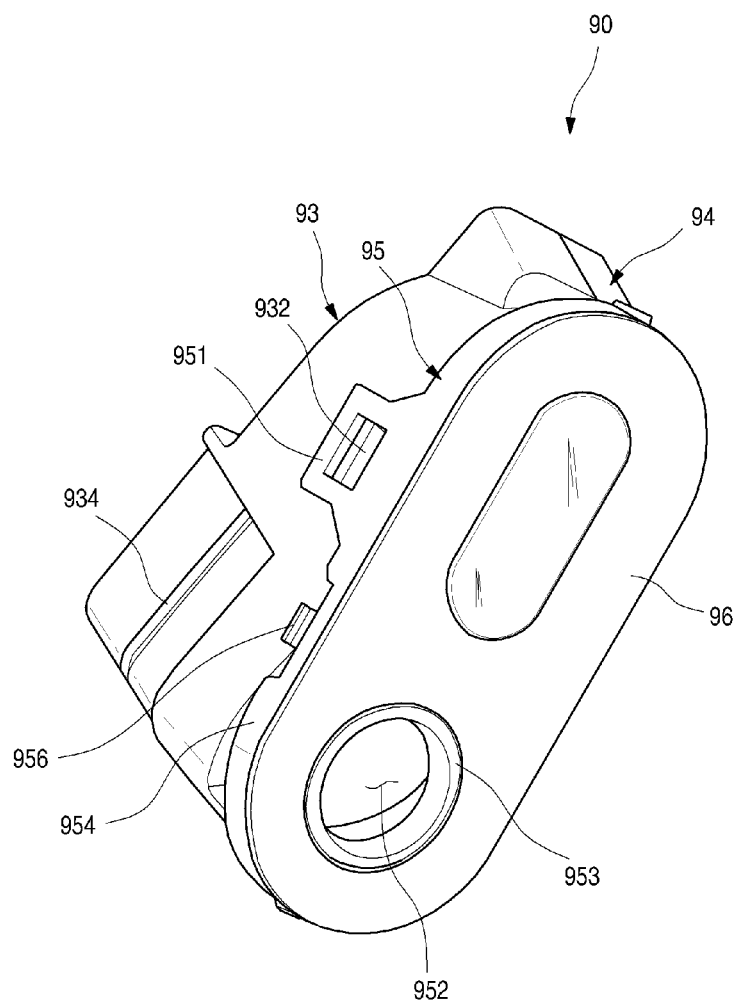

[Fig. 24]
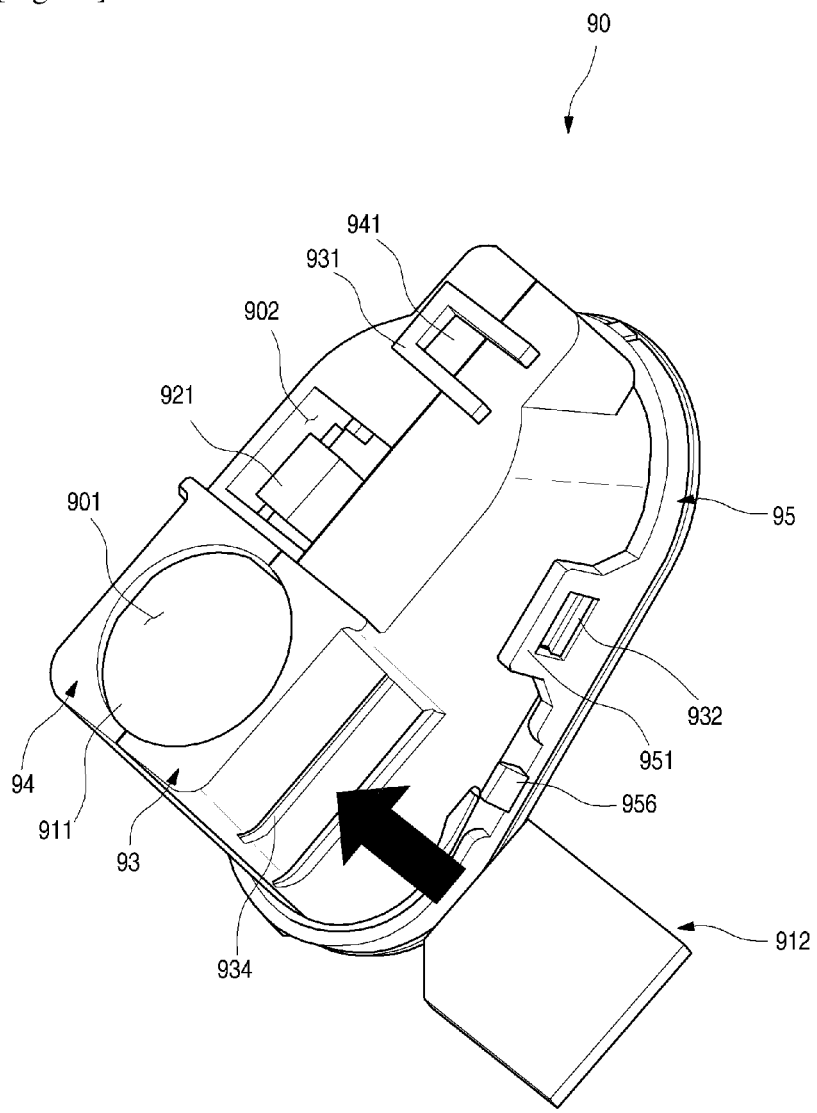

[Fig. 25]
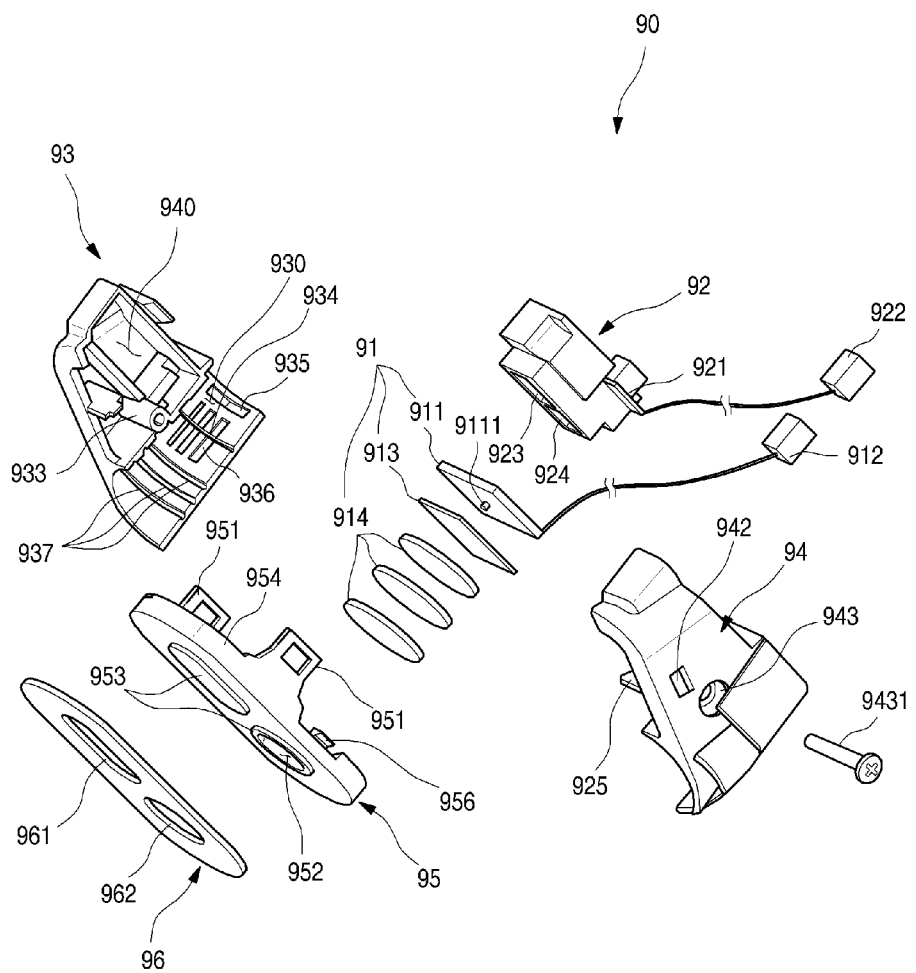

[Fig. 26]
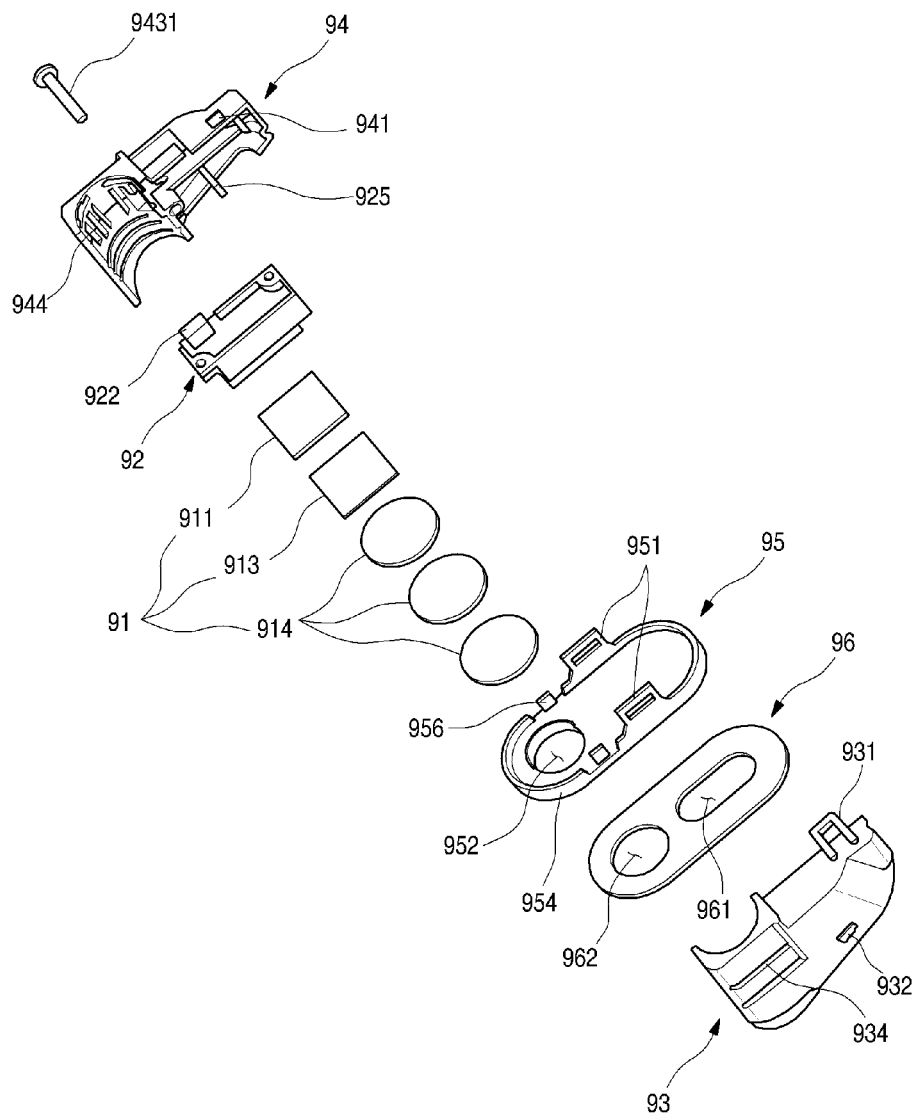

[Fig. 27]
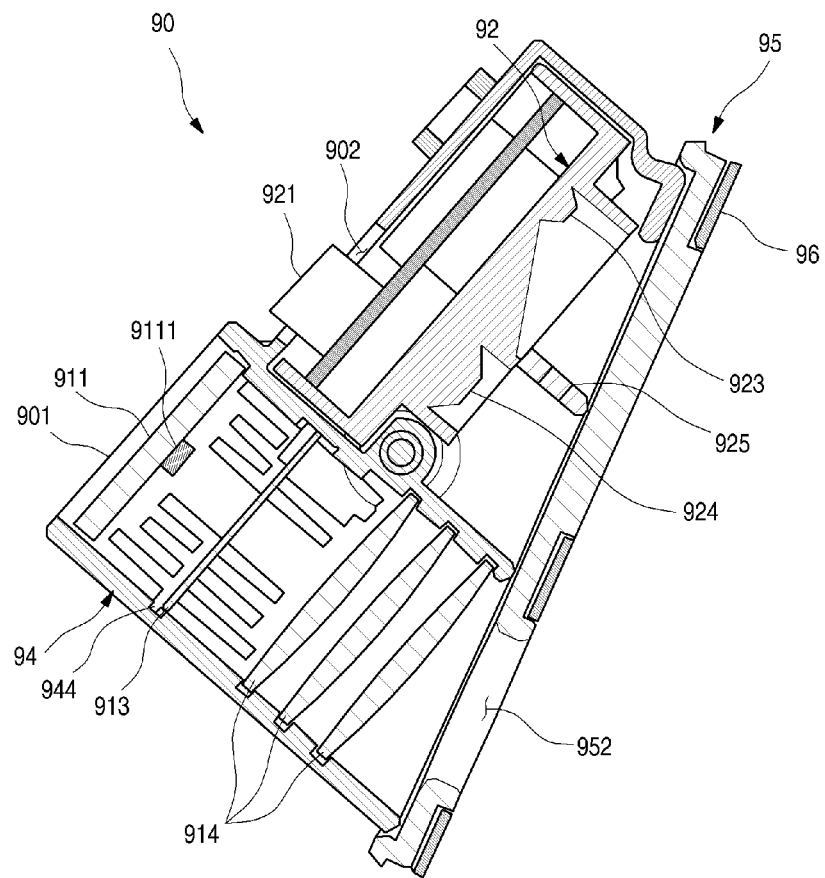

[Fig. 28a]
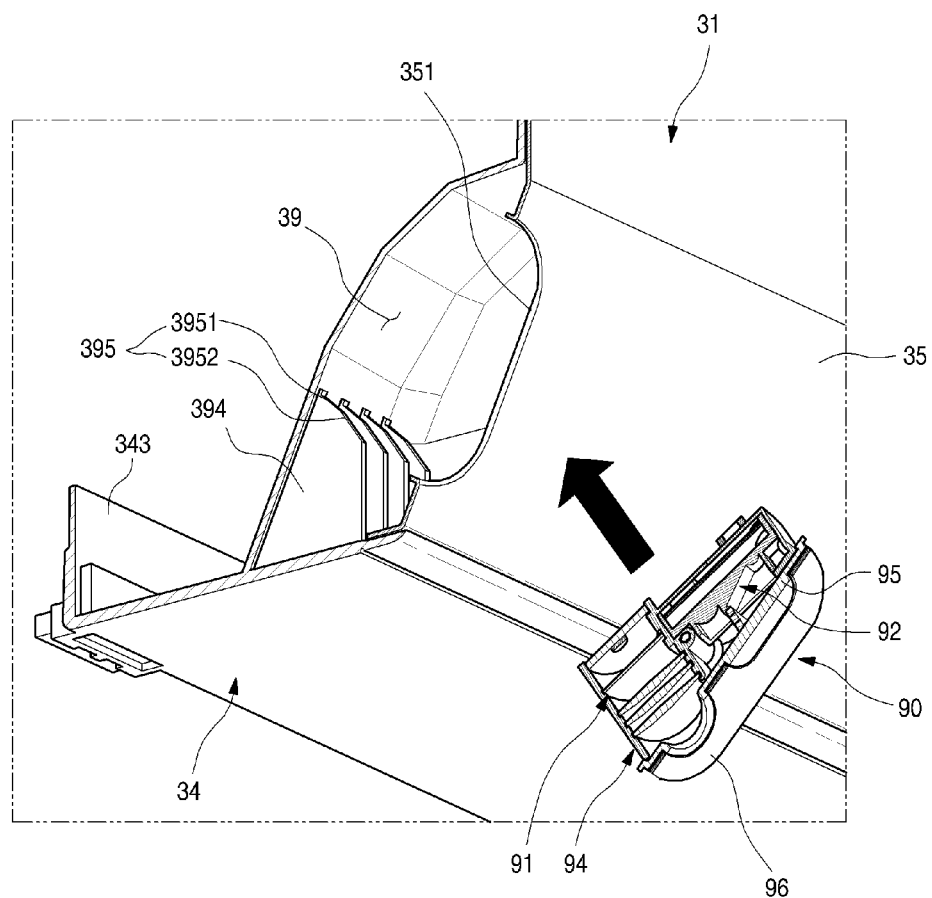

[Fig. 28b]
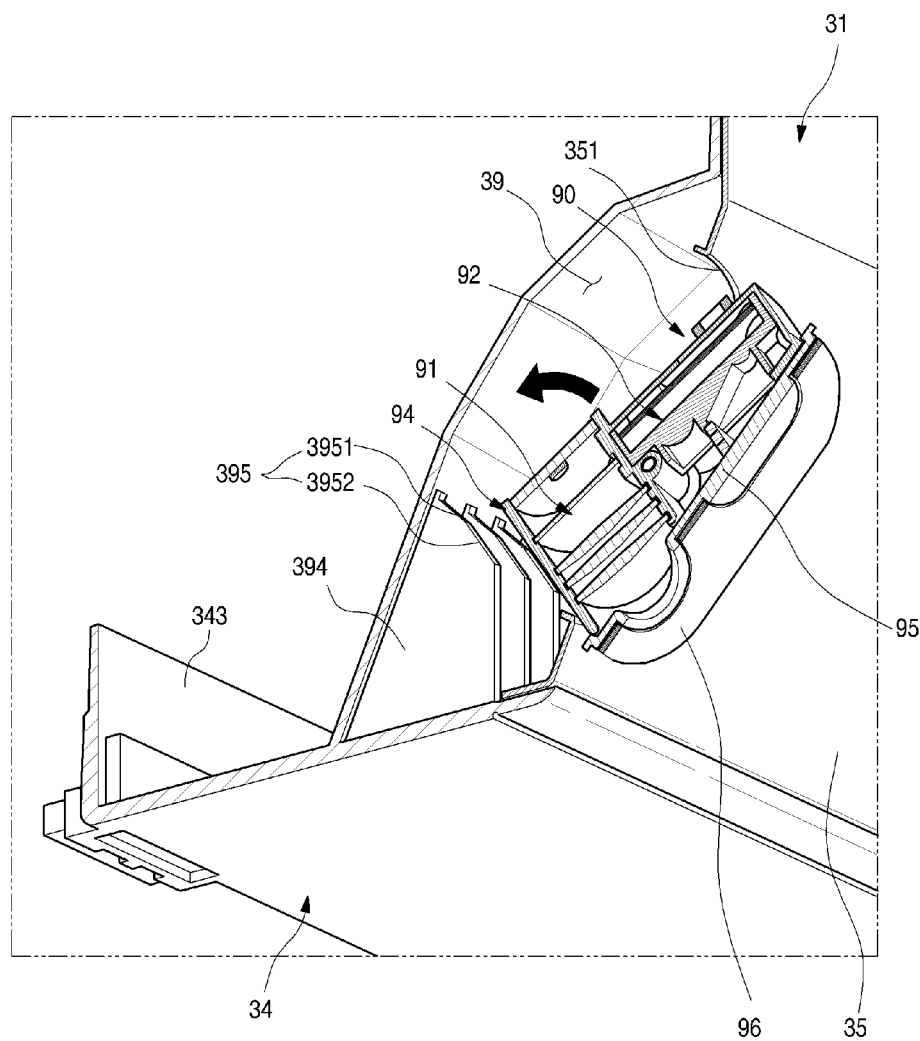

[Fig. 28c]
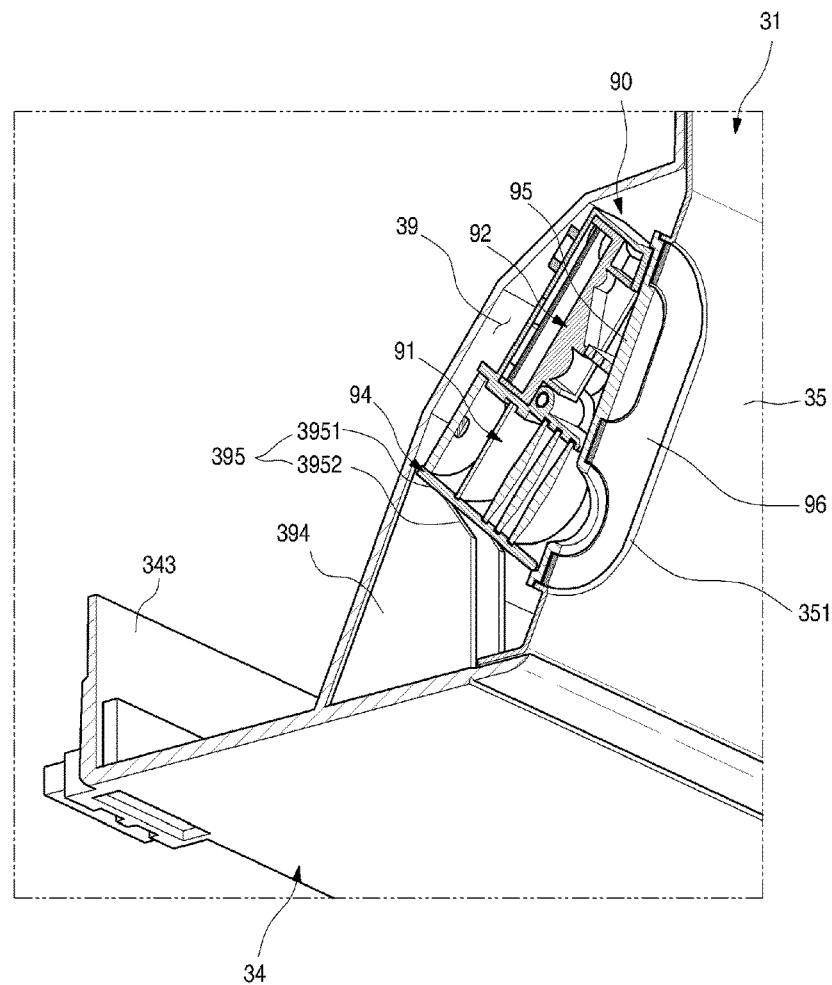
[Fig. 29]
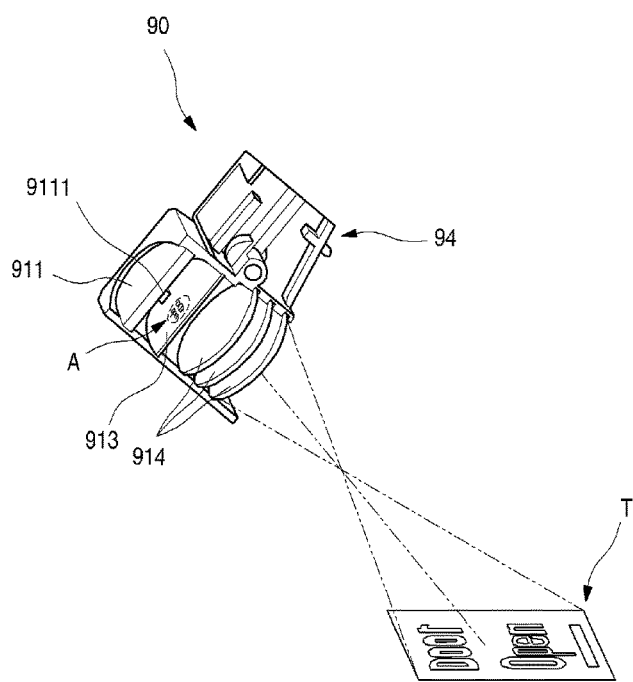

[Fig. 30]
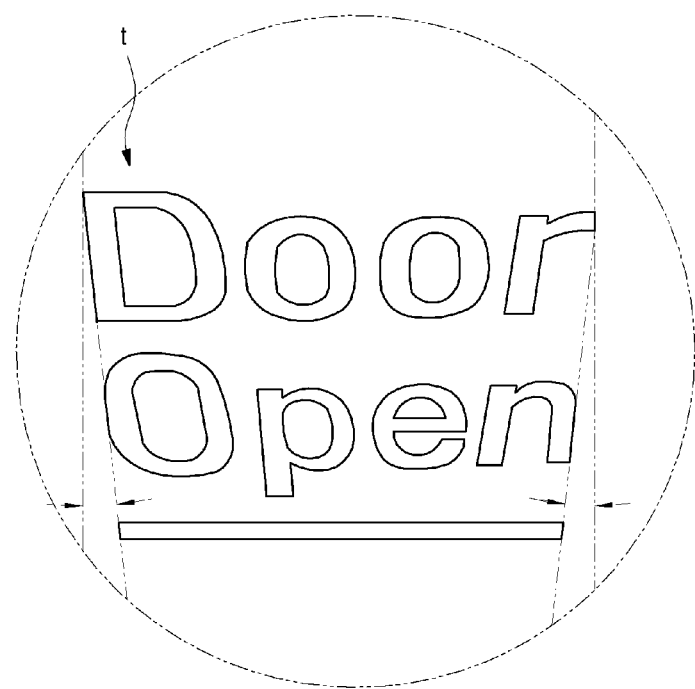
[Fig. 31]
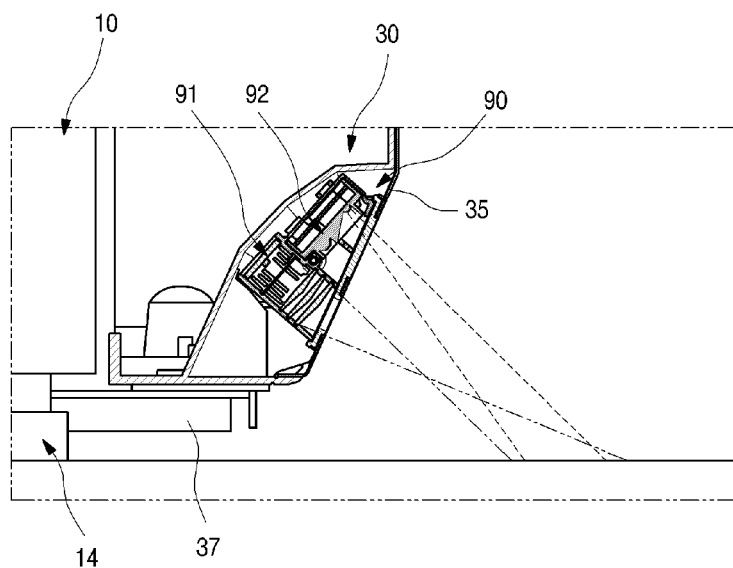

[Fig. 32]
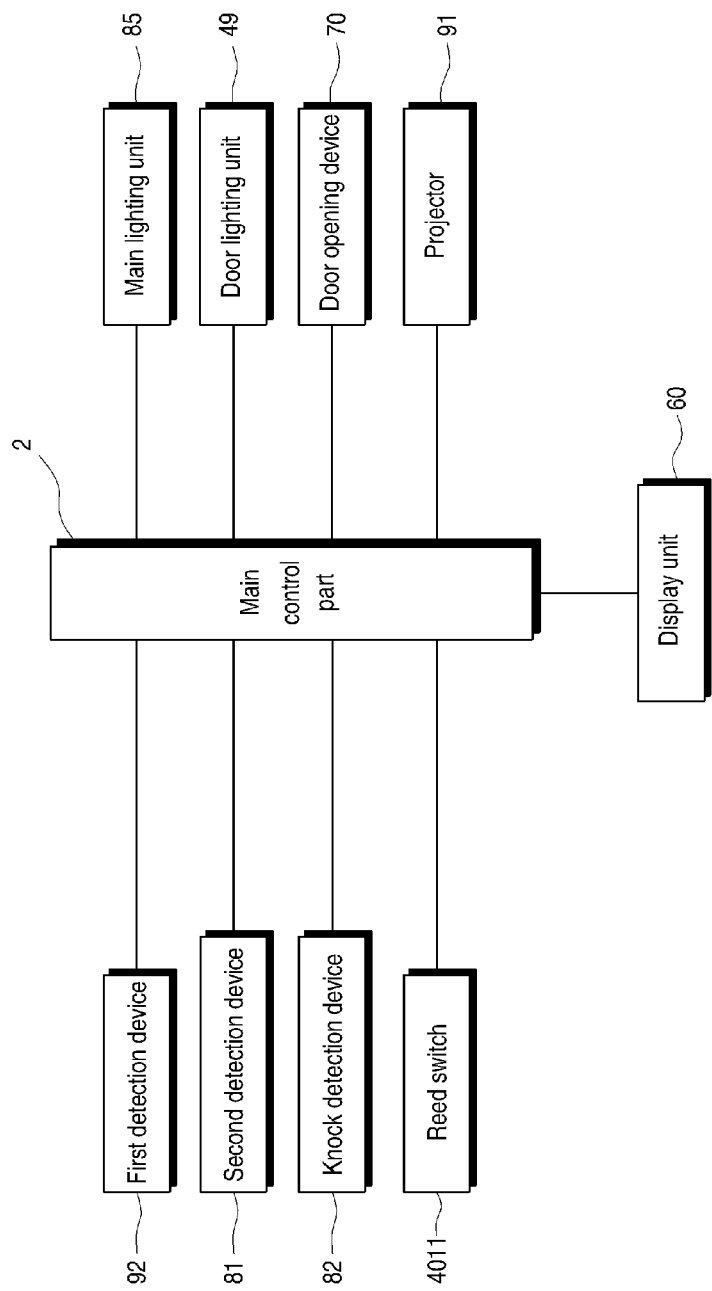

[Fig. 33a]
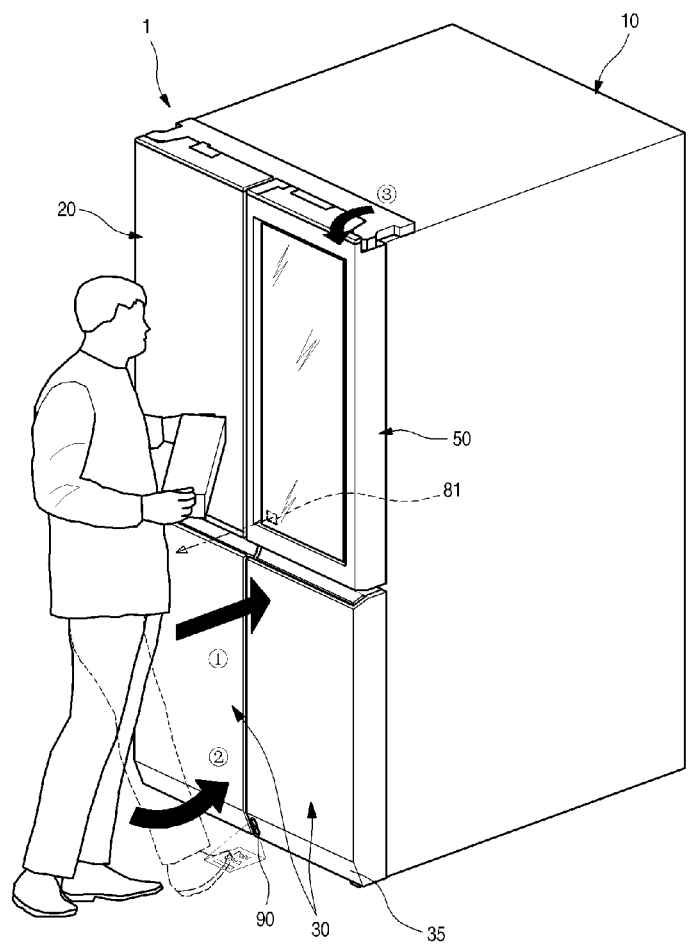
[Fig. 33b]
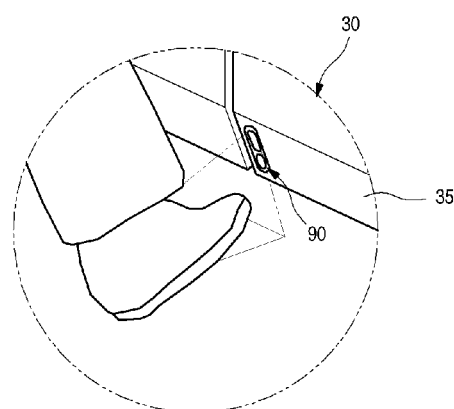

[Fig. 34]
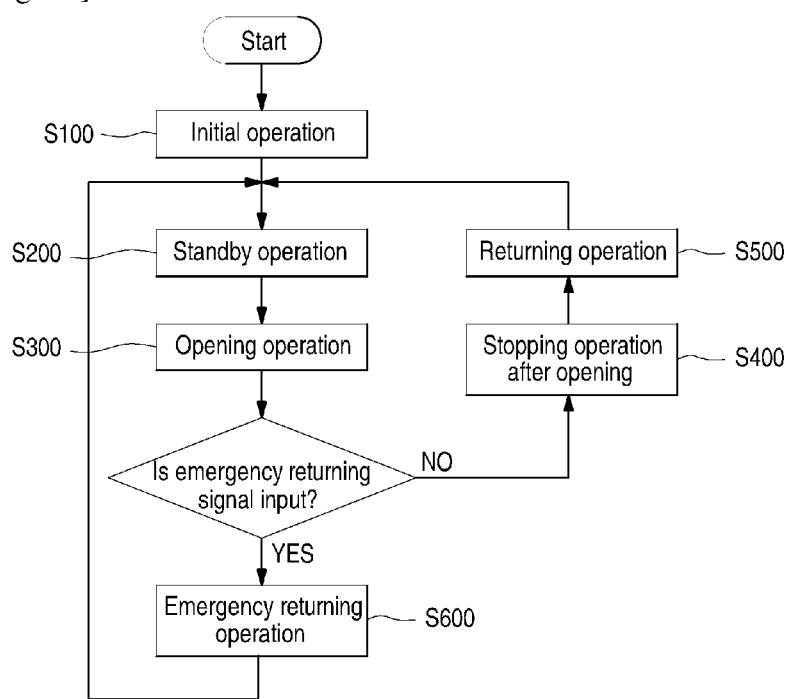

[Fig. 35]
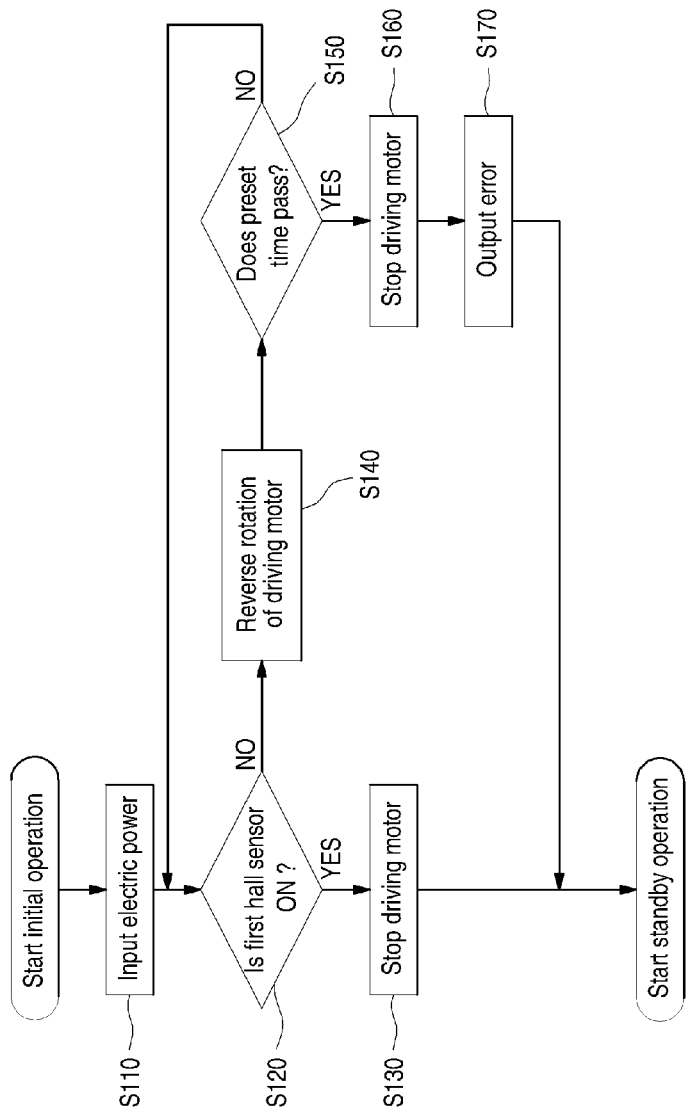

[Fig. 36]
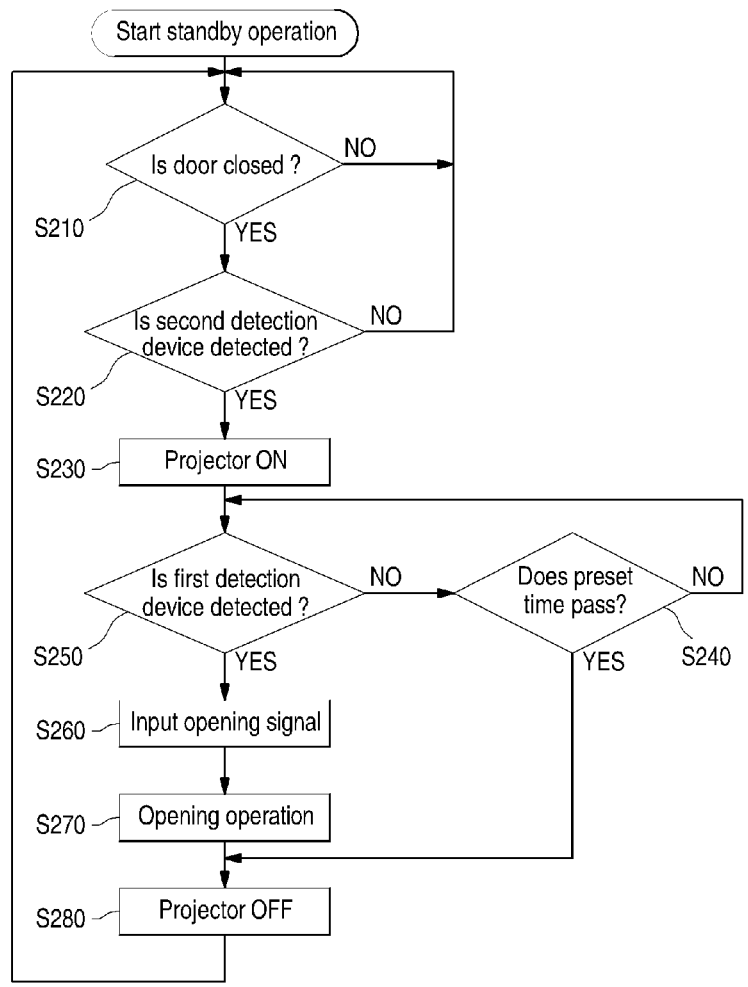

[Fig. 37]
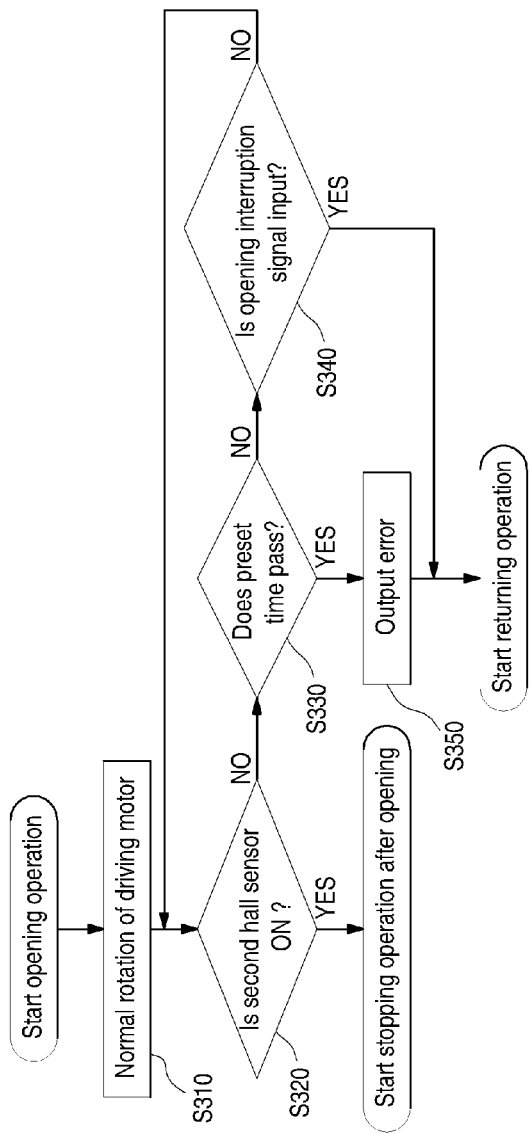
[Fig. 38]
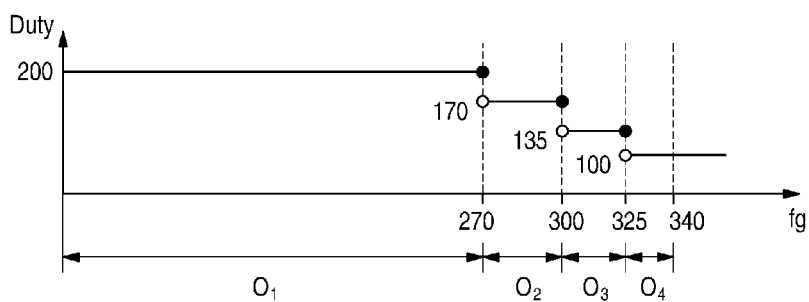

[Fig. 39]
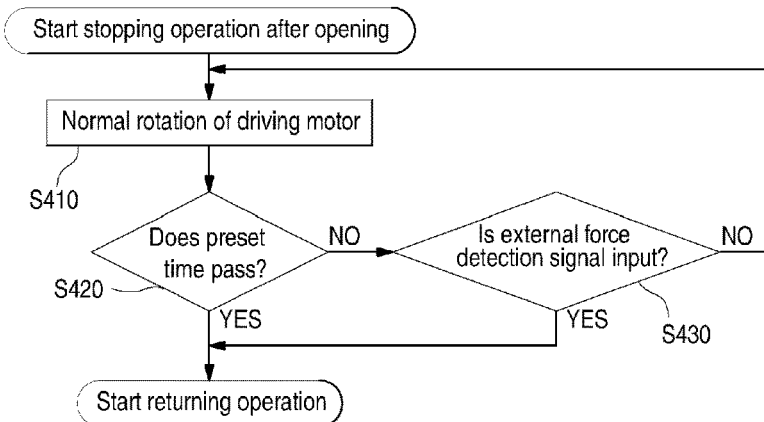
[Fig. 40]
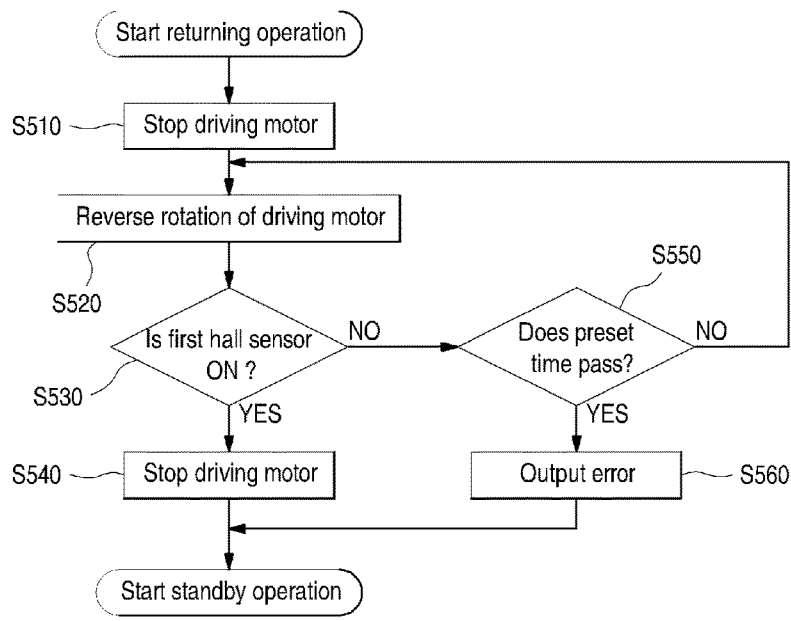
[Fig. 41]
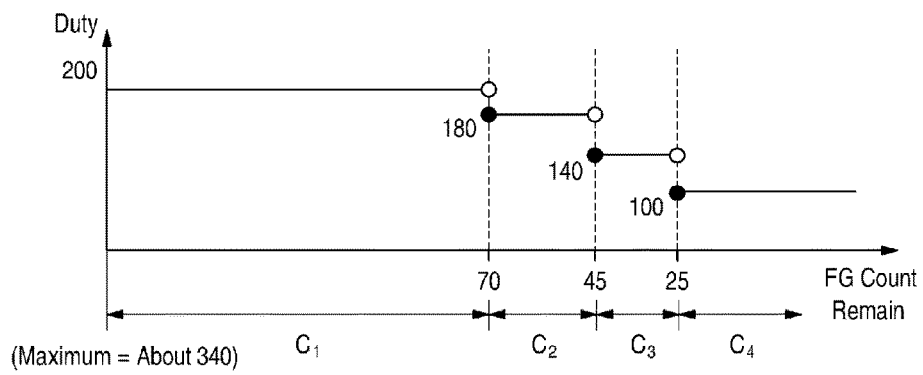

[Fig. 42]
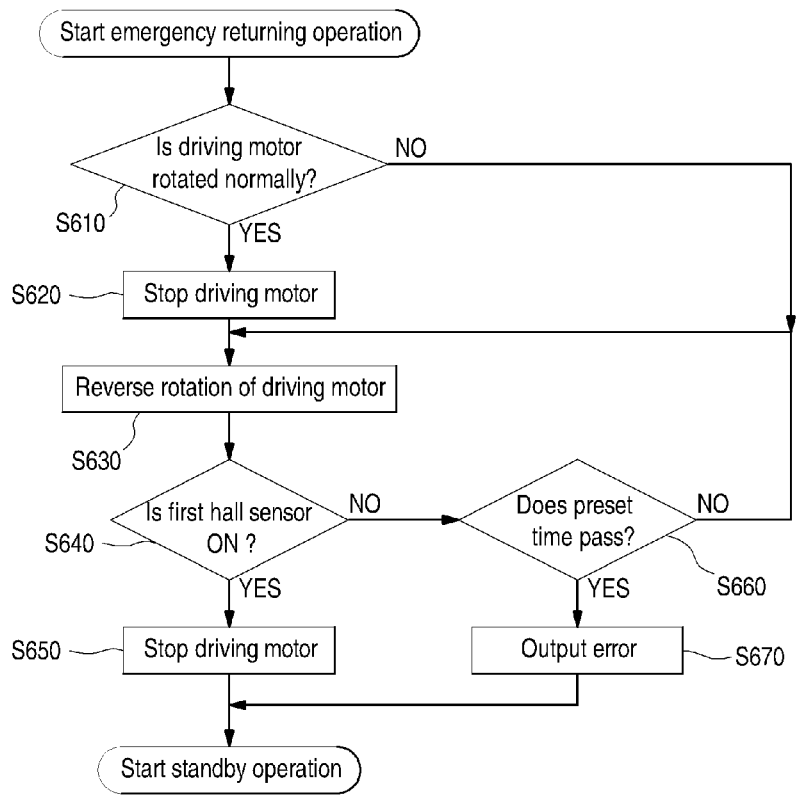
[Fig. 43]
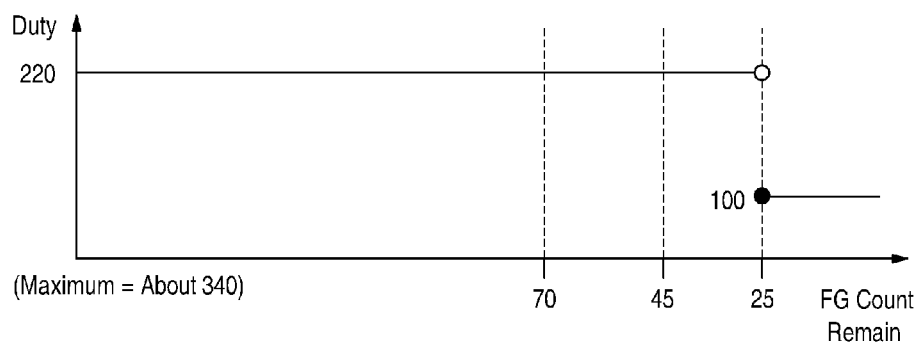

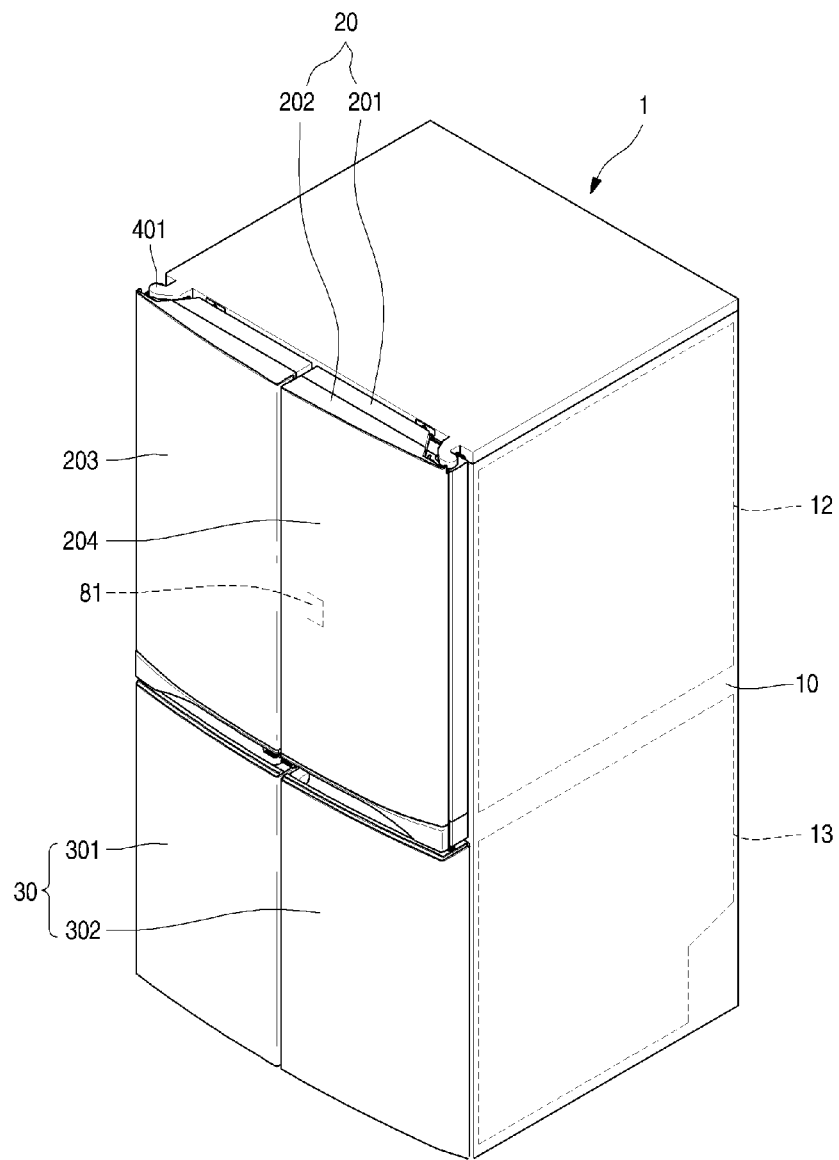
[Fig. 44]

[Fig. 45]
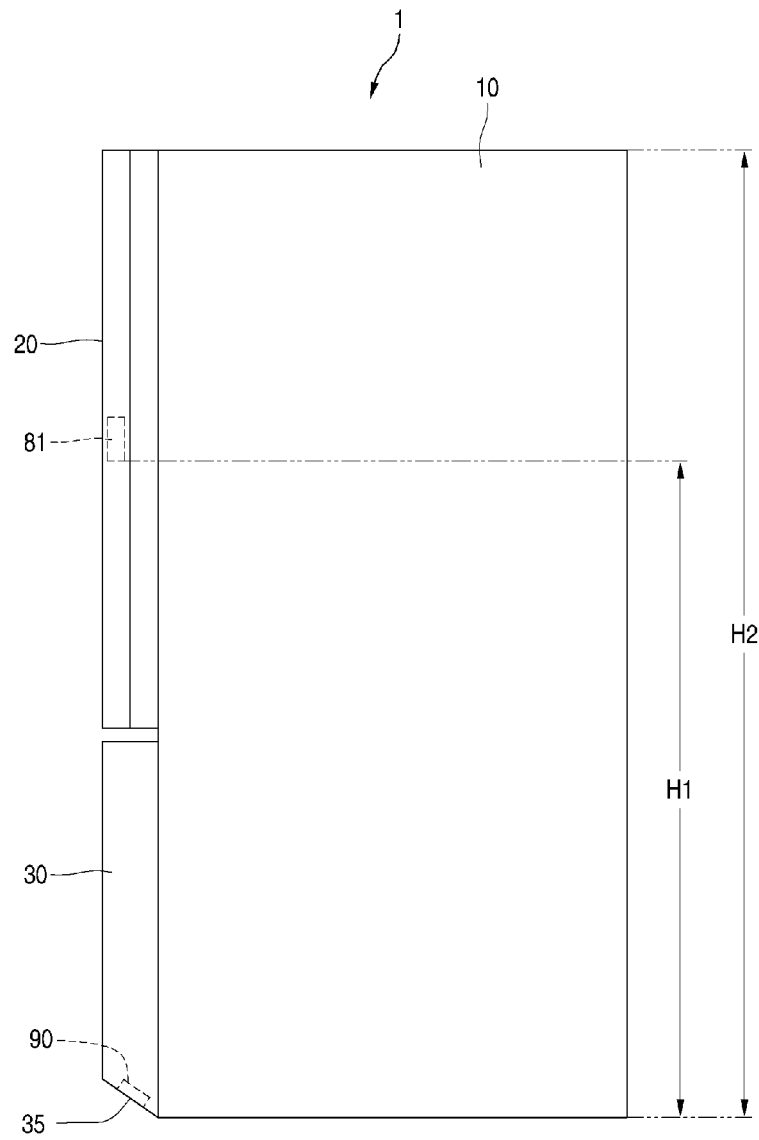
[Fig. 46]
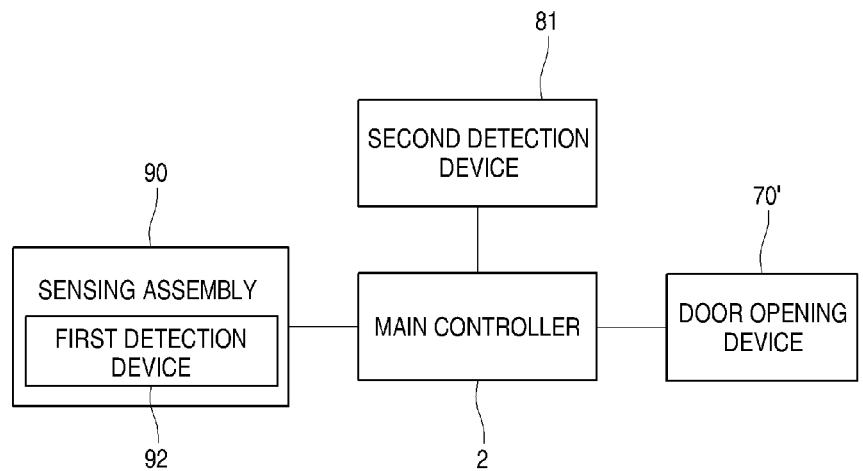

[Fig. 47]
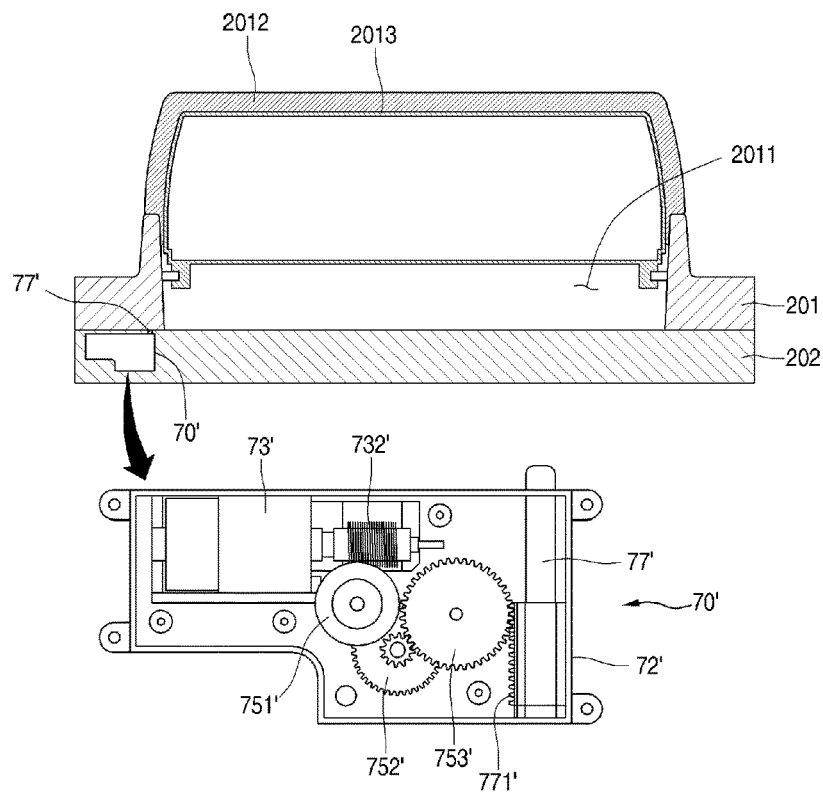
[Fig. 48]
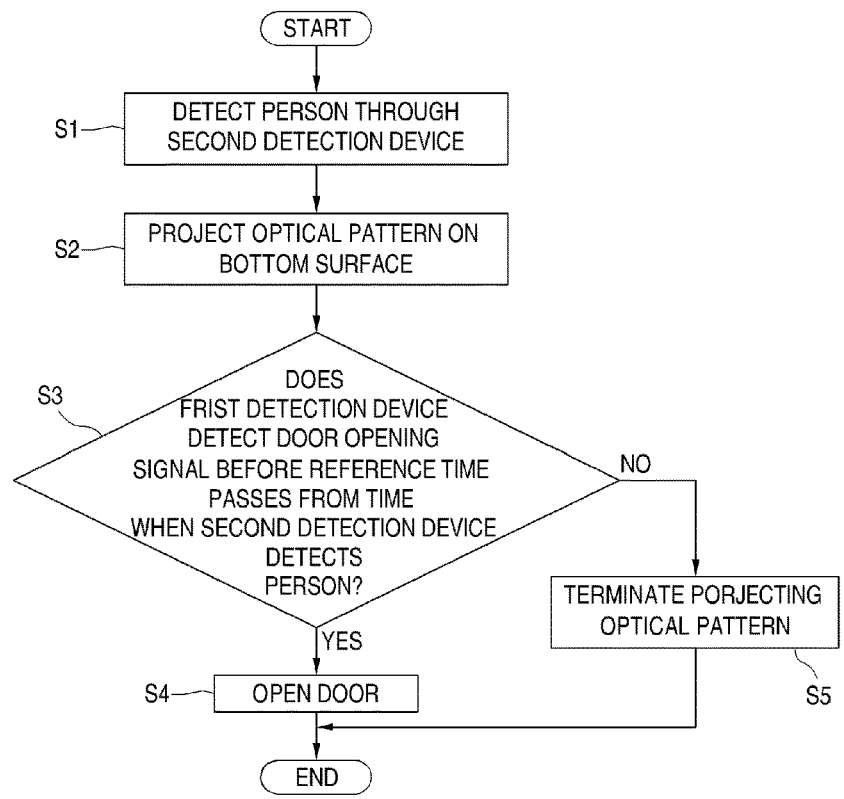

[Fig. 49]
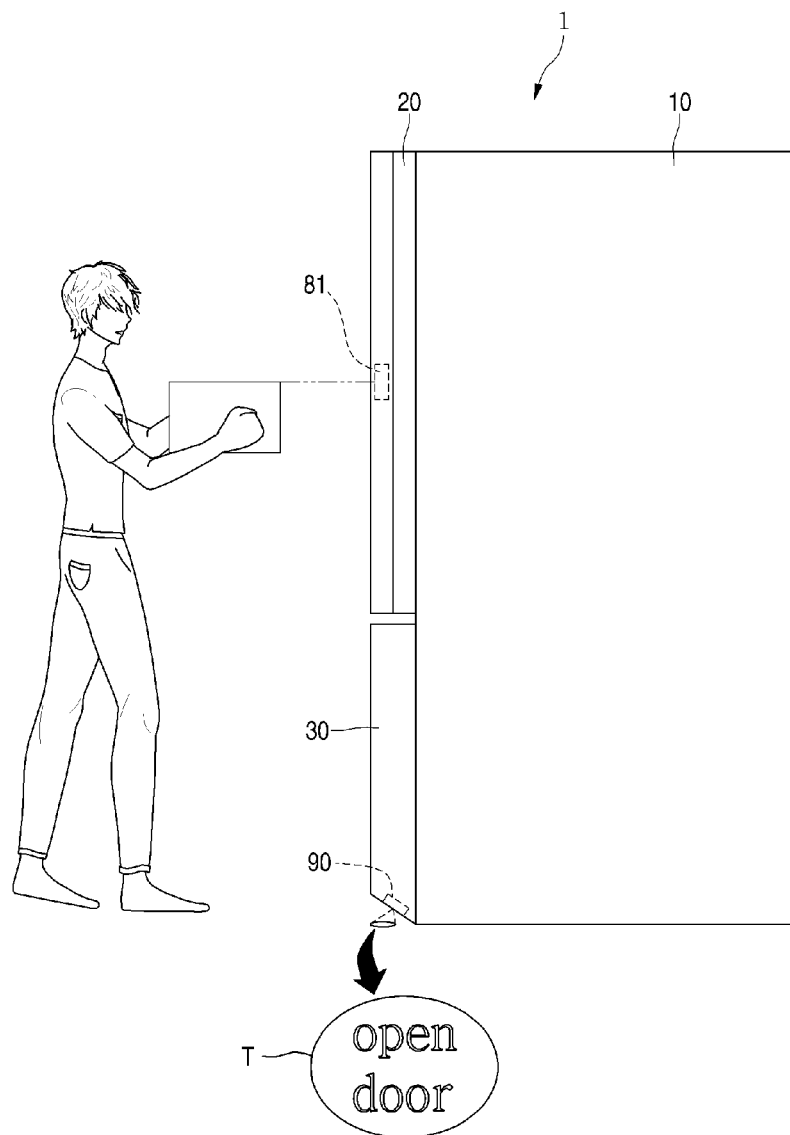

[Fig. 50]
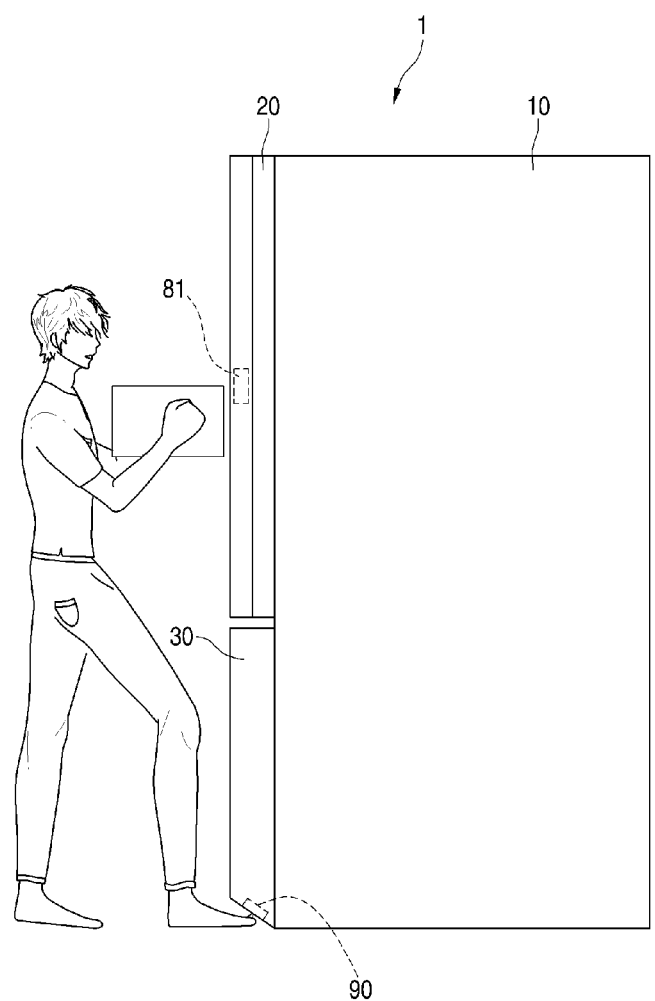

[Fig. 51]
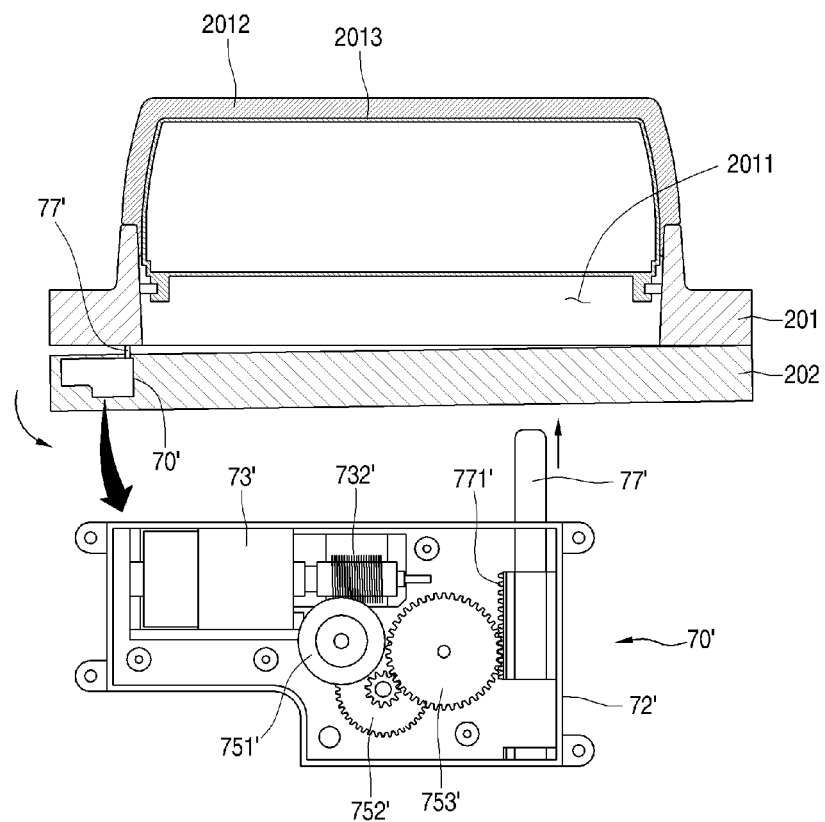

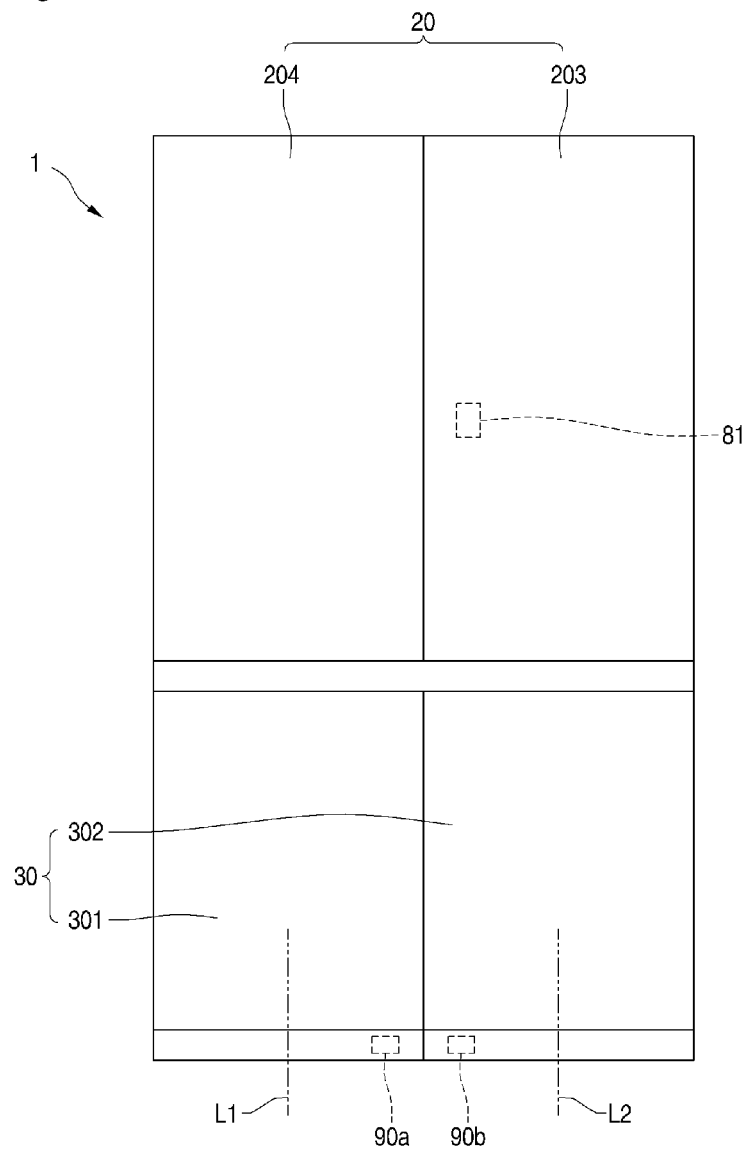
[Fig. 52]

[Fig. 53]
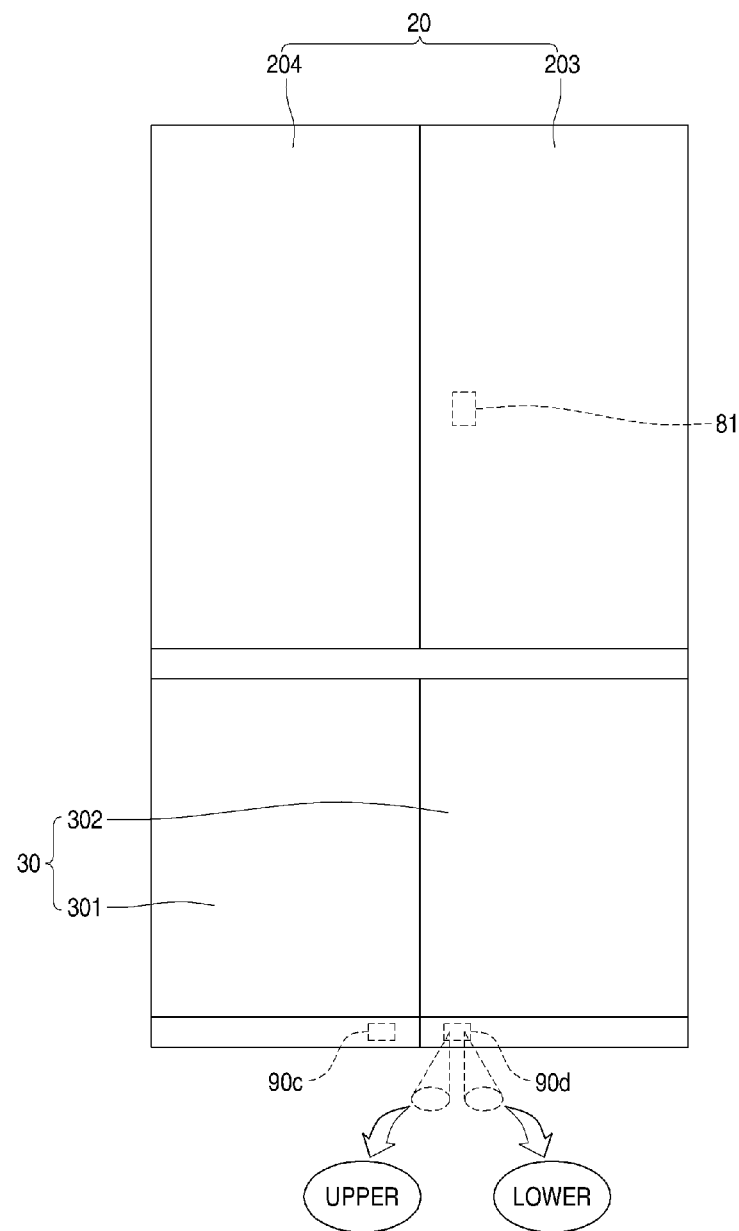

[Fig. 54]
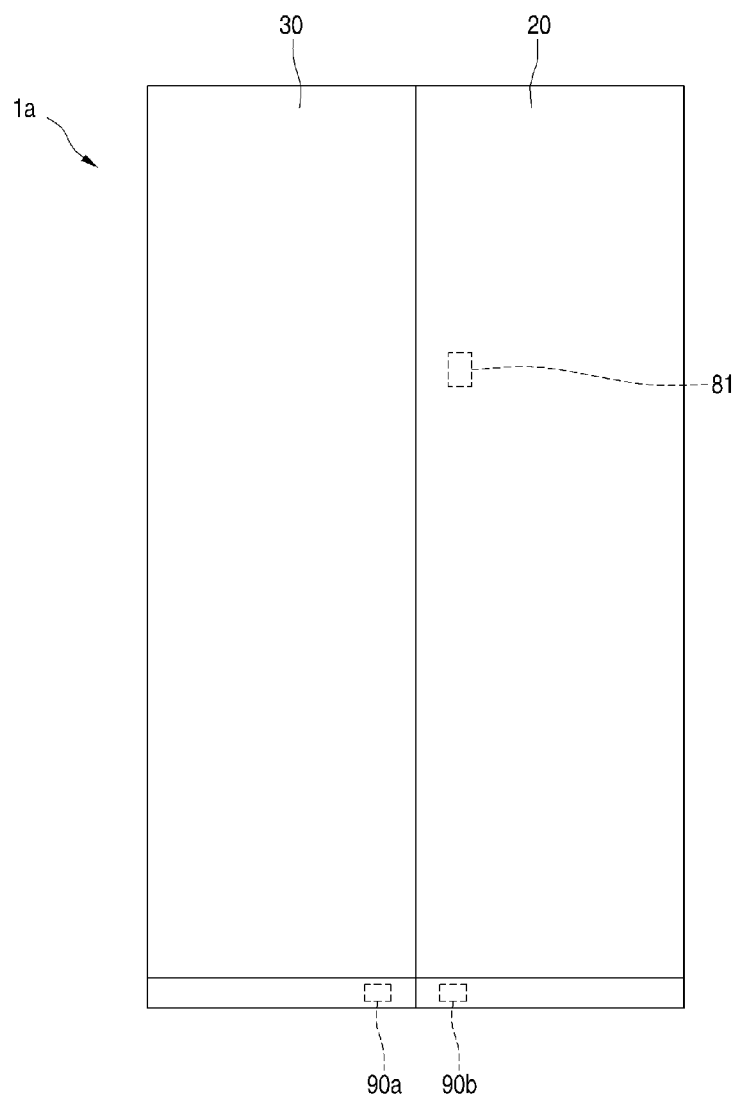

[Fig. 55]
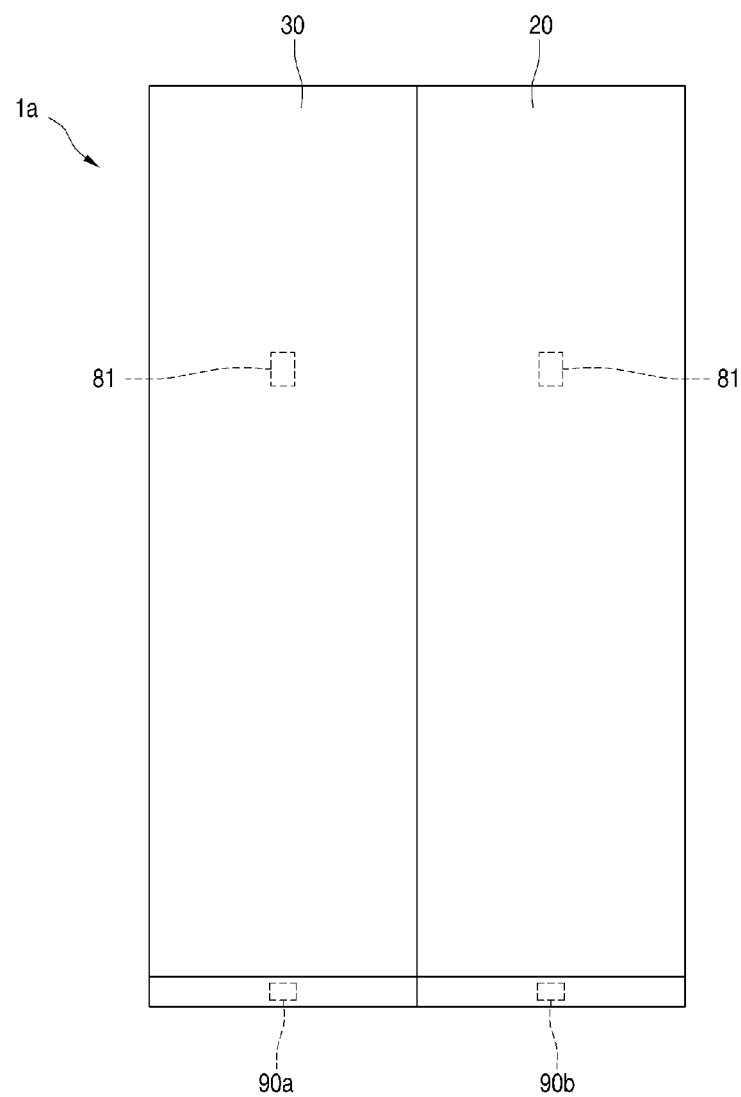

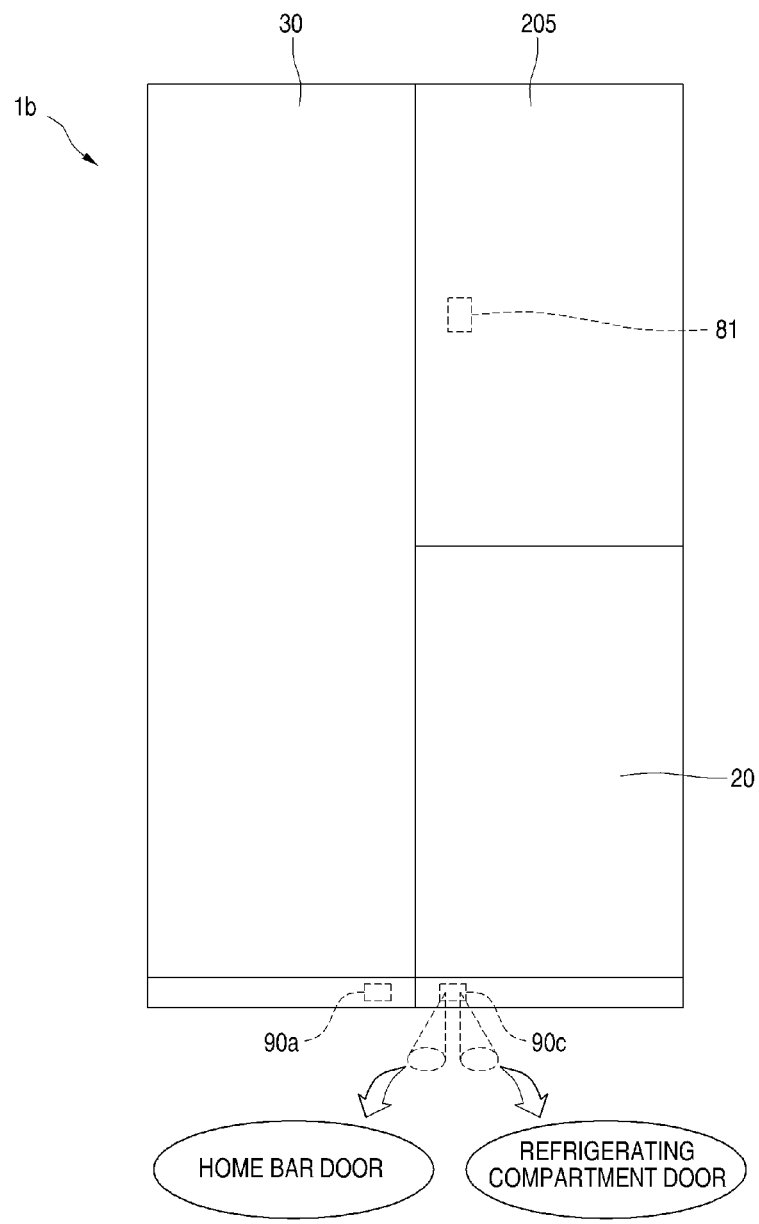

[Fig. 57]
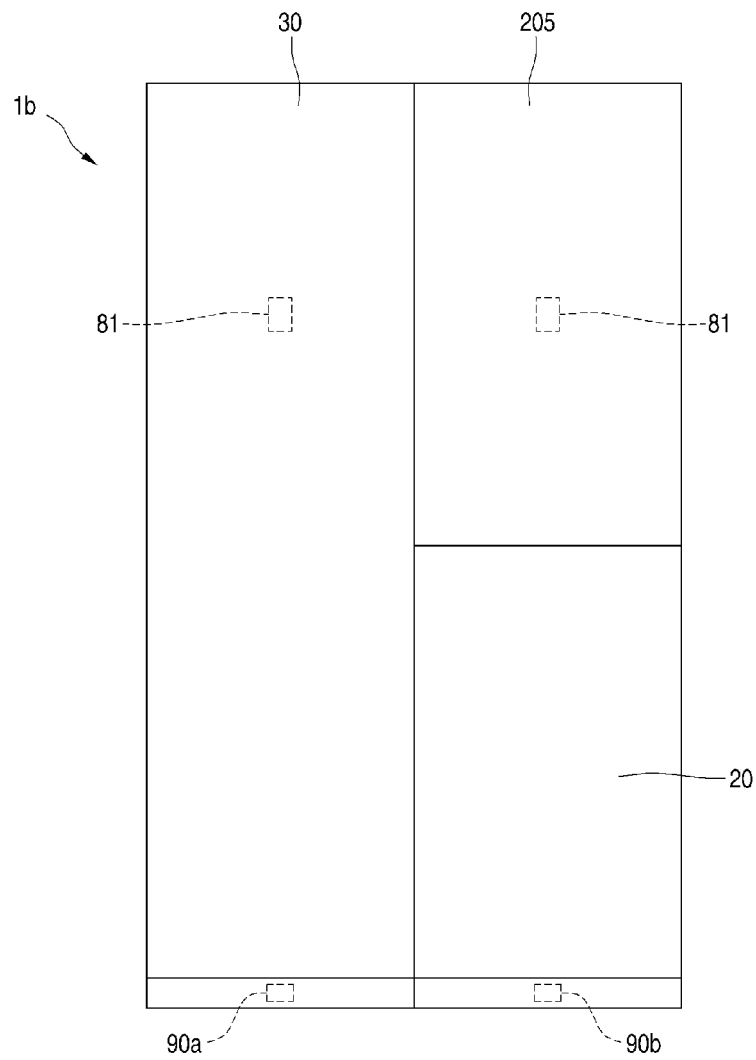

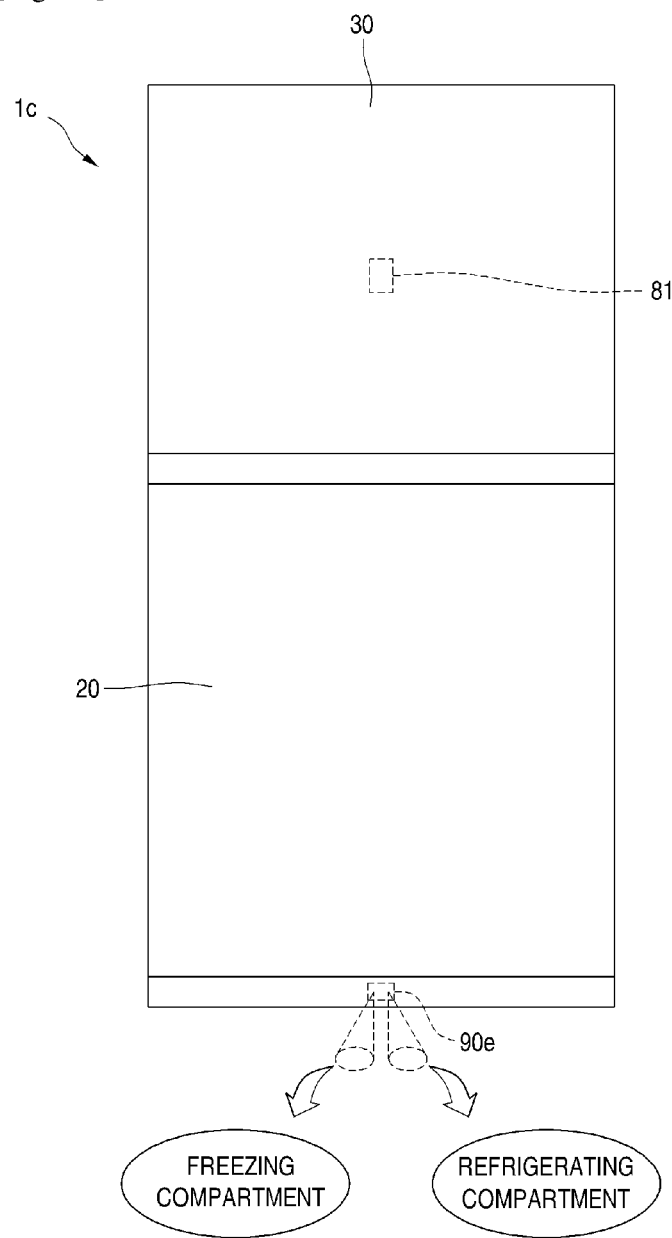
[Fig. 58]

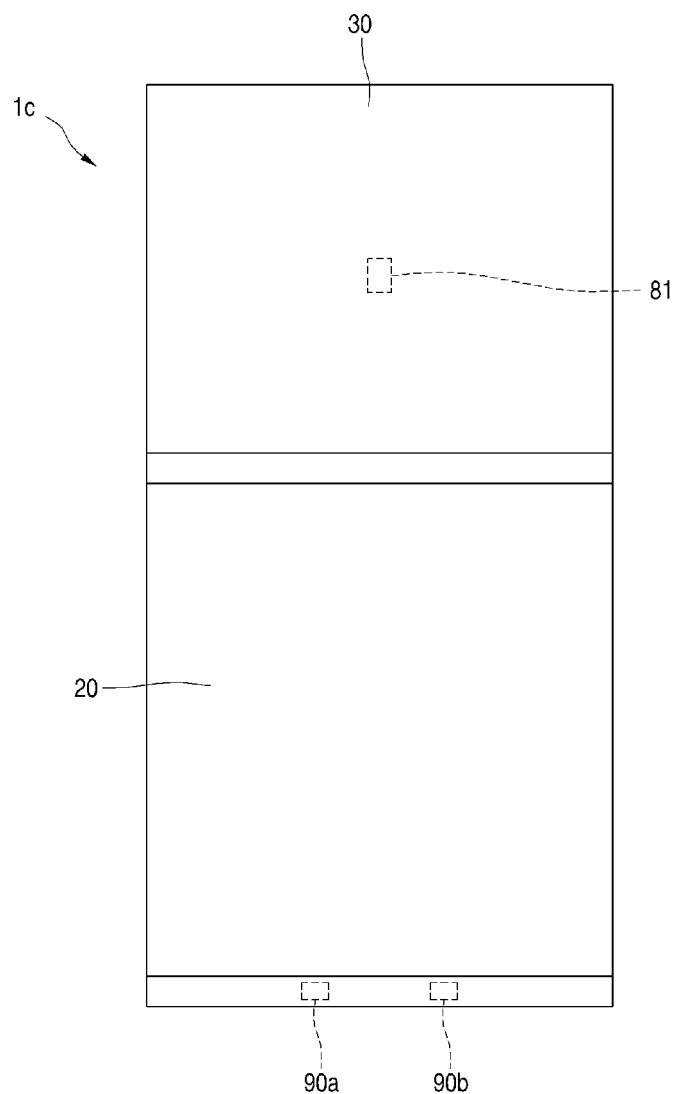
[Fig. 59]

REFRIGERATOR AND CONTROL METHOD FOR REFRIGERATOR AND METHOD FOR OPENING A REFRIGERATOR DOOR

CROSS REFERENCE TO RELATED APPLICATIONS

This application is a U.S. National Phase Application under 35 U.S.C. § 371 of International Application PCT/KR2016/004426, filed on Apr. 27, 2016, which claims the benefit of Korean Application No. 10-2015-0058952, filed on Apr. 27, 2015, Korean Application No. 10-2016-0001259, filed on Jan. 5, 2016, and Korean Application No. 10-2016-0001260, filed on Jan. 5, 2016, the entire contents of which are hereby incorporated by reference in their entireties.

BACKGROUND

A refrigerator and control method for refrigerator and method for opening a refrigerator door are disclosed herein.

Generally, a refrigerator is a home appliance which stores food at a low temperature in a storage space formed therein to be opened and closed by a door. To this end, the refrigerator may be formed to cool an inside of the storage space using cooling air generated through heat exchange with a refrigerant circulated in a refrigeration cycle, and thus to keep the stored food in an optimum state.

Recent refrigerators have tended to become bigger and have multi-functions according to a change in diet and a tendency toward high-quality of a product. And the refrigerators which have various devices for convenience to enhance user convenience have been released.

The storage space of the refrigerator may be opened and closed by a door. And typically, the door has a gasket to prevent a leak of cooling air while the door is closed, and a greater adhesion between the gasket and a cabinet tends to decrease the leaking of cool air.

Therefore, to increase the adhesion of the gasket, there is provided a structure in which a magnet is provided inside the gasket, and the gasket becomes in close contact with the cabinet formed of a steel material when the door is closed.

Meanwhile, in the case in which the gasket is in close contact with the cabinet using the magnet, when the door is opened, a force corresponding to a magnetic force is further required due to the magnetic force, and since a user should open the door with a greater force, there is inconvenience in use.

To solve the problem, there are various door opening devices which assists opening of the door, and a refrigerator in which the door opening device is driven by a user's operation to enable the user to open the door with less force has been developed.

In Korean Patent Publication No. 10-2011-0040030, there is disclosed a structure in which a door handle is provided at a refrigerator door, and an operating part is provided at the door handle, and a door opening device provided at a cabinet is operated when a user operates the operating part, and thus the door is pushed and opened.

However, in the refrigerator having such a structure, since a position which is pushed to open the door is distant from a hinge shaft, there is a problem that a length of a rod is very long when the door is opened.

And since the operating part of the door handle should be operated to open the door, there is another problem that it may be impossible to operate the operating part when the user is holding an object and may not use both hands.

DISCLOSURE

Technical Problem

The present disclosure is directed to providing a refrigerator whose door is automatically opened in a state in which a user is holding an object in both hands using a part of the user's body instead of the hands, and a control method for the refrigerator.

Also, the present disclosure is directed to providing a refrigerator in which an image for inducing a user's operation is projected at a position close to the refrigerator and the user operates a corresponding area and thus the door is automatically opened, and a control method for the refrigerator.

Also, the present disclosure is directed to providing a refrigerator which is able to enhance reliability in projecting of an image for automatically opening the door and sensing of a user's operation, and a control method for the refrigerator.

Also, the present disclosure is directed to providing a refrigerator which enables an image recognizable by a user to be projected on a bottom surface in front of the refrigerator.

Also, the present disclosure is directed to providing a refrigerator which is able to efficiently use an internal space of the door due to a sensing assembly having a compact configuration.

Also, the present disclosure is directed to providing a refrigerator in which a projector and a detection device are formed in one module, and thus productivity and assemblability are enhanced.

Also, the present disclosure is directed to providing a refrigerator which enhances a recognition rate of a user's operation and prevents the door from being opened due to misrecognition.

SUMMARY

One aspect of the present disclosure provides a refrigerator including a cabinet configured to form a storage space; a door configured to open and close the storage space; a sensing assembly provided at one side of the door, and configured to sense a user's operation; and a door opening device provided at the door, driven when the sensing assembly is operated, and configured to open the door, wherein the sensing assembly includes a projector which projects a predetermined image on a bottom surface at which the refrigerator may be installed; and a detection device which emits light to an area of the image formed on the bottom surface by the projector, and senses the user's operation.

The sensing assembly may be formed in a module type in which the projector and the detection device are accommodated in an integrated case.

The detection device may be provided at an upper side of the projector.

The sensing assembly may be installed at an inclined surface which is formed at a lower end of the door to be inclined toward the bottom surface.

A lower decoration which forms a lower surface of the door may be formed at a lower end of the door, and the sensing assembly may be installed and fixed to the lower decoration.

The sensing assembly may include a case which forms an external appearance, and also forms an accommodation space of the projector and the detection device, and a case cover which may be formed of a material through which the light is transmitted, shields an opened front surface of the case, and is coupled to a front surface of the door.

The case may include a projection part which may be formed at a lower portion of the case and at which the projector may be installed, and a detection part which may be formed at an upper side of the projection part and at which the detection device may be installed, and the case may be disposed at an inside of the door to be inclined.

A PCB hole which is opened so that the projector and the detection device are exposed to an outside may be formed at a rear surface of the case.

A hook restriction part which is coupled to a side surface of the case so as to restrict the case may be formed at a perimeter of the case cover.

A cover fixing hook which is restricted in an installation hole formed at the front surface of the door and enables the sensing assembly to be installed and fixed may be formed at a perimeter of the case cover.

A decoration plate which is attached to a front surface of the case cover, formed on the same plane as the front surface of the door, and formed of the same material as that of the front surface of the door may be provided.

The case may include a first case and a second case which are coupled from both sides, and the first case and the second case may be coupled to each other, and the projector and the detection device may be accommodated therein.

The projector may include an LED PCB on which an LED used as a light source is mounted, a film which is provided at a front of the LED PCB so that light from the LED is transmitted therethrough and on which characters to be projected are formed, and a plurality of lenses which are provided at a front of the film to adjust a focus such that the image may be formed on the bottom surface.

A film slot in which the film is inserted may be formed at the case.

The characters formed on the film may be formed so that a width of an upper side thereof is formed larger than that of a lower side thereof.

A ratio of the widths of the upper side and the lower side of the characters may be proportional to a slope of the projector with respect to the ground.

The characters formed on the film may be printed on the film.

The detection device may be a position sensing device (PSD) which is able to detect a user's approach position.

The detection device may include a light emitting part which emits infrared light to the image formed on the bottom surface; and a light receiving part to which the infrared light emitted from the light emitting part is reflected and then received, and a barrier which divides between the light emitting part and an outside of the light receiving part may be further formed.

The barrier may be formed at the case in which the detection device is accommodated.

Another aspect of the present disclosure provides a refrigerator including a cabinet in which a refrigerator compartment is disposed at an upper side thereof, and a freezer compartment is disposed at a lower side thereof; one pair of refrigerator compartment doors which are disposed in parallel to open and close the refrigerator compartment; one pair of freezer compartment doors which are disposed in parallel to open and close the freezer compartment; a sensing assembly provided at one side of the freezer compartment door and configured to sense a user's operation; and a door opening device provided at the refrigerator compartment door, driven when the sensing assembly is operated, and configured to open the door, wherein the sensing assembly includes a projector which projects a predetermined image on a bottom surface at which the refrigerator may be installed; and a first detection device which emits light to an area of the image formed on the bottom surface by the projector, and senses the user's operation.

A second detection device for detecting a user's approach may be provided at the refrigerator compartment door disposed at the same side surface as that of the freezer compartment door.

The first detection device and the second detection device may be disposed on the same extension line.

The first detection device and the second detection device may be disposed at side ends which are distant from hinges of the refrigerator compartment door and the freezer compartment door.

A detection distance of the first detection device may be longer than that of the second detection device.

The projector may be turned on when a detection signal is detected from the second detection device.

The door opening device may be turned on when a detection signal is detected from both of the first detection device and the second detection device.

The sensing assembly may be installed at an inclined surface which may be formed at a lower end of the freezer compartment to be inclined toward the bottom surface, and the sensing assembly may emit light and rays from the inclined surface toward the bottom surface.

A switch magnet which is rotated along with the refrigerator compartment door may be provided at the refrigerator compartment door at which the door opening device may be installed, and a reed switch which is selectively switched on and off by the switch magnet according to rotation of the refrigerator compartment door may be provided at one side of the hinge of the refrigerator compartment door which faces the switch magnet.

The sensing assembly may not be driven while the reed switch is switched off.

Still another aspect of the present disclosure provides a method for controlling a refrigerator which includes a refrigerator compartment door at which a second detection device is provided, and a freezer compartment door which is provided at a lower side of the refrigerator compartment door and at which a projector and a second detection device are provided, including recognizing a user's approach by the second detection device; turning on the projector when a signal of the second detection device is input, and projecting an image for inducing a user's operation on a bottom surface; recognizing the user's operation at an area of the image projected on the bottom surface through the first detection device; outputting a signal for opening the door when a signal of the first detection device is input; and turning off the projector.

A door opening device which is driven when the signal for opening the door is output, and pushes the cabinet, and opens the door may be provided at one side of the refrigerator compartment door.

A switch magnet may be provided at the refrigerator compartment door, and a reed switch which is switched on and off by the switch magnet according to rotation of the refrigerator compartment door may be provided at a hinge of the refrigerator compartment door, and the projector and the first detection device may be switched off while the reed switch is switched off.

When the first detection device does not sense the user's operation for a set period of time while the projector is turned on, the projector may be turned off.

Also, a method of opening a door of a refrigerator according to an implementation of the present disclosure includes the steps of detecting a person through a second detection device, projecting an optical pattern through a sensing assembly on a bottom surface at which the refrigerator is placed, determining whether or not the first detection device detects a door opening signal before a reference time passes from a time when the second detection device detects the person or the optical pattern is projected, and opening the door of the refrigerator through a door opening device if it is determined that the first detection device detects the door opening signal.

Also, a virtual switch may be generated on the bottom surface by projecting an optical pattern, and the door opening signal may be one of which a person places a foot at an upward portion of the virtual switch and the person moves the foot at the upward portion of the virtual switch in a predetermined manner.

Further, the door opening device may open the door of the refrigerator when the first detection device detects the door opening signal while the second detection device is continuously detecting a person.

Furthermore, the method may further include the step of terminating the projecting of an optical pattern through the sensing assembly if the first detection device does not detect the door opening signal until the reference time passes from the time when the second detection device detects a person or the optical pattern is projected.

Also, the method may further include the step of terminating the projecting of an optical pattern through the sensing assembly if the second detection device does not detect a person before the reference time passes while the second detection device has detected the person and thus the optical pattern is being projected through the sensing assembly.

Still yet another aspect of the present disclosure provides a method of opening a door of a refrigerator including the steps of detecting a person through a second detection device, projecting one or more optical patterns through one or more sensing assemblies on a bottom surface at which the refrigerator is placed, determining whether or not a first detection device detects a door opening signal for opening one or more doors among a plurality of doors, and opening the one or more doors among the plurality of doors through a door opening device if it is determined that the first detection device detects the door opening signal.

Also, the step of projecting one or more optical patterns may include projecting a plurality of optical patterns through one sensing assembly, wherein the plurality of optical patterns may form a plurality of virtual switches on the bottom surface, and the one or more doors corresponding to one or more occluded virtual switches among the plurality of virtual switches may be opened.

Further, the step of projecting one or more optical patterns may include projecting a plurality of optical patterns through a plurality of sensing assemblies, wherein the plurality of optical patterns may form a plurality of virtual switches on the bottom surface, and the one or more doors corresponding to one or more occluded virtual switches among the plurality of virtual switches may be opened.

Furthermore, the step of projecting one or more optical patterns may include projecting one optical pattern through a sensing assembly, wherein the one optical pattern may form a virtual switch on the bottom surface, and a door to be opened among the plurality of doors may be determined depending on an occlusion pattern of the virtual switch.

Also, the step of detecting a person through the second detection device may include detecting the person through one or more second detection devices, each of which is provided at two or more doors among the plurality of doors.

Still yet another aspect of the present disclosure provides a refrigerator including a cabinet equipped with a refrigerator compartment and a freezer compartment, a plurality of refrigerator compartment doors connected to the cabinet, and configured to open and close the refrigerator compartment, wherein all or some of the plurality of refrigerator compartment doors include a first door and a second door, a plurality of freezer compartment doors connected to the cabinet and configured to open and close the freezer compartment at downward portions of the plurality of refrigerator compartment doors, a second detection device provided at one or more refrigerator compartment doors among the plurality of refrigerator compartment doors and configured to detect a person, a door opening device provided at the one or more refrigerator compartment doors among the plurality of refrigerator compartment doors or the cabinet and configured to have a driving motor, one or more sensing assemblies provided at one or more freezer compartment doors among the plurality of freezer compartment doors and configured to project one or more optical patterns, a first detection device configured to detect an occlusion of one or more virtual switches generated by the one or more optical patterns on a bottom surface, and a controller configured to control the door opening device, wherein the controller activates the door opening device to open one or more doors among the plurality of refrigerator compartment doors and freezer compartment doors when the first detection device detects the occlusion of the one or more virtual switches.

Still yet another aspect of the present disclosure provides a refrigerator including a cabinet equipped with a refrigerator compartment and a freezer compartment, a refrigerator compartment door connected to the cabinet and configured to open and close the refrigerator compartment, a freezer compartment door provided at a lateral side of the refrigerator compartment door and configured to open and close the freezer compartment, a second detection device provided at one or more doors of the refrigerator compartment door and the freezer compartment door and configured to detect a person, a door opening device provided at the one or more doors of the refrigerator compartment door and the freezer compartment door and configured to have a driving motor, one or more sensing assemblies provided at the one or more doors of the refrigerator compartment door and the freezer compartment door and configured to project one or more optical patterns, a first detection device configured to detect an occlusion of one or more virtual switches generated by the one or more optical patterns on a bottom surface, and a controller configured to control the door opening device, wherein the controller activates the door opening device to open the one or more doors among the refrigerator compartment door and the freezer compartment door when the first detection device detects the occlusion of the one or more virtual switches.

Still yet another aspect of the present disclosure provides a refrigerator including a cabinet equipped with a refrigerator compartment and a freezer compartment, a refrigerator compartment door connected to the cabinet and configured to open and close the refrigerator compartment, a freezer compartment door provided at an upward portion of the refrigerator compartment door and configured to open and close the freezer compartment, a second detection device provided at the freezer compartment door and configured to detect a person, a door opening device provided at one or more doors of the refrigerator compartment door and the freezer compartment door or the cabinet, and configured to have a driving motor, one or more sensing assemblies provided at the refrigerator compartment door and configured to project one or more optical patterns, a first detection device configured to detect an occlusion of one or more virtual switches generated by the one or more optical patterns on a bottom surface, and a controller configured to control the door opening device, wherein the controller activates the door opening device to open the one or more doors of the refrigerator compartment door and the freezer compartment door when the first detection device detects the occlusion of the one or more virtual switches.

At least a portion of the one or more virtual switches on the bottom surface may be superposed with the one or more doors of the refrigerator compartment door and the freezer compartment door in upward and downward directions.

Also, the first detection device may be arranged at a position equal to or greater than one-half of a height of the cabinet.

According to one aspect, a refrigerator includes a cabinet defining a storage compartment, a door connected to the cabinet and configured to open and close the storage compartment, the door being configured to rotatably open using an actuator, and a sensor assembly provided at a recessed portion of the refrigerator, the recessed portion extending rearward from a front surface of the refrigerator. The sensor assembly includes a first sensor being configured to detect the user's movement based upon the detection by a second sensor of the user's presence within a predetermined distance, and a projection unit configured to project an image at a ground surface in front of the refrigerator. The refrigerator further includes the second sensor provided at a front side of the refrigerator and configured to detect the presence of the user within the predetermined distance. The door is configured, based upon detection by the first sensor of the user's movement, to be opened by the actuator.

Implementations according to this aspect may include one or more of the following features. For example, at least a portion of the projected image may fall within a detection range of the first sensor. The first sensor may be provided at the front side of the refrigerator at a position that is vertically lower than the second sensor. The actuator may include a driving motor that is positioned within the door. The actuator may be configured to open the door by providing a pushing force on the cabinet. The storage compartment may include a top compartment and a bottom compartment, the door may include a top compartment door configured to cover the top compartment and a bottom compartment door configured to cover the bottom compartment, and the actuator may be configured to open the top compartment door. The second sensor may be provided at the top compartment door. The recessed portion may include an inclined surface that extends rearward and downward from the front surface of the refrigerator, and the sensor assembly may be provided at the inclined surface. The inclined surface may be oriented to form an angle of approximately 20° to 30° relative to the front surface of the refrigerator.

In some implementations, the recessed portion may be formed at the bottom compartment door. The recessed portion may be formed at a lower end of the bottom compartment door. The projection unit may be positioned vertically lower than the first sensor on the inclined surface. The first sensor may be configured to determine whether a part of the user is present between the projected image and the first sensor. In some cases, one or both of the first and second sensors may be a position sensing device that is configured to determine whether the user or a part of the user is present within a detection range of the position sensing device. The first sensor may include a first position sensing device, the detection range of the first position sensing device being less than 15 cm. The second sensor may include a second position sensing device, the detection range of the second position sensing device being between approximately 15 and 100 cm. In some cases, the door may be configured to rotatably open to a preset manual range upon rotation by a user and to rotatably open to a preset automatic range that is less than the preset manual range upon rotation by the actuator. The preset automatic range may be approximately 25°. The preset manual range may be approximately 180° or greater. The projection unit may be configured, based upon earlier of the opening of the door by the actuator or elapsing of a preset time, to stop projecting the image on the ground surface. At least a portion of the projected image may extend rearward of the front surface of the refrigerator.

The details of one or more implementations are set forth in the accompanying drawings and the description below. Other features will be apparent from the description and drawings, and from the claims.

Advantageous Effects

In the refrigerator and the control method for the refrigerator according to the proposed implementation, the following effects may be expected.

In the refrigerator according to the implementation of the present disclosure, since the door opening device is driven through the detection of the sensing assembly provided at the door, and the door is automatically opened even when the user is holding the object in both hands, the user convenience can be enhanced.

And the sensing assembly projects the image on the bottom surface, at which the refrigerator is placed, and induces the user's operation, and detects whether the operation is performed at the area of the projected image through the detection device, and thus enables the door opening device to be driven.

Therefore, the user can perform an easy and reliable door opening operation through an accurate positioning operation.

In particular, the sensing assembly is provided at the freezer compartment door provided at the lower side, and the projected image is located close to the refrigerator, and thus quality of the projected image and detection performance can be enhanced.

Also, the misrecognition due to the animals, the children or other things which go by the refrigerator can be prevented, and thus the door can be prevented from being opened inadvertently.

Also, the image is projected toward the lower side of the inclined surface, and the operation can be easily performed by the free user's foot, and the operation for opening the door can be simply performed while the user is close to the refrigerator.

And since approaching of the user is primarily detected by the second detection device provided at the refrigerator compartment door, and then the projector is turned on, an unnecessary operation of the projector can be prevented.

Also, since the door is opened by the detection of the first detection device after the detection of the second detection device, the door opening operation can be reliably performed, and the misrecognition can be minimized.

And while the door is opened, the reed switch is switched off, and the projector and the first detection device are not activated, and thus the unnecessary door opening operation is not performed while the door is already opened.

And while the aspheric lens is removed, and the number of lenses for regulating a focus is reduced, the projector can project the quality of image, which can be recognized by the user, through arrangement of the film and regulation of the projecting distance.

Therefore, the entire length of the projector can be shortened, and the projector can have a structure which can be installed at the freezer compartment door having a restricted width due to the insulation.

In particular, the sensing assembly may be installed at the inclined surface, and disposed to be inclined with respect to the ground at the inside of the door, and thus can be effectively installed at the inside the door having the restricted width.

And the characters formed at the film of the projector may be formed by a printing, and have high resolution, and thus the characters on the image formed on the bottom surface can be clearly indicated, and also the user's convenience can be enhanced.

Also, when the characters formed on the film are printed, a rate of the width is adjusted in consideration of the shape of the image formed to be inclined on the bottom surface, and thus the image can be apparently and clearly formed even when being projected in an inclined direction, and thus the user's convenience can be further enhanced.

And, in the sensing assembly, the sensing assembly and the projector can be formed in one module, and thus the productivity can be enhanced and the assembly work can be simplified, thereby improving assemblability.

Also, the sensing assembly having a minimized volume can be disposed at the inside of the door having a restricted space, and thus space arrangement can be efficiently disposed, and the insulation performance can be prevented from being degraded.

DESCRIPTION OF DRAWINGS

FIG. 1 is a perspective view of a refrigerator according to a first implementation of the present disclosure.

FIG. 2 is a front view illustrating a state in which all doors of the refrigerator are opened.

FIG. 3 is a perspective view illustrating a state in which a sub-door of the refrigerator is opened.

FIG. 4 is an exploded perspective view illustrating a state in which a main door and the sub-door are separated from each other.

FIG. 5 is an exploded perspective view illustrating an installation structure of a door opening device according to the first implementation of the present disclosure.

FIG. 6 is a perspective view of the door opening device when being seen from a lower side.

FIG. 7 is an exploded perspective view of the door opening device.

FIG. 8 is a view illustrating a state of the door opening device when the door is closed.

FIG. 9 is a view illustrating the state of the door opening device when the door is opened.

FIG. 10 is a perspective view of the sub-door.

FIG. 11 is an exploded perspective view of a lower portion of the sub-door.

FIG. 12 is a longitudinal cross-sectional view of the sub-door.

FIG. 13 is a perspective view of a freezer compartment door according to the first implementation of the present disclosure.

FIG. 14 is an exploded perspective view of the freezer compartment door.

FIGS. 15A to 15E are views sequentially illustrating a molding process of an outer plate of the freezer compartment door.

FIG. 16 is a partial perspective view of the freezer compartment door/FIG. 17 is an exploded perspective view illustrating a coupling structure of a door plate, a lower decoration and a covering member.

FIG. 18 is a partially cut-away perspective view illustrating a coupling state of the door plate, the lower decoration and the covering member.

FIG. 19 is a cross-sectional view taken along line 19-19' of FIG. 13.

FIG. 20 is a perspective view of the lower decoration of the freezer compartment door when being seen from a front.

FIG. 21 is a perspective view of the lower decoration when being seen from an upper side.

FIG. 22 is a partial perspective view of a sensing assembly installation part of a lower decoration.

FIG. 23 is a perspective view of a sensing assembly according to the first implementation of the present disclosure when being seen from a front.

FIG. 24 is a perspective view of the sensing assembly when being seen from a rear.

FIG. 25 is an exploded perspective view of the sensing assembly when being seen from one direction.

FIG. 26 is an exploded perspective view of the sensing assembly when being seen from another direction.

FIG. 27 is a longitudinal cross-sectional view of the sensing assembly.

FIGS. 28A to 28C are views illustrating an installation process of the sensing assembly.

FIG. 29 is a view illustrating an image projecting state through a projector of the sensing assembly.

FIG. 30 is an enlarged view of an A area of FIG. 29.

FIG. 31 is a view illustrating a detection area and an image projecting area by the sensing assembly.

FIG. 32 is a block diagram illustrating a flow of a control signal of the refrigerator.

FIGS. 33A and 33B are views illustrating an opening operation state of the main door.

FIG. 34 is a flowchart sequentially illustrating an operation of the door opening device.

FIG. 35 is a flowchart sequentially illustrating an initial operation of the door opening device.

FIG. 36 is a flowchart sequentially illustrating a standby operation of the door opening device.

FIG. 37 is a flowchart sequentially illustrating an opening operation of the door opening device.

FIG. 38 is a view illustrating a duty change according to an FG pulse count during the opening operation.

FIG. 39 is a flowchart sequentially illustrating a stopping operation after opening of the door opening device.

FIG. 40 is a flowchart sequentially illustrating a returning operation of the door opening device.

FIG. 41 is a view illustrating a duty change during the returning operation according to the FG pulse count.

FIG. 42 is a flowchart sequentially illustrating an emergency returning operation of the door opening device.

FIG. 43 is a view illustrating a duty change according to the FG pulse count during the emergency returning operation.

FIG. 44 is a perspective view of a refrigerator according to a second implementation.

FIG. 45 is a lateral view of the refrigerator shown in FIG. 44.

FIG. 46 is a block diagram of the refrigerator according to the second implementation.

FIG. 47 is a cross-sectional view illustrating a refrigerator compartment door according to the second implementation.

FIG. 48 is a flowchart illustrating an opening method of a door of the refrigerator according to the second implementation.

FIG. 49 is a view illustrating a state in which a person holding food and drink in both hands is approaching the refrigerator.

FIG. 50 is a view illustrating a foot of a person positioned at an upward portion of a virtual switch.

FIG. 51 is a view illustrating an opening state of a second door according to the second implementation.

FIG. 52 is a view illustrating a refrigerator according to a third implementation.

FIG. 53 is a view illustrating a refrigerator according to a fourth implementation.

FIG. 54 is a view illustrating a refrigerator according to a fifth implementation.

FIG. 55 is a view illustrating a refrigerator according to a sixth implementation.

FIG. 56 is a view illustrating a refrigerator according to a seventh implementation.

FIG. 57 is a view illustrating a refrigerator according to an eighth implementation.

FIG. 58 is a view illustrating a refrigerator according to a ninth implementation.

FIG. 59 is a view illustrating a refrigerator according to a tenth implementation.

DETAILED DESCRIPTION

Hereinafter, exemplary implementations of the present disclosure will be described in detail with reference to the accompanying drawings. However, the disclosure may, however, be implemented in many different forms and should not be construed as being limited to the implementations set forth herein; rather, alternative implementations included in other retrogressive disclosures or falling within the spirit and scope of the present disclosure can easily be derived through adding, altering, and removing, and will fully convey the concept of the disclosure to those skilled in the art.

FIG. 1 is a perspective view of a refrigerator according to a first implementation of the present disclosure. And FIG. 2 is a front view illustrating a state in which all doors of the refrigerator are opened. And FIG. 3 is a perspective view illustrating a state in which a sub-door of the refrigerator is opened.

As illustrated in the drawings, an exterior of a refrigerator 1 according to an implementation of the present disclosure may be formed by a cabinet 10 which forms a storage space, and a door which opens and closes the storage space.

An inside of the cabinet 10 may be vertically divided by a barrier 11, and a refrigerator compartment 12 may be formed at an upper portion of the cabinet 10, and a freezer compartment 13 may be formed at a lower portion of the cabinet 10.

And various accommodation members 121 such as a shelf, a drawer and a basket may be provided inside the refrigerator compartment 12. A main lighting unit 85 which illuminates the refrigerator compartment 12 may be provided at the refrigerator compartment 12. The main lighting unit 85 may be disposed at the freezer compartment 13, and may also be disposed at any positions of an inner wall surface of the refrigerator 1.

A drawer type freezer compartment accommodation member 131 which is inserted into and withdrawn from the freezer compartment 13 may be mainly disposed inside the freezer compartment 13. The freezer compartment accommodation member 131 may be formed to be inserted and withdrawn, interlocking with opening of a freezer compartment door 30. And a first detection device 92 which detects a user's body may be provided at a front surface of the freezer compartment door 30. Detailed description of the first detection device 92 will be described again below.

The door may include a refrigerator compartment door 20 and the freezer compartment door 30. The refrigerator compartment door 20 serves to open and close an open front surface of the refrigerator compartment 12 by rotation, and the freezer compartment door 30 serves to open and close an open front surface of the freezer compartment 13 by rotation. And one pair of the refrigerator compartment door 20 and the freezer compartment door 30 may be provided left and right to shield the refrigerator compartment 12 and the freezer compartment 13.

A plurality of door baskets may be provided at the refrigerator compartment door 20 and the freezer compartment door 30. The door baskets may be provided so as not to interfere with the accommodation members 121 and 131 while the refrigerator compartment door 20 and the freezer compartment door 30 are closed.

Meanwhile, the implementation of the present disclosure describes an example in which a French type door opening and closing one space by rotating one pair of doors disposed in parallel is applied to a bottom freezer type refrigerator having the freezer compartment provided at a lower side thereof. However, the present disclosure may be applied to all types of refrigerators having the door.

An exterior of each of the refrigerator compartment door 20 and the freezer compartment door 30 may be formed of a metallic material, and the entire refrigerator 1 may have a metallic texture. And if necessary, a dispenser which dispenses water or ice may be provided at the refrigerator compartment door 20.

Meanwhile, a right one (in FIG. 1) of the pair of refrigerator compartment doors 20 may be formed to be doubly opened and closed. Specifically, the right refrigerator compartment door 20 may include a main door 40 which may be formed of the metallic material to open and close the refrigerator compartment 12, and a sub-door 50 which may be rotatably disposed inside the main door 40 to open and close an opening of the main door 40.

The main door 40 may be formed to have the same size as that of a left one (in FIG. 1) of the pair of refrigerator compartment doors 20, may be rotatably installed at the cabinet 10 by a main hinge 401 and a middle hinge 402, and thus may open and close a part of the refrigerator compartment 12.

And an opening part 403 which is opened to have a predetermined size may be formed at the main door 40. A door basket 404 may be installed at a rear surface of the main door 40 including an inside of the opening part 403. Therefore, a user may have access to the door basket 404 through the opening part 403 without opening of the main door 40.

At this point, the size of the opening part 403 may correspond to most of a front surface of the main door 40 except a part of a perimeter of the main door 40.

The sub-door 50 is rotatably installed inside the opening part 403, and opens and closes the opening part 403. And at least a part of the sub-door 50 may be formed of a transparent material like glass. Therefore, even while the sub-door 50 is closed, it can be possible to see through the inside of the opening part 403. The sub-door 50 may be referred to as a see-through door.

Meanwhile, a front surface of the sub-door 50 may be formed to have a controllable light transmittance and reflectivity, and thus may be selectively changed into a transparent or opaque state according to a user's operation. And a door lighting unit 49 which emits light toward the inside of the opening part 403 may be provided at an upper portion of the main door 40, and may be turned on/off by the user.

When there are not any operations while all of the main door 40 and the sub-door 50 are closed, the door lighting unit 49 and the main lighting unit 85 are maintained in an OFF state. In this state, light outside the refrigerator 1 is reflected on the front surface of the sub-door 40, and the sub-door 50 may have an opaque black color or may be in a state like a mirror surface. Therefore, an accommodation space of the main door 40 and an internal space of the refrigerator compartment 12 are not visible.

Therefore, the sub-door 50 may provide a beautiful and simple exterior having a mirror like texture to the refrigerator 1. Also, the exterior may harmonize with the metallic texture of the main door 40, the refrigerator compartment door 20 and the freezer compartment door 30, and thus may provide a more luxurious image.

However, in a state in which all of the main door 40 and the sub-door 50 are closed, the door lighting unit 49 or the main lighting unit 85 is turned on by a user's certain operation. While the door lighting unit 49 or the main lighting unit 85 is turned on, an inside of the refrigerator 1 becomes bright, and light inside the refrigerator 1 may be transmitted through the sub-door 50, and thus the sub-door 50 may become transparent.

When the sub-door 50 is in the transparent state, the accommodation space of the main door 40 and the internal space of the refrigerator compartment 12 may be visible. Therefore, the user may confirm an accommodation state of food in the accommodation space of the main door 40 and the internal space of the refrigerator compartment 12 without opening of the main door 40 and the sub-door 50.

Also, when the sub-door 50 is in the transparent state, a display unit 60 disposed at a rear of the sub-door 50 is in a visible state, and an operation state of the refrigerator 1 may be displayed to an outside.

FIG. 4 is an exploded perspective view illustrating a state in which the main door and the sub-door are separated from each other.

As illustrated in the drawing, an external appearance of the main door 40 may be formed by an outer plate 41, a door liner 42 and door cap decorations 45 and 46.

The outer plate 41 may be formed of a plate-shaped stainless material, and may be formed to be bent and thus to form a part of a front surface and a perimeter surface of the main door 40.

The door liner 42 may be injection-molded with a plastic material, and forms the rear surface of the main door 40. And the door liner 42 may form a space which is in communication with the opening part 403, and may have a plurality of door dikes and an uneven structure formed at a perimeter thereof so that the door basket 404 is installed.

A rear gasket 44 may be provided at a perimeter of a rear surface of the door liner 42. The rear gasket 44 is in close contact with a perimeter of the cabinet 10, and prevents a leak of cooling air between the main door 40 and the cabinet 10.

The upper cap decoration 45 and the lower cap decoration 46 form an upper surface and a lower surface of the main door 40. And a hinge installation part 451 which enables the main door 40 to be rotatably installed at the cabinet 10 may be formed at each of the upper cap decoration 45 and the lower cap decoration 46. Therefore, an upper end and a lower end of the main door 40 are rotatably supported by the main hinge 401 and the middle hinge 402, respectively.

And a door handle 462 may be formed to be recessed from the lower surface of the main door 40, i.e., the lower cap decoration 46. The user may put a hand into the door handle 462, may rotate the main door 40, and thus may open and close the refrigerator compartment 12.

Meanwhile, a door frame 43 may be further provided between the outer plate 41 and the door liner 42, and may form a perimeter of the opening part 403.

In a state in which the outer plate 41, the door liner 42, the door frame 43, and the cap decorations 45 and 46 are coupled with each other, a foaming solution may be filled inside an internal space of the main door 40, and thus an insulation may be formed therein. That is, the insulation may be disposed at a perimeter area of the opening part 403, and thus isolate a space inside the refrigerator 1 from a space outside the refrigerator 1.

A hinge hole 433 in which each of sub-hinges 51 and 52 for installing the sub-door 50 is installed may be formed at each of both sides of the door frame 43. The hinge hole 433 may be formed at a position which faces a side surface of the sub-door 50, and also formed so that each of the sub-hinges 51 and 52 is inserted therein.

The sub-hinges 51 and 52 may include an upper hinge 51 and a lower hinge 52 which are installed at an upper end and a lower end of the sub-door 50. The sub-hinges 51 and 52 may be formed at the upper end and the lower end of the sub-door 50 to be recessed, such that the upper hinge 51 and the lower hinge 52 may be installed therein. And the upper hinge 51 and the lower hinge 52 may extend laterally toward the hinge hole 433, and may be coupled at an inside of the main door 40.

Therefore, there is not an interfering structure with the sub-hinges 51 and 52 at a gap between the main door 40 and the sub-door 50. And a distance between the main door 40 and the sub-door 50 may be maintained in a narrow state, and the exterior may be further enhanced. As described above, the interference with the main door 40 upon the rotation of the sub-door 50 may be prevented, while the distance between the main door 40 and the sub-door 50 is maintained in the narrow state.

And a hinge cover 53 which shields the upper hinge 51 and guides access of an electric wire of the sub-door 50 toward the main door 40 may be further provided at an upper side of the upper hinge 51.

Meanwhile, the display unit 60 may be provided at the opening part 403. The display unit 60 serves to display an operation state of the refrigerator 1 and also to operate the refrigerator 1, and may be formed to be seen from an outside through the sub-door 50 by the user when the sub-door 50 is in the transparent state. That is, the display unit 60 is not exposed to the outside while the sub-door 50 is in the opaque state, and may display a variety of information to the outside while the sub-door 50 is in the transparent state.

Of course, the display unit 60 may include a display 61 which displays state information of the refrigerator 1, and various operating buttons 62 which set the operation of the refrigerator 1. The operation of the refrigerator 1 may be operated by the operating buttons 62.

The display unit 60 may be separably provided at a lower end of the opening part 403. Therefore, when it is necessary to check or repair the display unit 60, the display unit 60 may be separated. And after the main door 40 is assembled, the display unit 60 which is assembled as a separate module may be simply installed. Also, the display unit 60 which has a necessary function according to a specification of the refrigerator 1 may be selectively installed.

To install and separate the display unit 60, a display installing protrusion 435 which is coupled to a display guide 634 provided at a side surface of the display unit 60 may be formed at both inner side surfaces of the opening part 403. And a display connection part 436 for electrical connection with the display unit 60 may be provided at the lower end of the opening part 403.

The upper cap decoration 45 is provided at an upper end of the main door 40, and an opening device accommodation part 452 (in FIG. 5) may be formed at the upper cap decoration 45 to be recessed downward. The opening device accommodation part 452 may be shielded by a cap decoration cover 453.

FIG. 5 is an exploded perspective view illustrating an installation structure of a door opening device according to the first implementation of the present disclosure. And FIG. 6 is a perspective view of the door opening device when being seen from a lower side. And FIG. 7 is an exploded perspective view of the door opening device.

As illustrated in the drawings, the opening device accommodation part 452 can be formed at the upper cap decoration 45 which forms the upper surface of the main door 40. And a door opening device 70 may be provided inside the opening device accommodation part 452. An open upper surface of the opening device accommodation part 452 is shielded by the cap decoration cover 453. A rod hole 4511 which is oriented toward the cabinet 10 may be formed at an inner side surface of the opening device accommodation part 452.

The door opening device 70 for automatically opening the main door 40 may be accommodated inside the opening device accommodation part 452, and may be formed to be shielded by the cap decoration cover 453.

The door opening device 70 may include an upper case 71 and a lower case 72 which form an external appearance thereof. A driving motor 73 and a plurality of gears may be installed at the upper case 71 and the lower case 72, and a push rod 77 which is moved by the plurality of gears may push the cabinet 10 and thus may open the main door 40.

The implementation of the present disclosure describes an example in which the door opening device 70 is provided at the upper end of the main door 40. However, the door opening device 70 may be provided at the sub-door 50 and the freezer compartment door 30, and may be formed to automatically open the sub-door 50 and the freezer compartment door 30.

The upper case 71 and the lower case 72 form the external appearance of an upper portion and a lower portion of the door opening device 70. And a space in which the plurality of gears and the push rod 77 are disposed may be provided by coupling the upper case 71 and the lower case 72 to each other.

Ring installation parts 721 in which a plurality of mounting rings 722 are installed may be formed at an outside of the lower case 72. The mounting ring 722 serves to support the lower case 72 and to enable the lower case 72 to be seated inside the opening device accommodation part 452, and may be formed of a silicone material. Therefore, vibration generated when the door opening device 70 is driven may be attenuated, and thus a noise may be prevented.

The mounting ring 722 may be formed so that a ring boss 454 inside the opening device accommodation part 452 passes therethrough. And a screw which passes through the upper case 71 is fastened to the ring boss 454, and thus the upper case 71 and the lower case 72 may be coupled to each other, and the lower case 72 may also be installed and fixed to an inside of the opening device accommodation part 452.

The driving motor 73 may be installed at a lower surface of the lower case 72. The driving motor 73 may be a BLDC type motor which is rotated normally or reversely. Other types of actuators may be used. Since the BLDC type motor is used as the driving motor 73, a speed of the driving motor 73 may be variably controlled by counting a frequency generating (FG) signal.

Therefore, when the door opening device 70 is driven, a shock generated when the main door 40 is opened and closed may be relieved through controlling of the speed. In an emergency situation, emergency return of the push rod 77 or the like may be allowed. The implementation of the present disclosure will describe an example of the BLDC motor in which three hall sensors are provided and three FGs are counted during one revolution.

The driving motor 73 may be installed at the lower surface of the lower case 72, and a rotating shaft 731 of the driving motor 73 extends to an inside of the lower case 72, and a motor pinion 732 may be provided at the rotating shaft 731 of the driving motor 73. The motor pinion 732 is provided at an internal space of the lower case 72, and may be coupled to a first reduction gear 751.

An opening device PCB 74 may be provided at the lower surface of the lower case 72. The opening device PCB 74 may be installed at the lower surface of the lower case 72, and may be installed under the push rod 77.

The opening device PCB 74 serves to control the driving motor 73. A first hall sensor 741 and a second hall sensor 742 may be provided at the opening device PCB 74. The first hall sensor 741 is provided at a position at which a magnet 774 provided at the push rod 77 is detected when the push rod 77 is completely inserted therein. And the second hall sensor 742 is provided at a position at which the magnet 774 provided at the push rod 77 is detected when the push rod 77 is completely withdrawn therefrom. Therefore, the driving motor 73 may be controlled by the opening device PCB 74 according to detection signals of the first hall sensor 741 and the second hall sensor 742.

The plurality of gears may be disposed in the lower case 72 to be engaged with each other, and may be installed by a shaft 723 so as to be rotated between the lower case 72 and the upper case 71. The plurality of gears include reduction gears 75 and dummy gears 76. The reduction gears 75 may reduce a rotating speed, and then may transmit a force for driving the push rod 77. And the dummy gear 76 serves to ensure a withdrawing distance of the push rod 77, and a contact position with the push rod 77 may be moved by combination of the dummy gears 76.

Specifically, the motor pinion 732 is coupled to the first reduction gear 751. The first reduction gear 751 is a gear which is coupled to the motor pinion 732 having the highest rotating speed, and thus there is the highest probability that the noise is generated. Therefore, the motor pinion 732 and the first reduction gear 751 may be formed of an elastomer material having excellent mechanical strength and elastic recovery rate and high thermal resistance. Therefore, the noise between the motor pinion 732 and the first reduction gear 751 may be reduced while the mechanical strength required in the motor pinion 732 and the first reduction gear 751 is satisfied. The remaining gears may be formed of an engineering plastic material (POM).

The first reduction gear 751 may be connected with a second reduction gear 752, the second reduction gear 752 may be connected with a third reduction gear 753, and the third reduction gear 753 may be connected with a fourth reduction gear 754 sequentially. Like a general reduction gear, the reduction gears 75 have a structure in which an input side and an output side thereof are arranged vertically in two stages, and may be formed so that the input side and the output side are in contact with another adjacent gear so as to reduce the speed.

An RPM may be controlled through combination of the plurality of reduction gears 75, and a force transmitted to the push rod 77 may be controlled through the controlling of the RPM. Of course, the number of reduction gears 75 may be adjusted as needed.

A first dummy gear 761 is disposed at the fourth reduction gear 754, and the first dummy gear 761 and the push rod 77 may be connected by a second dummy gear 762. Each of the dummy gears 76 may have a general spur gear shape, and may be formed to simply transmit a force of the fourth reduction gear 754 to the push rod 77 and also to ensure a maximum withdrawing distance of the push rod 77 by controlling a contact distance with the push rod 77. To this end, the dummy gears 76 may include a plurality of gears having different sizes.

Specifically, due to a structural characteristic of the lower case 72 provided inside the cap decoration 45, a width of the lower case 72 is limited. Therefore, a size of each of the reduction gears 75 disposed inside the lower case 72 is also limited. In addition, a length of the push rod 77 is also limited due to its structure characteristic in which the push rod 77 is inserted or withdrawn inside the lower case 72.

In this state, the reduction gears 75 have the two-stage structure having the input side and the output side. Therefore, the sizes thereof are limited to a predetermined size or more. When the fourth reduction gear 754 is directly connected to the push rod 77, a contact point between the fourth reduction gear 754 and the push rod 77 is located at a position which is distant from the main door 40 due to a diameter of the fourth reduction gear 754, and the sufficient withdrawing distance of the push rod 77 may not be ensured.

A position of the contact point for transmitting power of the push rod 77 should be arranged in a withdrawing direction of the push rod 77 when possible, and also should be located at a position which is close to the rear surface of the main door 40. To this end, the dummy gears 76 may be arranged between the fourth reduction gear 754 and the push rod 77.

When the dummy gears 76 become bigger within a limited space, the position of the contact point with the push rod 77 is distant from the rear surface of the main door 40. Therefore, the power of the fourth reduction gear 754 is transmitted to the push rod 77 using a plurality of dummy gears 76 having small sizes. That is, the power of the fourth reduction gear 754 may be transmitted to the push rod 77 using the first dummy gear 761 and the second dummy gear 762.

At this point, a size of the second dummy gear 762 which is in contact with the push rod 77 may be formed smaller than that of the first dummy gear 761, and may be in contact with the push rod 77 at a position as close as possible to the rear surface of the main door 40. And a part of the lower case 72 at which the second dummy gear 762 is located may be recessed outward, and thus a position of the second dummy gear 762 is located as close as possible to a side of the cabinet 10.

The push rod 77 may push the cabinet 10, and may open the main door 40. And the push rod 77 may be installed inside the lower case 72, and a rack 771 may be formed at an outer surface of the push rod 77 so as to be coupled to the second dummy gear 762. Therefore, due to rotation of the dummy gears 76, the rack 771 may pass through the rod hole 4511, and then may protrude.

The push rod 77 may be formed smaller than a width of the upper cap decoration 45, and may also be formed to have a length which may ensure the withdrawing distance of the main door 40. And the push rod 77 may be formed to extend with a predetermined curvature. Therefore, the push rod 77 may be maintained in a contacting state with a predetermined point of a front surface of the cabinet 10 even when the main door 40 is rotated. Therefore, even when the main door 40 is rotated, the push rod 77 may be prevented from being slipped, and may push one point of the cabinet 10, and thus may open the main door 40.

A rod cap 78 may be formed at a front end of the push rod 77. The rod cap 78 may be formed of rubber or an elastic material, and may be in contact with the cabinet 10, may prevent generation of the noise when the push rod 77 is in contact with the cabinet 10, may enhance a contacting force, and thus may effectively transmit a push force of the push rod 77 to the cabinet 10.

Also, a size of the outer surface of the push rod 77 may be formed equal to or larger than that of the rod hole 4511. Therefore, the rod cap 78 may be formed to shield the rod hole 4511 while the push rod 77 is completely inserted.

A guide groove 772 may be formed at an upper surface and a lower surface of the push rod 77. The guide groove 772 may be formed along an extending shape of the push rod 77, and may also be formed to have the same curvature as that of the push rod 77.

Guide protrusions 714 and 724 which are inserted into the guide grooves 772 may be formed at the lower case 72 and the upper case 71. Since the guide protrusions 714 and 724 are also formed to have the same curvature as that of the push rod 77, the push rod 77 is moved along the guide protrusions 714 and 724 upon the inserting and withdrawing of the push rod 77. Accordingly, when the push rod 77 is inserted and withdrawn, the guide protrusions 714 and 724 may be maintained in an inserted state into the guide grooves 772, and thus the push rod 77 may be prevented from being moved. And since the movement of the push rod 77 is prevented, the push rod 77 may be maintained in an stably engaged state with the second dummy gear 762 even upon the inserting and withdrawing thereof.

A magnet installation part 773 which accommodates the magnet 774 may be formed at a rear end of the push rod 77. The magnet installation part 773 may be located just above the first hall sensor 741 in a state in which the push rod 77 is completed inserted. And the magnet installation part 773 may be located just above the second hall sensor 742 in a state in which the push rod 77 is completed withdrawn. Therefore, when the push rod 77 is inserted and withdrawn, a motion of the push rod 77 may be detected through the first hall sensor 741 and the second hall sensor 742 of the opening device PCB 74.

Meanwhile, a switch magnet 455 may be provided at the opening device accommodation part 452. The switch magnet 455 may be installed and fixed inside the opening device accommodation part 452 which is in contact with the hinge installation part 451. And a reed switch 4011 may be provided at the main hinge 401 which is installed at the hinge installation part 451. The main hinge 401 at which the reed switch 4011 is installed includes the hinge which may be formed of a metallic material and substantially fixes the main door 40, and the hinge cover which shields the main hinge 401.

The reed switch 4011 may be provided at the main hinge 401, and maintains a fixed position even when the main door 40 is rotated. And the switch magnet 455 is rotated together when the main door 40 is rotated.

Therefore, while the main door 40 is closed, the reed switch 4011 is switched on by the switch magnet 455, and the switch magnet 455 becomes distant at a moment when the main door 40 is opened, and thus the reed switch is switched off Like this, it may be determined whether the main door 40 is opened or closed according to the ON/OFF of the reed switch 4011, and driving of the door opening device 70 may be controlled according to the opening and closing of the main door 40.

That is, since the reed switch 4011 is switched off in a state in which the main door 40 is opened, the driving motor 73 is not operated even when an opening signal of the door opening device 70 is input, while the main door 40 is opened.

FIG. 8 is a view illustrating a state of the door opening device when the door is closed.

As illustrated in the drawing, while the main door 40 is closed, the switch magnet 455 is located at a position which faces the reed switch 4011, and thus the reed switch 4011 is maintained in an ON state.

And the push rod 77 is in a completely inserted state. In this state, the magnet 774 is located above the first hall sensor 741, and thus the first hall sensor 741 is in the ON state. That is, while a user's operation is not provided, the reed switch 4011 and the first hall sensor 741 are maintained in the ON state, and the driving motor 73 is not rotated.

In a state in which the push rod 77 is completely inserted, the rod cap 78 shields the rod hole 4511, and an end of the push rod 77 is spaced apart from the front surface of the cabinet 10.

In this state, when the user performs an operation for operating the door opening device 70, the opening signal of the main door 40 is input, and the driving motor 73 starts to be driven while being normally rotated. A force generated by the driving of the driving motor 73 is transmitted to the push rod 77 by the reduction gears 75 and the dummy gears 76, and the push rod 77 is moved toward the cabinet 10.

The end of the push rod 77 is in contact with the cabinet 10 by movement of the push rod 77. And the push rod 77 is continuously moved in a contacting state with the cabinet 10. The push rod 77 pushes the cabinet 10, and thus the main door 40 is gradually opened.

FIG. 9 is a view illustrating the state of the door opening device when the door is opened.

As illustrated in the drawing, while the push rod 77 is completely withdrawn, the magnet 774 is located at the second hall sensor 742. When the second hall sensor 742 is turned on, the opening device PCB 74 determines that the main door 40 is rotated at a preset angle, and thus may stop the driving of the driving motor 73.

In this state, the main door 40 is opened at a predetermined angle, or preset automatic range, and thus the user may put his/her elbow therein, and may rotate the main door 40. That is, in a state in which the user is holding an object, and thus may not open the main door 40 with his/her hand, the user may further open the main door 40 using the elbow or a part of his/her body to the preset manual range.

For example, by the operation of the door opening device 70, the main door 40 may be opened so that a distance D between the rear surface of the main door 40 and a front surface of the adjacent refrigerator compartment door 20 is about 70 mm to 80 mm. At this point, a rotating angle of the main door 40 may be 24° to 26°, for example 25°. In some cases, the automatic rotating range of the main door 40 may depend on a distance between the user and the main door 40. For example, the rotating angle to which the door is rotated open may be increased beyond 26° if the user is standing farther away from the refrigerator. During this manual opening operation, the door can be opened to its full manual range, for example 180° or greater.

And the open main door 40 may be closed after the food is completely accommodated. Then, when a preset time passes, the driving motor 73 may be rotated reversely, and thus the push rod 77 which is in a withdrawn state may be automatically returned, and thus may be in a state illustrated in FIG. 8. And even in the case in which an obstacle is detected when the main door 40 is opened, or an external force is exerted while the main door 40 is opened, the driving motor may be reversely rotated, and thus the push rod 77 may be returned.

Meanwhile, when the user further opens the main door 40 after the main door 40 is opened, and thus the reed switch 4011 is switched off, the user may close the main door 40 before the preset time passes. In this case, the push rod 77 may be rapidly returned, and thus may be prevented from colliding with the cabinet 10 and being broken.

FIG. 10 is a perspective view of the sub-door. And FIG. 11 is an exploded perspective view of a lower portion of the sub-door. And FIG. 12 is a longitudinal cross-sectional view of the sub-door.

As illustrated in the drawings, the sub-door 50 may be formed in a shape corresponding to that of the opening part 403. And the sub-door 50 may be rotatably installed at the main door 40 by the sub-hinges 51 and 52 to open and close the opening part 403.

A panel assembly 54 which may be formed by stacking a plurality of glass layers at regular intervals is provided at the sub-door 50, and an inside of the refrigerator 1 may be selectively seen through the panel assembly 54. The panel assembly 54 may be formed so that the plurality of glass layers are arranged to be spaced apart from each other and thus to form an insulation layer. One of the plurality of glass layers which forms the front surface of the sub-door 50 may be formed of a half glass material to selectively see through the inside of the refrigerator 1. The insulation may be formed at a perimeter of the panel assembly 54, and thus may insulate an outer area of the panel assembly 54.

Side frames 55 and 56 which form both side surfaces of the sub-door 50 are provided at both sides of the panel assembly 54. A handle 561 of the sub-door 50 may be formed at one side frame 56 to be recessed, and the sub-hinges 51 and 52 may be fixed to the other side frame 55.

Sub-cap decorations 57 and 58 may be provided at upper and lower portions of the panel assembly 54. The sub-cap decorations 57 and 58 form an upper surface and a lower surface of the sub-door 50, is coupled to the side frames 55 and 56, and form a perimeter of the sub-door 50. The sub-hinges 51 and 52 may be installed at the sub-cap decorations 57 and 58 provided at the upper and lower ends of the sub-door 50, respectively.

A detection device accommodation part 582 at which a second detection device 81 and a knock detection device 82 are installed may be formed at the sub-cap decoration 58 which forms the lower surface of the sub-door 50. The detection device accommodation part 582 may be shielded by an accommodation part cover 583.

The second detection device 81 which may be installed at the sub-cap decoration 58 is a device which checks a user' approach, and the knock detection device 82 is a device which detects the user's knocking operation on the sub-door 50. The second detection device 81 and the knock detection device 82 may be attached to a rear surface of a front panel 541 which forms a front surface of the panel assembly 54.

A bezel 5411 may be formed along a perimeter of the rear surface of the front panel 541. The second detection device 81 and the knock detection device 82 may be disposed at the bezel 5411 which is formed at a lower end of the front panel 541. Therefore, when being seen from an outside of the refrigerator 1, the second detection device 81 and the knock detection device 82 may be disposed to be hidden. At this point, a part of the bezel 5411 located at a portion at which the second detection device 81 is disposed is removed, and thus infrared light may be easily transmitted and received.

The second detection device 81 may be located on an extension line of the first detection device 92, and may be arranged vertically with the first detection device 92. And an installation height of the second detection device 81 corresponds to the lower end of the sub-door 50, and thus an ordinary adult may be detected, but a child having a small height, an animal, or other things smaller than the height of the second detection device 81 may not be detected.

A position sensing device (PSD) may be used as the second detection device 81. That is, the second detection device 81 may be formed so that the infrared light is emitted from a light emitting part 811, an angle of the reflected light is measured by a light receiving part, and thus a position of the user is recognized. An approach distance which is detected by the PSD may be set, and a detectable distance of the second detection device 81 may be less than 1 m, for example between 15 cm and 100 cm, and thus, when the user is located within a distance of 1 m from the front surface of the refrigerator 1, it may be recognized that the user is located at a front of the refrigerator 1 to operate the refrigerator 1.

Like the knock detection device 82, an installation position of the second detection device 81 corresponds to the lower end of the sub-door 50 located at an upper side. Since the installation position corresponds to a height of about 1 m from a floor, the child having the small height or other things having the low height may not be detected.

A pressing member 813 may be further provided at a rear of the second detection device 81. The pressing member 813 may be formed to press the second detection device 81 so that the second detection device 81 is fixed to the detection device accommodation part 582, and also the second detection device 81 is in close contact with the front panel 541.

The knock detection device 82 may be formed to recognize whether the user knocks on the front panel 541 of the sub-door 50. A certain operation of the refrigerator 1 may be indicated by a knocking operation detected by the knock detection device 82. For example, the door lighting unit 49 may be turned on by the user's knocking operation, and thus the sub-door 50 may become transparent.

The knock detection device 82 is located at an edge of the front panel 541, but an effective input part for the user's knocking operation is not limited thereto. The knock detection device 82 includes a microphone which detects a sound wave generated by vibration, instead of the vibration itself. Therefore, in a state in which the knock detection device 82 is in close contact with a medium at which the vibration is generated by the knocking operation, even though the knocking operation is applied to any positions, the sound wave may be transmitted through the continuous same medium, and may be effectively detected. And a position of the knock detection device 82 may be disposed at one end at which the electric wires may be arranged and a visible area of the sub-door 50 may also be maximized.

That is, an area to which a user's knocking input is applied may be an entire area which is defined by the front surface of the front panel 541. Most of the front panel 541 except a boundary portion thereof is a see-through area which selectively becomes transparent, and the knock detection device 82 may not be disposed thereat.

Therefore, it is preferable that the knock detection device 82 be located at the area of the bezel 5411 in the front panel 541. In particular, the bezel 5411 located at an upper end and left and right sides of the front panel 541 may be minimized by locating the knock detection device 82 at the lower end of the front panel 541 rather than both of the left and right sides thereof. By such a shape of the bezel 5411, the see-through area may be expanded. Since the knock detection device 82 is located at the lower end of the front panel 541 on which a user's eyes are relatively less focused, a wider see-through area may be provided to the user.

Since the knock detection device 82 is located at the area of the bezel 5411, is not exposed to an outside, and has a structure which is in close contact with the front panel 541, the user's knocking operation may be detected even through the user knocks on any position of the front panel 541.

Meanwhile, there may be a lot of environmental factors other than the knocking operation in which the vibrations are exerted on the front surface of the front panel 541. The front surface of the sub-door 50 may be vibrated by the shock generated when the main door 40 and the sub-door 50 are opened and closed, an external loud noise or the like, and such an input due to the external environments may be recognized as a knock signal.

Therefore, a detection device PCB 83 may be set so that a user's operation which knocks several times on the front surface of the sub-door 50 may be recognized as a normal knock input. More specifically, the user's operation which knocks several times (e.g., twice) on the front surface of the sub-door 50 at predetermined time intervals may be recognized as the normal knock input.

A case fixing part 583 to which a screw for fixing the accommodation part cover 583 to the sub-cap decoration 58 is fastened may be formed at one side of the accommodation part cover 583. An injection port cover part 5831 is further formed at the other side of the accommodation part cover 583. The injection port cover part 5831 may be formed on the sub-cap decoration 58, and also formed to shield a first injection port 5824 through which the foaming solution filled to mold an insulation 501 is injected.

When the accommodation part cover 583 is installed at the sub-cap decoration 58, the detection device accommodation part 582 may be shielded, and the first injection port 5824 may also be shielded.

Meanwhile, a second injection port 584 through which the foaming solution is injected is further formed at one side of the sub-cap decoration 58 close to the lower hinge 52. The second injection port 584 may be shielded by a separate injection port cover 5841.

A first boss 5821 to which a screw for fixing the second detection device 81 is fastened, and a second boss 5822 for fixing the knock detection device 82 are respectively formed at a bottom surface of the detection device accommodation part 582.

An electric wire hole 5823 may be formed at one surface of the detection device accommodation part 582. An electric wire L which is connected to the detection device PCB 83, the second detection device 81 and the knock detection device 82 may pass through the electric wire hole 5823 and the perimeter of the sub-door 50, and may be guided to an outside of the sub-door 50 through the hinge cover 53.

FIG. 13 is a perspective view of the freezer compartment door according to the first implementation of the present disclosure. And FIG. 14 is an exploded perspective view of the freezer compartment door.

One pair of the freezer compartment doors 30 may be provided left and right, and formed to open and close the freezer compartment 13 by rotation. A sensing assembly 90 may be provided at a right one (in FIG. 1) of the pair of freezer compartment doors 30. The pair of freezer compartment doors 30 have the same structure as each other, except the sensing assembly 90, and thus only the right freezer compartment door 30 will be described.

The freezer compartment door 30 may include a door plate 31, a freezer compartment door liner 32, an upper decoration 33, and a lower decoration 34. And the freezer compartment door 30 is filled with the insulation.

The door plate 31 forms a front surface and both of left and right side surfaces of the freezer compartment door 30, and may be formed by bending a plate-shaped stainless material. In particular, an inclined surface 35 at which the sensing assembly 90 is installed may be at a lower end of the front surface of the freezer compartment door 30. As illustrated, the sensing assembly 90 may be positioned at a recessed portion that is recessed rearward from the front surface. While the recessed portion is shown being positioned at a lower end of the freezer compartment door 30, the recessed portion may be positioned at other parts of the freezer compartment door 30 or any other door of the refrigerator. In some cases, the recessed portion may be formed in the cabinet of the refrigerator.

The freezer compartment door liner 32 forms a rear surface of the freezer compartment door 30. The freezer compartment door liner 32 is injection-molded with a resin material, and may be formed so that an accommodation member is installed at the rear surface of the freezer compartment door 30. And the insulation may be filled between the freezer compartment door liner 32 and the door plate 31.

The upper decoration 33 is coupled to the door plate 31 and the freezer compartment door liner 32, and forms an upper surface of the freezer compartment door 30. And a freezer compartment door handle 331 may be formed at the upper decoration 33 to be recessed downward. The upper decoration 33 may be formed of the same material as that of the door plate 31.

The lower decoration 34 is coupled to the door plate 31 and the freezer compartment door liner 32, and forms a lower surface of the freezer compartment door 30.

Meanwhile, the door plate 31 which forms the front surface and both side surfaces of the freezer compartment door 30 may be formed by bending the plate-shaped material. In particular, the inclined surface 35 may be formed at the lower end of the front surface of the freezer compartment door 30.

To form the inclined surface 35, the door plate 31 may be formed by bending several times the plate-shaped material. And the door plate 31 may be manufactured so that creases are not generated at an exterior thereof, and diffused reflection does not occur even though the inclined surface 35 is formed.

FIGS. 15A to 15E are views sequentially illustrating a molding process of the outer plate of the freezer compartment door.

A process of manufacturing the door plate 31 will be described with reference to FIGS. 15A to 15E.

First, to mold the door plate 31, a stainless steel plate as a raw material is machined by a blanking process. The door plate 31 is molded into a shape illustrated in FIG. 15A by the blanking process of the steel plate.

Specifically, by the blanking process, the door plate 31 includes a front surface part 311 which forms the front surface of the freezer compartment door 30, an inclined part 312 which forms the inclined surface 35 at a lower end of the front surface part 311, and a side surface part 313 which forms a side surface of the freezer compartment door 30.

A recessed part 314 may be formed at a portion of an upper end of the door plate 31 at which the front surface part 311 and the side surface part 313 are divided from each other. When the front surface part 311 and the side surface part 313 are bent, a shape which is able to be coupled to the upper decoration 33 may be formed by the recessed part 314.

A cut-away part 315 may be formed at a portion of a lower end of the door plate 31 at which the inclined part 312 and the side surface part 313 are divided from each other. When the front surface part 311, the side surface part 313 and the inclined part 312 are bent by the cut-away part 315, a door slit 36 may be formed at a corner portion formed by the inclined part 312 and the side surface part 313. And an installation hole 351 in which the sensing assembly 90 is inserted may be formed at the inclined part 312 by the blanking process.

In the door plate 31 machined by the blanking process, a forming part 316 may be formed to be bent along an edge of the door plate 31 by a forming process, as illustrated in FIG. 15B. The forming part 316 forms a portion of the door plate 31 which is coupled to the upper decoration 33 and the lower decoration 34, and a portion thereof which is coupled to the freezer compartment door liner 32. The forming part 316 may be formed to be bent vertically. At this point, a part of the side surface part 313 and the inclined part 312 forming the cut-away part 315 is not machined by the forming process.

In the door plate 31 machined by the forming process, a boundary portion between the front surface part 311 and the side surface part 313 is machined by a primary bending process, as illustrated in FIG. 15C. A portion which is machined by the primary bending process is a corner portion at which the front surface and the side surface of the freezer compartment door 30 are in contact with each other, and may be machined by the bending process to have a predetermined curvature. The bending process is performed until when both side ends of the inclined surface 35, i.e., portions which are in contact with the cut-away parts 315 are bent with the same curvature.

The door plate 31 machined by the primary bending process may be machined by a secondary bending process, as illustrated in FIG. 15D. A portion machined by the secondary bending process is a boundary line between the front surface part 311 and the inclined part 312, and may be machined by the bending process to have a predetermined curvature. The inclined surface 35 may be formed by the secondary bending process. The inclined surface 35 has a predetermined angle. In the implementation of the present disclosure, the inclined surface 35 may be formed to have an angle of about 20° to 30° with respect to the front surface of the freezer compartment door 30. The angle of the inclined surface 35 may be set within a range which easily detects the user's operation and prevents misrecognition. By the secondary bending process, a side end of the inclined surface 35 and an end of the side surface part 313 are in contact with each other.

The door plate 31 machined by the secondary bending process may be machined by a tertiary bending process, as illustrated in FIG. 15E. A portion machined by the tertiary bending process corresponds to one end of the side surface part 313 which forms the cut-away part 315, and is bent with a predetermined curvature. By the tertiary bending process, the door slit 36 may be formed at accurate intervals.

By such processes, an entire shape of the door plate 31 may be formed. In particular, due to a molding structure of the door slit 36, the creases are not generated while the inclined surface 35 is molded, and a curve by which the diffused reflection occurs is not generated.

The completely molded door plate 31 may be coupled to the upper decoration 33 and the lower decoration 34, and may also be coupled to the freezer compartment door liner 32. And the foaming solution is filled inside the freezer compartment door 30, and forms the insulation.

FIG. 16 is a partial perspective view of the freezer compartment door.

As illustrated in the drawing, the door slit 36 may be formed at a side surface of the freezer compartment door 30 close to a bottom hinge 37 which supports a lower end of the freezer compartment door 30, and a covering member 38 is provided inside the freezer compartment door 30 to shield the door slit 36.

The door slit 36 may be formed at the side surface of the freezer compartment door 30, i.e., the side surface part 313 of the door plate 31 so as to prevent exposure when being seen from a front of the refrigerator 1.

And the door slit 36 may be formed along the inclined surface 35 at a position close to the inclined surface 35 so as to enable the inclined surface 35 to be easily molded. By the door slit 36, the creases may be prevented from being generated at the door plate 31, and the diffused reflection may be prevented from occurring, even though the inclined surface 35 is molded. The door slit 36 may be formed corresponding to a length of the inclined surface 35, and may be formed to extend to a lower end of the side surface of the freezer compartment door 30.

Of course, a position at which the door slit 36 is formed is not limited to the above-described implementation, and may be formed at various positions, e.g., a corner portion of the side surface of the inclined surface 35, or one side of the inclined surface 35 which enables the inclined surface 35 to be bent.

The covering member 38 may be installed inside the freezer compartment door 30. The covering member 38 may be in close contact with an inner side surface of the door plate 31. At this point, a rib part 383 of the covering member 38 is inserted into the door slit 36.

The rib part 383 may be formed to have the same length and width as those of the door slit 36, and may protrude so as to be on the same plane as that of the side surface of the freezer compartment door 30 while being installed at the door slit 36. Therefore, when the rib part 383 is inserted into the door slit 36, the door slit 36 is filled, and thus prevented from being exposed.

And the covering member 38 or at least the rib part 383 may be formed to have the same color as that of the outer plate 41. Therefore, the rib part 383 which is exposed to an outside while being inserted into the door slit 36 has a sense of unity with the door plate 31.

FIG. 17 is an exploded perspective view illustrating a coupling structure of the door plate, the lower decoration and the covering member. And FIG. 18 is a partially cut-away perspective view illustrating a coupling state of the door plate, the lower decoration and the covering member. And FIG. 19 is a cross-sectional view taken along line 19-19' of FIG. 13.

The covering member 38 and a coupling structure of the covering member 38 will be described with reference to the drawings.

The lower decoration 34 may be formed to correspond to a shape of the lower surface of the freezer compartment door 30 and thus to form the lower surface of the freezer compartment door 30.

A plate insertion part 341 may be formed to be recessed along an edge of each of a front end and left and right side ends of the lower decoration 34. The plate insertion part 341 forms a space in which the forming part 316 forming a boundary of the door plate 31 is inserted. A plurality of ribs 3411 which are inclined to enable the forming part 316 to be fixed while the forming part 316 is inserted may be formed inside the plate insertion part 341.

A plate support part 342 which extends upward may be formed at a perimeter of the lower decoration 34 except a rear end thereof. The plate support part 342 may be formed to be in contact with the door plate 31 and thus to support the door plate 31.

And a liner support part 343 which extends upward may be formed at the rear end of the lower decoration 34. The liner support part 343 is in contact with the freezer compartment door liner 32, and support a lower end of the freezer compartment door liner 32.

An internal space of the freezer compartment door 30 may form a closed space by the plate support part 342 and the liner support part 343, and the foaming solution may be filled inside the plate support part 342, and may form the insulation.

And a covering member insertion part 344 which is formed to have a shape corresponding to that of a lower end of the covering member 38 may be formed at a side end of the lower decoration 34. The covering member insertion part 344 may be formed at the side end of the lower decoration 34 to be stepped, and may provide a space in which a lower end of the covering member insertion part 344 is inserted when the door plate 31 and the lower decoration 34 are coupled.

And a hinge insertion part 345 and an electric wire fixing part 346 which will be described below in detail may be further formed at the lower decoration 34.

The covering member 38 may be installed and fixed to the lower decoration 34, and may be formed to be in close contact with a corner of one side of the freezer compartment door 30 close to the hinge insertion part 345 at which the bottom hinge 37 is installed.

Specifically, the covering member 38 may include a first surface 381 which is in contact with the side surface part 313 of the door plate 31, and a second surface 382 which is in contact with the inclined part 312 and the front surface part 311. And a portion at which the first surface 381 and the second surface 382 are in contact with each other may be formed to have a curvature corresponding to a bent corner part of the door plate 31.

A lower end of the first surface 381 extends downward further than a lower end of the second surface 382, and may be inserted into the covering member insertion part 344. And the rib part 383 which protrudes outward may be formed at an outer surface of the first surface 381. The rib part 383 may be formed at a position which is able to be inserted into the door slit 36.

The second surface 382 may be formed to be in close contact with the inclined surface 35 and a front surface, and may be formed to be bent at an angle corresponding to the inclined surface 35. And the lower end of the second surface 382 is located upward further than the lower end of the first surface 381, and formed so as not to interfere with the plate support part 342.

While the covering member 38 is installed, an entire outer surface of the covering member 38 may be in close contact with an inner surface of the door plate 31, and may be maintained in a closely contacting state with the door plate 31 by an adhesive. And while the covering member 38 is installed, the rib part 383 may pass through the door slit 36, and may be exposed to the outside.

FIG. 20 is a perspective view of the lower decoration of the freezer compartment door when being seen from a front. And FIG. 21 is a perspective view of the lower decoration when being seen from an upper side.

As illustrated in the drawings, a sensing assembly installation part 39 at which the sensing assembly 90 is installed may be formed to be recessed from one side of the lower decoration 34. The sensing assembly installation part 39 may be formed at an external space of the plate support part 342. Therefore, the sensing assembly 90 may be installed at the sensing assembly installation part 39 after or before the foaming solution for forming the insulation is injected into a separate space which is partitioned from the space in which the insulation may be formed.

The sensing assembly installation part 39 is disposed at one end opposite to a portion at which the bottom hinge 37 supporting the freezer compartment door 30 is installed. That is, the sensing assembly installation part 39 may be formed at one end close to the pair of freezer compartment doors 30. Therefore, the sensing assembly 90 installed at the sensing assembly installation part 39 may be located up and down on an extension line of the second detection device 81. Also, the installation hole 351 may be disposed at a front of the sensing assembly installation part 39.

The sensing assembly installation part 39 may be in communication with a space, which is formed above the lower decoration 34, through an electric wire guide hole 348. Therefore, the electric wires L which are connected to the sensing assembly 90 may be introduced into the lower decoration 34 through the electric wire guide hole 348, and may be guided along an inside of the lower decoration 34 to a decoration electric wire hole 347 which is formed at the other side of the lower decoration 34.

At this point, a plurality of electric wire fixing parts 346 may be formed at an inner surface of the lower decoration 34 in an arrangement direction of the electric wires, and the electric wires L may be maintained in the closely contacting state with the electric wire fixing parts 346. Therefore, even while the foaming solution is being injected inside the freezer compartment door 30, a position of the electric wires L may not be deviated, but may be fixed.

The hinge insertion part 345 may be formed at another side of the lower decoration 34 which is distant from the sensing assembly installation part 39. The hinge insertion part 345 may be formed to extend upward, and may be formed in a boss shape in which a hinge shaft of the bottom hinge 37 is accommodated.

The decoration electric wire hole 347 may be formed at a bottom surface of the lower decoration 34 close to the hinge insertion part 345. The electric wires L which are connected to the sensing assembly 90 may be guided to an outside of the lower decoration 34 through the decoration electric wire hole 347. At this point, the electric wires L may extend toward the cabinet 10 via a side of the bottom hinge 37, and may be connected to a main control part 2.

FIG. 22 is a partial perspective view of the sensing assembly installation part of a lower decoration.

As illustrated in the drawing, the sensing assembly installation part 39 may be formed at one side end of the lower decoration 34. The sensing assembly installation part 39 may be formed to be recessed inward in a minimum depth which forms a space for accommodating the sensing assembly 90. That is, the insulation may be formed at a rear of the sensing assembly installation part 39, and thus insulation performance of the freezer compartment door 30 may be maintained.

In particular, the sensing assembly 90 may be installed inside the sensing assembly installation part 39 so as to be inclined. Therefore, the sensing assembly 90 having a long length may be installed at a limited inside of the freezer compartment door 30 while maintaining an insulation space.

The plate support part 342 may be formed along an edge of the sensing assembly installation part 39. The sensing assembly installation part 39 may be formed so that a left surface and a front surface thereof are opened. Therefore, when the lower decoration 34 is injection-molded, an inside of the sensing assembly installation part 39 may be easily molded.

The sensing assembly installation part 39 may include an assembly accommodation part 391 and a connector accommodation part 392. The assembly accommodation part 391 is a space in which the sensing assembly 90 is accommodated, and may be formed at one side end of the lower decoration 34.

The assembly accommodation part 391 may be formed to be inclined, and thus to support a rear surface of the sensing assembly 90 which is disposed to be inclined with respect to the ground. That is, while the sensing assembly 90 is completely installed, a rear end of the sensing assembly 90 is in contact with an inner surface of the assembly accommodation part 391.

An assembly guide 394 may be formed at a bottom surface of the assembly accommodation part 391. The assembly guide 394 may be formed in a shape having a plurality of ribs which are continuously disposed at regular intervals. And a plurality of assembly guides 394 may be formed to have the same shape, and may be formed to connect an inner surface 393 of the assembly accommodation part 391 with the bottom surface of the lower decoration 34.

The assembly guide 394 may be formed vertically long, and a guide inclined part 395 may be formed at an end of the assembly guide 394 which is directed toward the door plate 31. The guide inclined part 395 may be formed at a front end of the assembly guide 394 to be inclined gradually upward toward the inner surface 393 of the assembly accommodation part 391.

The guide inclined part 395 may include a first inclined part 3951 which extends from the front end of the assembly guide 394, and a second inclined part 3952 which extends from a rear end of the first inclined part 3951 to a rear end of the assembly guide 394.

The first inclined part 3951 may be formed to have a larger slope than that of the second inclined part 3952. Therefore, when the sensing assembly 90 is installed, rear ends of cases 93 and 94 may be in contact with the first inclined part 3951, and may be moved backward, and may also be easily inserted into the inner surface 393 of the assembly accommodation part 391.

The slope of the second inclined part 3952 may be the same as that of the sensing assembly 90 when the sensing assembly 90 is completely installed. That is, when the sensing assembly 90 is installed, a lower end of the sensing assembly 90 may be supported by the second inclined part 3952, and the sensing assembly 90 is completely inserted along the second inclined part 3952. And in a state in which the sensing assembly 90 is completely inserted, the lower end of the sensing assembly 90 is supported, and an installed position of the sensing assembly 90 is not changed.

The connector accommodation part 392 may be formed at a lateral side of the assembly accommodation part 391. The connector accommodation part 392 forms a space in which sensing assembly connectors 912 and 922 for connecting the sensing assembly 90 with the main control part 2 are accommodated. Therefore, the connector accommodation part 392 may be formed to have a size relatively smaller than the assembly accommodation part 391. And the electric wire guide hole 348 may be formed above the connector accommodation part 392.

Therefore, when the sensing assembly 90 is installed, a first connector 912 connected to the sensing assembly 90 and a second connector 922 connected to the main control part 2 are first connected from an outside of the freezer compartment door 30, and then the sensing assembly 90 is inserted into the assembly accommodation part 391. At this point, the first connector 912 and the second connector 922 which are connected to each other are located at a side of the connector accommodation part 392.

FIG. 23 is a perspective view of the sensing assembly according to the first implementation of the present disclosure when being seen from a front. And FIG. 24 is a perspective view of the sensing assembly when being seen from a rear. And FIG. 25 is an exploded perspective view of the sensing assembly when being seen from one direction. And FIG. 26 is an exploded perspective view of the sensing assembly when being seen from another direction. And FIG. 27 is a longitudinal cross-sectional view of the sensing assembly.

As illustrated in the drawings, the sensing assembly 90 includes a projector 91 which projects an image which induces a user' operation, and the first detection device 92 which detects the user's operation at an area of the image projected by the projector 91. And the projector 91 and the first detection device 92 may be formed in one module.

More specifically, an external appearance of the sensing assembly 90 may be formed by the pair of cases 93 and 94, and a case cover 95 which shields open front surfaces of the cases 93 and 94. And all of the projector 91 and the first detection device 92 may be installed inside the cases 93 and 94.

At this point, the projector 91 and the first detection device 92 are disposed vertically, and the projector 91 is located under the first detection device 92. Since the projector 91 is located under the first detection device 92, a position of the image projected from an appropriate position may be ensured. When the projector 91 is located above the first detection device 92, a projecting distance is relatively elongated, and thus a possibility of misrecognition is increased, and also a quality of the projected image may be degraded.

The cases 93 and 94 may include a first case 93 and a second case 94 which form both left and right sides. The first case 93 and the second case 94 are coupled to each other so that the projector 91 and the first detection device 92 are accommodated therein.

Rear surfaces of the first case 93 and the second case 94 may be coupled to each other by a coupling hook 941 and a hook groove 931. The coupling hook 941 may be inserted into the hook groove 931, and the coupling hook 941 and the hook groove 931 may be formed at the first case 93 and the second case 94, respectively.

And front surfaces of the first case 93 and the second case 94 may be may be fixed by coupling of the case cover 95. To this end, side hooks 932 and 942 may be formed at both side surfaces of the first case 93 and the second case 94, and may be inserted into a hook restriction part 951 provided at the case cover 95 so as to be restricted to each other.

And a fastening hole 943 in which a fastening member 9431 such as a screw and a bolt is inserted may be formed at the second case 94, and a fastening boss 933 in which the fastening member 9431 is fastened may be formed inside the first case 93.

A first PCB hole 901 and a second PCB hole 902 through which an LED PCB 911 and a detection device PCB 921 are exposed may be formed at the rear surfaces of the cases 93 and 94. The first PCB hole 901 may be formed at a position corresponding to the LED PCB 911, and also formed smaller than the LED PCB 911. The electric wire L which is connected to the LED PCB 911 may pass through the first PCB hole 901.

And the second PCB hole 902 may be formed at a position corresponding to the detection device PCB 921 for an operation of the first detection device 92. The electric wire L which is connected to the detection device PCB 921 may pass through the second PCB hole 902.

The first connector 912 which is connected to the electric wires L of the LED PCB 911 and the detection device PCB 921 may be connected to the second connector 922 which is connected to the main control part 2, and may be disposed at the connector accommodation part 392.

A film slot 934 in which a film 913 having characters or symbols indicated on the image to be projected on a floor surface on which the refrigerator 1 sits may be formed at one side of the first case 93. A width of the film slot 934 may be formed to be larger than a thickness of the film 913, and thus the film 913 may be inserted and installed from an outside of the cases 93 and 94 into the cases 93 and 94.

Since the film 913 may be formed in a very thin plate shape, when the film 913 is installed in the cases 93 and 94, and then the first case 93 and the second case 94 are assembled, the film 913 may be pressed or bent and thus may be deformed or damaged. Therefore, to prevent a damage of the film 913, a structure in which the film 913 is inserted from the outside of the cases 93 and 94 through the film slot 934 may be provided.

Meanwhile, a film groove 944 may be formed at an inner surface of the second case 94 corresponding to the film slot 934. The film groove 944 may be recessed from the inner surface of the second case 94 so that the film 913 is inserted therein. Therefore, an end of the film 913 may be inserted and fixed into a space like a gap formed by the film groove 944.

The film groove 944 may be formed to correspond to one end of the inserted film 913. And a corner of one end of the film 913 may be formed to be inclined, and thus may be inserted with directivity, like a SD card. And the film groove 944 may be formed correspondingly. Therefore, the film 913 may be inserted in only one direction, and thus the film 913 may be prevented from being erroneously installed. For example, the film 913 may be prevented from being reversely installed or being installed at an inaccurate position.

And to prevent the film 913 from being deformed, a reinforcing plate having a corresponding shape may be further provided at a front surface or a rear surface of the film 913. The reinforcing plate may be formed of a transparent material through which light is transmitted, and may be formed to have the same shape as that of the film 913.

The projector 91 is disposed at a lower portion inside the cases 93 and 94. To dispose the projector 91, a projection part 930 having a circular cross section may be formed inside the cases 93 and 94. The projector 91 disposed inside the projection part 930 may include the LED PCB 911, the film 913 and a plurality of lenses 914.

Specifically, the LED PCB 911 is located at the rearmost of the cases 93 and 94, and an LED 9111 mounted on the LED PCB 911 emits light toward the film 913. To fix the LED PCB 911, a PCB fixing part 935 may be formed at the projection part 930. The PCB fixing part 935 may be recessed so that a corner of the LED PCB 911 is inserted therein.

And the film groove 944 in which the film 913 is inserted may be formed at a front of the PCB fixing part 935. The film groove 944 may be formed between the LED PCB 911 and the lenses 914. A position of the film groove 944 may be determined so that the projected image is formed clearly.

A plurality of build-down grooves 936 which extend in forward and backward directions may be formed at a circumference of the projection part 930 at which the film groove 944 is formed. The plurality of build-down grooves 936 may be provided along the circumference of the projection part 930, and serves to prevent deformation due to contraction when the cases 93 and 94 are injection-molded.

The plurality of lenses 914 may be provided at a front of the film groove 944. The plurality of lenses 914 may be disposed at regular intervals, and may control a focal distance of the projected image by adjusting a distance between the lenses 914. Therefore, the distance between the plurality of lenses 914 may be adjusted so that the image clearly forms on the floor surface on which the refrigerator 1 is installed.

And lens grooves 937 in which the lenses 914 are installed may be formed at the projection part 930. The distance between the lenses 914 may be determined according to a distance between the lens grooves 937. The plurality of lenses 914 disposed at the projection part 930 may be provided. However, it is preferable that three lenses 914 be used, considering the space of the assembly accommodation part 391.

The image projected on the floor surface may be further clear by using more lenses 914. However, when the number of lenses 914 is increased, a length of the projector 91 is increased, and thus there may be a problem that the sensing assembly 90 may not be installed inside the freezer compartment door 30 having a limited thickness.

A front surface of the projection part 930 may be formed to be opened. The open front surface of the projection part 930 may be shielded by the case cover 95. And the light which is emitted from the LED 9111 and passes through the film 913 and the lenses 914 may pass through a projecting hole 952 of the case cover 95, and then may be projected on the floor surface.

A detection part 940 may be formed above the projection part 930, i.e., an upper portion of the cases 93 and 94. The detection part 940 is a portion in which the first detection device 92 is accommodated, and may be formed in a shape corresponding to the first detection device 92.

The first detection device 92 serves to detect whether a user's foot is located at an area of the image projected by the projector 91, and may use a device which detects a user' approach. For example, like the second detection device 81, the PSD sensor which emits and receives the infrared light may be used as the first detection device 92. However, a detection distance of each of the first detection device 92 and the second detection device 81 may be set different from each other due to a difference in an installation position thereof and an object to be detected. The first detection device 92 may have a detection distance of less than 15 cm, for example 10 cm to 15 cm corresponding to a distance to the floor surface on which the image projected by the projector 91 is formed.

Meanwhile, in the first detection device 92, a light emitting part 923 and a light receiving part 924 may be disposed up and down. And a barrier 925 may be provided between the first detection device 92 and the case cover 95. The barrier 925 may be formed so that both ends thereof are in contact with a front surface of the first detection device 92 and a rear surface of the case cover 95, respectively. And the barrier 925 divides the light emitting part 923 and the light receiving part 924. Therefore, the infrared light emitted from the light emitting part 923 may be prevented from being reflected by the case cover 95 and being directed to the light receiving part 924.

While the sensing assembly 90 is installed at the inclined surface 35 of the freezer compartment door 30 to be inclined, the first detection device 92 is installed inside the cases 93 and 94 to be intersected with the inclined surface 35. And the first detection device 92 and the case cover 95 are disposed in a direction which are spaced apart from each other and intersected with each other. In this state, when some of the light emitted from the light emitting part 923 collides with the case cover 95, the light may be reflected and then may be introduced into the light receiving part 924.

However, when the light emitting part 923 and the light receiving part 924 are divided by the barrier 925, the infrared light emitted by the light emitting part 923 penetrates the case cover 95, and the light reflected by the floor surface or the user may penetrate the case cover 95, and then may be introduced into the light receiving part 924.

The barrier 925 may be formed inside the cases 93 and 94, and may be integrally formed with the cases 93 and 94. Of course, the barrier 925 may also be integrally formed with the first detection device 92 or the case cover 95.

The open front surface of the detection part 940 may be shielded by the case cover 95. That is, all of the open front surfaces of the projection part 930 and the detection part 940 may be shielded by the case cover 95.

The case cover 95 may be formed of a transparent material through which the light is transmitted, and the projecting hole 952 may be formed at a portion thereof corresponding to the projection part 930. A protrusion part 953 may be formed at an area corresponding to each of a circumference of the projecting hole 952 and the detection part 940.

A flange 954 may be formed at the rear surface of the case cover 95 to extend backward along a perimeter of the case cover 95. And the hook restriction part 951 which extends backward may be formed at both sides of the case cover 95. The side hook 932 formed at the cases 93 and 94 is hooked and restricted by the hook restriction part 951.

A cover fixing hook 956 which enables the case cover 95 to be hooked and fixed to the installation hole 351 may be formed at both sides of the case cover 95. By the cover fixing hook 956, the sensing assembly 90 may be maintained in an installed and fixed state to the sensing assembly installation part 39.

Meanwhile, a decoration plate 96 is attached on the front surface of the case cover 95. The decoration plate 86 may be formed of the same metallic material as that of the door plate 31. And the decoration plate 96 may be formed to have the same shape as that of the front surface of the case cover 95, and also formed to cover the entire front surface of the case cover 95.

Plate holes 961 and 962 in which the protrusion parts 953 of the case cover 95 are inserted may be formed at the decoration plate 96. Therefore, the decoration plate 96 may be coupled to the case cover 95.

When the sensing assembly 90 is installed, the decoration plate 96 is exposed through the installation hole 351 formed at the inclined surface 35 of the freezer compartment door 30, and may have the sense of unity with the door plate 31.

Meanwhile, a separate clear cover may be further provided at the open projecting hole 952. The clear cover may shield the projecting hole 952 to prevent foreign substances from entering, and may also be formed to transmit the light projected from the projector 91. Of course, the case cover 95 may be formed so that the projecting hole 952 and the clear cover are not provided, and the light projected from the projector 91 penetrates the transparent case cover 95, and is projected.

FIGS. 28A to 28C are views illustrating an installation process of the sensing assembly.

As illustrated in the drawings, to install the sensing assembly 90 at the freezer compartment door 30, while the molding of the freezer compartment door 30 is completed, as illustrated in FIG. 28A, the second connector 922 provided to the electric wire L connected to the main control part 2 is taken out through the installation hole 351, and then coupled to the first connector 912 connected to the sensing assembly 90.

While the first connector 912 and the second connector 922 are connected to each other, the first connector 912 and the second connector 922 which are coupled to each other are pushed inside the connector accommodation part 392, and then the sensing assembly 90 is inserted into the installation hole 351.

When the rear surface of the sensing assembly 90 is inserted into the installation hole 351, lower surfaces of the cases 93 and 94 are in contact with the assembly guide 394. That is, as illustrated in FIG. 29B, the lower surfaces of the cases 93 and 94 may be moved while being in contact with the first inclined part 3951.

When the sensing assembly 90 is continuously pushed in a rear, the lower surfaces of the cases 93 and 94 are moved along the second inclined part 3952, and rear ends of the cases 93 and 94 are in contact with the inner surface 393 of the assembly accommodation part 391, and are in a state illustrated in FIG. 28C.

While the sensing assembly 90 is completely inserted and installed, the second inclined part 3952 supports the sensing assembly 90 from a lower side. And the case cover 95 may be fixed in the installation hole 351 by the cover fixing hook 956 of the case cover 95.

And while the fixing and installing of the sensing assembly 90 is completed, the front surface of the case cover 95 or the decoration plate 96 is located on the same plane as that of the front surface of the inclined surface 35, and shields the installation hole 351.

Hereinafter, an image projecting method by the sensing assembly 90 and a detecting method of the first detection device 92 will be described.

FIG. 29 is a view illustrating an image projecting state through the projector of the sensing assembly. And FIG. 30 is an enlarged view of an A area of FIG. 29.

As illustrated in the drawings, a predetermined image is projected on the floor surface, on which the refrigerator 1 is installed, by the projector 91 of the sensing assembly 90 so as to induce the user's operation.

The light emitted from the LED 9111 of the LED PCB 911 passes through the film 913, and the light passes through the film 913 passes through the plurality of lenses 914. The light passing through the lenses 914 passes through a focal point, and indicates the characters T provided at the film 913 on the floor surface.

At this point, the sensing assembly 90 has limitation in a length and a size thereof due to structural characteristics of the insulated freezer compartment door 30. Therefore, in the projector 91, an aspheric lens which enables the light to straightly penetrate the film 913 may be omitted to increase definition of the image, and thus the size thereof may be reduced. However, due to omission of the aspheric lens, an intensity of the light incident to a surface of the film 913 may not be constant, and thus the image may not be clearly formed.

Therefore, to solve the problems, the intensity of the light is increased by moving the film 913 toward the LED 9111, and the characters T on the film 913 may be formed in a high-resolution printing method, and thus the characters may be clearly formed on the floor surface.

When the image is projected on an inclined floor surface, uniformity of the image indicated on the floor surface is degraded by a difference in the intensity of light due to a difference in the projecting distance between a first half portion and a second half portion.

Specifically, due to a characteristic of the light emitted from the inclined surface 35 of the freezer compartment door 30 toward the floor surface, a side close to the front surface of the freezer compartment door 30 has a short projecting distance and thus a high intensity of light, and a side distant from the front surface of the freezer compartment door 30 has a long projecting distance and thus a low intensity of light. Therefore, there is a problem that a size of the characters T indicated by the image displayed on the floor surface is changed according to whether the image is located close to or distant from the freezer compartment door 30. Also, due to the difference in the intensity of light, the characters T formed on the floor surface close to the freezer compartment door 30 is spread, or the characters T formed on the floor surface distant from the freezer compartment door 30 becomes dark.

To solve the problems, the characters T formed on the film 913 is compensated, and thus even when the image is projected on the inclined floor surface, the entire characters T may be clearly formed with a normal rate.

Specifically, as illustrated in FIG. 30, in the characters T printed on the film 913, an area of a portion corresponding to a word "Door" may be formed widely, and an area of a portion corresponding to a word "Open" may be formed narrowly, and thus the entire portion may be formed in a trapezoidal shape. For understanding of the description, the certain characters have been described. However, even in the case of another characters, pictures or figures, the picture or the figure printed on the film 913 may be formed to have a width which becomes narrower downward.

When the light is emitted from the LED 9111 to the film 913 on which the characters T are printed as described above, the characters T of the image indicated on the relatively inclined floor surface may be indicated with the same vertical width rate, regardless of the difference in the projecting distance. Also, brightness and definition of the side close to or distant from the freezer compartment door 30 may be relatively improved, and thus the user may easily recognize the characters T.

FIG. 31 is a view illustrating a detection area and an image projecting area by the sensing assembly.

As illustrated in the drawing, the sensing assembly 90 may be installed at the assembly installation part 39. The sensing assembly 90 may be supported inclinedly by the assembly guide 394. And the front surface of the sensing assembly 90 is located at the inclined surface 35 of the freezer compartment door 30. Therefore, the image may be formed on the floor surface located at a front of the refrigerator 1 by the light emitted from the projector 91, and a corresponding position may be detected by the first detection device 92. At this point, all of a position of the image formed on the floor surface and a detection position by the first detection device 92 may be determined by an angle of the inclined surface 35.

More specifically, the inclined surface 35 of the freezer compartment door 30 may be formed to have an angle of about 20° to 30° with respect to the front surface of the freezer compartment door 30. When the inclined surface 35 has an angle of less than 20°, the image is projected at a too long distance from the freezer compartment 13, and thus a shape of the image formed on the floor surface is also unclear or distorted.

In particular, the detection distance for detecting the user's operation by the first detection device 92 is too far, and thus in a situation in which the user does not want a door opening operation, the door opening device 70 may be operated due to misrecognition. That is, in a situation in which a person or an animal just passes the refrigerator 1, or in a situation in which an object is located or moved at a front of the refrigerator 1, the situation may be misrecognized as an opening operation of the main door 40, and thus the door opening device 70 may be driven.

Also, when the angle of the inclined surface 35 is more than 30°, the image projected from the projector 91 may be formed at a side which is too close to the front surface of the refrigerator 1, and the detection position of the user's operation by the first detection device 92 is also too close to the freezer compartment door 30.

In this case, the user should approach a position close to the refrigerator 1 to operate the main door 40. In this state, when the door opening device 70 is driven, the user may collide with the main door 40 which is automatically opened.

Also, when the inclined surface 35 has a too large angle, the bottom hinge 37, the cover which shields the bottom hinge 37 or other elements provided at the lower end of the freezer compartment door 30 may be exposed. And a leg 14 which supports the cabinet 10 at a lower surface of the cabinet 10 may be exposed, and thus the external appearance may be degraded.

Considering the situation, it is preferable that the inclined surface 35 have the angle of about 20° to 30°. In this state, the user's foot may be detected at a distance of 5 cm to 10 cm from the front surface of the freezer compartment door 30.

Therefore, when the main door 40 is opened, the user's operation may be performed at a position at which the user does not collide with the main door 40. In particular, when the image is projected from the inclined surface 35 on the floor surface, and the user's foot is moved to a space under the inclined surface 35, the user's foot may be detected and thus the possibility of the misrecognition may be considerably reduced.

Hereinafter, an operation of the refrigerator 1 according to the implementation of the present disclosure having the above-described structure will be described.

FIG. 32 is a block diagram illustrating a flow of a control signal of the refrigerator.

As illustrated in the drawing, the refrigerator 1 includes the main control part 2 which controls the operation of the refrigerator 1, and the main control part 2 may be connected to the reed switch 4011. The reed switch 4011 may be provided at the main hinge 401, and may detect the opening of the main door 40.

And the main control part 2 may be connected to the main lighting unit 85 provided inside the cabinet 10, and may illuminate the inside of the refrigerator 1 when the refrigerator compartment door 20 or the main door 40 is opened. And the main control part 2 may be connected to the door lighting unit 49, and may turn on the door lighting unit 49 when the sub-door 50 is opened or when a signal of the knock detection device 82 is input.

The main control part 2 may be connected to the display unit 50, may control an operation of the display unit 60, and may display operation information of the refrigerator 1 through the display unit 60 or may operate various functions.

The main control part 2 may be directly or indirectly connected to the first detection device 92, the second detection device 81, the knock detection device 82 and the projector 91, and may receive an operation signal by them, or may control the operation.

And the main control part 2 may be connected to the door opening device 70, and the door opening device 70 may be driven according to the user's operation so that the main door 40 is automatically opened.

FIGS. 33A and 33B are views illustrating an opening operation state of the main door. And FIG. 34 is a flowchart sequentially illustrating an operation of the door opening device.

As illustrated in the drawings, when electric power is applied to the refrigerator 1 while the refrigerator 1 is installed, the refrigerator 1 may enter a standby state for the opening of the main door 40 through an initial operation [S100].

In a state in which the initial operation is completed by supplying the electric power, a standby operation is performed. And in the standby operation, the refrigerator 1 waits to detect the user's operation for opening the main door 40.

As illustrated in FIG. 33A, in a state in which the refrigerator 1 is in the standby operation, when the user stands in front of the refrigerator 1 while holding an object in his/her hands, the user's position is recognized by the second detection device 81. And when the second detection device 81 recognizes that the user is located within a detection range, the projector 91 is operated, and projects the image on the floor surface on which the refrigerator 1 is installed.

In this state, when the user's foot is moved to a lower side of the inclined surface 35 at which the freezer compartment door 30 may be formed, at least a part of the image projected on the floor surface may be covered, as illustrated in FIG. 33B. And the first detection device 92 may detect that the user's foot is located at the area of the image projected by the projector 91, and thus may transmit a signal for opening the main door 40 [S200].

In the standby operation, when the signal for opening the main door 40 is input, the door opening device 70 starts to be driven, and an opening operation in which the main door 40 is automatically opened is performed, and the main door 40 is rotated at a preset angle.

The main door 40 which is rotated at the preset angle may be opened so as to be spaced apart from the front surface of the adjacent refrigerator compartment 12, and the user may put his/her elbow in an open space, and may further open the main door 40.

While the main door 40 is opened, a stopping operation after opening is performed so that the main door 40 is maintained in an opened state for a preset time. Therefore, the main door 40 may be maintained in the opened state [S400].

Meanwhile, when the preset time passes after the main door 40 is opened, the door opening device 70 performs a returning operation. In the returning operation, the main door 40 is rotated by its own weight, and shields the refrigerator compartment 12. When the refrigerator 1 is installed, the refrigerator 1 may be disposed to be inclined, such that the front surface thereof is somewhat higher than the rear surface thereof. This is to enable the doors to be closed by their own weights when an external force is removed after the door of the refrigerator 1 including the main door 40 is opened.

When the returning operation is completed, the refrigerator 1 is again in the standby operation which detects the user's operation. This process may be repeated, and the refrigerator 1 is maintained in a standby operation state after the electric power is applied [S500].

Meanwhile, when the main door 40 is further opened by the user's operation while the main door 40 is being opened, an emergency returning signal is generated. The door opening device 70 may perform an emergency returning operation, and thus may rapidly return the push rod 77. Therefore, the main door 40 may be prevented from colliding with the push rod 77, and damage of the push rod 77 or the door opening device 70 may be prevented [S600].

Hereinafter, each operation state will be described in detail with reference to the drawings.

FIG. 35 is a flowchart sequentially illustrating the initial operation of the door opening device.

As illustrated in the drawing, when the initial operation is started, the electric power is applied to the refrigerator 1 [S110]. When the electric power is applied, it is determined whether the first hall sensor 741 is in the ON state [S120]. When the first hall sensor 741 is in the ON state, a normal operation may be performed at an initial state in which the push rod 77 is completely inserted. Therefore, when the first hall sensor 741 is in the ON state, the driving motor 73 is not operated, and the refrigerator 1 enters the standby operation state [S130].

When the first hall sensor 741 is not in the ON state, the push rod 77 is not located at an initial position, and thus the driving motor 73 is reversely rotated so that the first hall sensor 741 is in the ON state [S140].

Meanwhile, in a state in which the driving motor 73 starts to be reversely rotated, if the first hall sensor 741 is not in the ON state even when the preset time (e.g., 5 seconds) passes, it is determined that the door opening device 70 is abnormal [S150], and the driving motor 73 is stopped, and an error signal is generated [S160]. To enable the user to confirm generation of the error signal, the display unit 60 codes a current state, and then outputs an error code [S170].

FIG. 36 is a flowchart sequentially illustrating the standby operation of the door opening device.

As illustrated in the drawing, when the standby operation is started, first it is determined through the reed switch 4011 whether the main door 40 is in a closed state. While the reed switch 4011 is switched on, the main door 40 may be automatically opened. However, while the reed switch 4011 is switched off, the main door 40 is opened, and thus the door opening device 70 is not operated [S210].

In a state in which the reed switch 4011 is in the ON state, the second detection device 81 first detects the user's approach. At this point, the second detection device 81 is located at a height of about 1 m from the ground, and the detection distance may be within a range of about 1 m from the front surface of the refrigerator 1 [S220].

When the second detection device 81 is turned on, the projector 91 is also turned on, and the light is emitted from the LED 9111, and thus the image is projected to the lower side of the inclined surface 35. Therefore, the user may confirm the characters indicated on the floor surface located at a front of the freezer compartment door 30, and may move his/her foot to a position of the characters in a state in which his/her hands cannot be used [S230].

At this point, since the area of the image projected on the floor surface is within the detection distance of the first detection device 92, when the user's foot is located at the position of the characters, the first detection device 92 may detect the user's foot. The first detection device 92 is maintained in a detecting state for a preset time, and when the preset time passes [S240], the detecting state is released, and the projector 91 is also turned off [S280].

When the user's foot is located at the area of the characters, and the first detection device 92 detects the user's foot [S250], the main control part 2 inputs an opening signal of the main door 40 [S260]. The main door 40 performs the opening operation by inputting of the opening signal of the main door 40 [S270].

FIG. 37 is a flowchart sequentially illustrating the opening operation of the door opening device. And FIG. 38 is a view illustrating a duty change according to an FG pulse count during the opening operation.

As illustrated in the drawings, when the opening operation is started, the driving motor 73 is normally rotated [S310]. Movement of the push rod 77 which is located at the initial position is started by normal rotation of the driving motor 73. That is, while the first hall sensor 741 is in the ON state, the driving motor 73 is normally rotated until when the second hall sensor 742 is in the ON state by the movement of the push rod 77 [S310].

The push rod 77 may protrude by the normal rotation of the driving motor 73, and may push the cabinet 10 so that the main door 40 is opened. And the driving motor 73 may be controlled to be driven while reducing duty. That is, when the driving motor 73 is driving at the same speed, the main door 40 may be rolled by inertia at a moment when the opening of the main door 40 is completed and then the main door 40 is stopped. However, when a speed of the driving motor 73 is reduced before the opening of the main door 40 is completed, rolling of the main door 40 at a moment when the opening of the main door 40 is completed may be reduced.

As illustrated in FIG. 38, the driving motor 73 may be driven with a duty of 200 at a first opening section O1 in which the FG is 270. And the driving motor 73 may be driven with a duty of 170 at a second opening section O2 in which the FG is 300. And the driving motor 73 may be driven with a duty of 135 at a third opening section O3 in which the FG is 325. And the driving motor 73 may be driven with a duty of 100 at a last fourth opening section O4 in which the FG is 340.

Like this, at an early stage in which the main door 40 is opened, the driving motor 73 may be rotated at the highest speed, and the opening of the main door 40 may be rapidly performed. As the opening of the main door 40 is being performed, the rotating speed of the driving motor 73 is reduced in stages, and thus the rolling of the main door 40 may be prevented when the opening of the main door 40 is completed.

Meanwhile, in the case in which the second hall sensor 742 is not turned on even when the preset time (e.g., 5 seconds) passes after the normal rotation of the driving motor 73 is started, the door opening device 70 is abnormal, and thus the error signal is generated, and thus a corresponding error code may be output through the display unit 60. And since the opening operation of the main door 40 may not be continuously performed, the returning operation is started.

And in a state in which the preset time does not pass after the normal rotation of the driving motor 73 is started, the opening operation of the main door 40 is continuously performed [S330]. At this point, when a person or an object is located at a front of the main door 40 which is close to the main door 40, the main door 40 may be in a state which is not opened.

That is, while the opening operation of the main door 40 is being performed, the opening of the main door 40 may be obstructed by an external factor [S340]. In such as state, the main door 40 may not be rotated at a normal or preset rotating speed. Therefore, the main control part 2 checks the FG counter of the driving motor 73, and outputs the error code through the display unit 60 when the FG counter at each opening section is less than a preset number [S350]. And the main control part 2 determines that the opening of the main door 40 is obstructed, and performs the returning operation.

Therefore, an impact may be prevented from being exerted to the user by the rotation of the main door 40, and the door opening device 70 may also be prevented from being broken by excessive driving of the door opening device 70.

Meanwhile, when the push rod 77 is moved to a position at which the second hall sensor 742 is turned on, the stopping operation after opening is started.

FIG. 39 is a flowchart sequentially illustrating the stopping operation after opening of the door opening device.

As illustrated in the drawing, when the stopping operation after opening is started, the driving motor 73 is continuously maintained in the normal rotation state. At this point, the driving motor 73 is operated while maintaining a constant duty in a normal direction. At this point, the duty of the driving motor 73 is 12 at which the push rod 77 exerts a force toward the main door 40 to just support the main door 40, such that the main door 40 is not pushed and closed, and does not further open the main door 40 [S410].

The driving motor 73 is maintained in the normal rotation state for a preset time (e.g., 3 seconds), and when the preset time passes, the returning operation is performed [S240].

And the user may push the main door 40 to close the opened main door 40 before the preset time passes. Therefore, when an external force is applied to the main door 40, the returning operation is performed to protect the door opening device 70.

At this point, in determining whether the external force is applied to the main door 40, when the FG of the driving motor 73 is 3 or more, and it is determined that the driving motor 73 is reversely rotated about one revolution, an external force detection signal is input to the main control part 2. The main control part 2 starts the returning operation when the external force detection signal is input [S340].

FIG. 40 is a flowchart sequentially illustrating the returning operation of the door opening device. And FIG. 41 is a view illustrating a duty change during the returning operation according to the FG pulse count.

When the door returning operation is started, first, the driving motor 73 in the normal rotation state is stopped suddenly (e.g., for 10 msec) [S510]. After the driving motor 73 is stopped, the driving motor 73 is reversely rotated to return the push rod 77 [S520].

The refrigerator compartment door 20 including the main door 40 may have the French door structure. When the refrigerator compartment door 20 is closed, resistance is generated by an influence of a filler which seals between the main door 40 and the refrigerator compartment door 20 when the main door 40 is closed.

Therefore, to prevent the main door 40 from being not completely closed by the filler when the main door 40 is closed, the main door 40 is closed at a high speed. And also to prevent a shock and a noise generated when the main door 40 is closed, the rotating speed is reduced at the moment.

As illustrated in FIG. 41, in a state in which the opening of the main door 40 is completed, the FG of the driving motor is 340. The driving motor 73 is driven with a duty of 200 at a first closing section C1 in which the FG is 70. And the driving motor 73 is driven with a duty of 180 at a second closing section C2 in which the FG is 45. And driving motor 73 is driven with a duty of 140 at a third closing section C3 in which the FG is 25. And driving motor 73 is driven with a duty of 100 at a last fourth closing section C4 in which the FG is 0.

The push rod 77 is moved by reverse rotation of the driving motor 73, and the second hall sensor 742 is turned off, and the driving motor 73 is reversely rotated until the first hall sensor 741 is turned on. And when the first hall sensor 741 is turned on, and it is confirmed that the push rod 77 is returned to the initial position [S530], the driving motor 73 is stopped, and enters the standby operation state [S540].

Meanwhile, in the case in which the first hall sensor 741 is not in the ON state even when the driving motor 73 is reversely rotated for a preset time (e.g., 5 seconds) or more [S550], the door opening device 70 is abnormal, and thus the error signal is output. And the error code is displayed through the display unit 60, and it is returned to the standby operation [S560].

FIG. 42 is a flowchart sequentially illustrating the emergency returning operation of the door opening device. And FIG. 43 is a view illustrating a duty change according to the FG pulse count during the emergency returning operation.

The door opening device 70 may emergently return the push rod 77 to protect the door opening device 70.

During the opening operation, or the stopping operation after opening, or the returning operation, the user may further open the main door 40. The user may open the main door 40 under the necessity, and then may also close the main door 40 under the necessity. At this point, when the main door 40 is rotated at a high speed, the push rod 77 may collide with the main door 40 before the push rod 77 is returned to the initial position. When the push rod 77 and the main door 40 collide with each other at a high speed, the push rod 77 or the door opening device 70 may be damaged.

Therefore, when the reed switch 4011 is switched off during the opening operation, or the stopping operation after opening, or the returning operation, it is determined that the main door 40 is further opened by the user, and the emergency returning operation in which the push rod 77 is rapidly returned is performed.

As illustrated in the drawings, when the emergency returning operation is started, first it is determined whether the driving motor 73 is in the normal rotation state [S610]. When the driving motor 73 is in the normal rotation state, the driving motor 73 in the normal rotation state is stopped suddenly (e.g., for 10 msec) [S620]. After the driving motor 73 is stopped, the driving motor 73 is reversely rotated to return the push rod 77 [S630]. Meanwhile, when the driving motor 73 is not in the normal rotation state, the driving motor 73 is reversely rotated.

At the same time when the reverse rotation is started, the driving motor 73 is driven with a duty of 220 which is greater than that in the returning operation. The rotating speed of the driving motor 73 is maintained just before the main door 40 is closed, and thus the main door 40 is rapidly closed. At a section, in which the FG is 25, just before the main door 40 is closed, the duty of the driving motor 73 is reduced to 100, and thus the shock at a moment when the main door 40 is closed may be reduced.

The push rod 77 is moved by the reverse rotation of the driving motor 73, and the second hall sensor 742 is turned off, and the driving motor 73 is reversely rotated until the first hall sensor 741 is turned on [S640]. And when the first hall sensor 741 is turned on, and it is confirmed that the push rod 77 is returned to the initial position, the driving motor 73 is stopped, and enters the standby operation state [S650].

Meanwhile, in the case in which the first hall sensor 741 is not in the ON state even when the driving motor 73 is reversely rotated for a preset time (e.g., 5 seconds) or more [S660], the door opening device 70 is abnormal, and thus the error signal is output. And the error code is displayed through the display unit 60, and it is returned to the standby operation [S670].

In the control method of the refrigerator 1 according to the proposed implementation, the following effects may be expected.

In the refrigerator according to the implementation of the present disclosure, even when the user is holding the object in both hands, the door opening device is driven through detection of the sensing assembly provided at the door, and the door is automatically opened, and thus user convenience can be enhanced.

And the door opening device enables the door to be opened, such that at least a user's body, e.g., the elbow is put therein, and opens the door, and thus the user can put a part of his/her body in the open gap, and can easily further open the door. Therefore, since the user can completely open the door without use of both hands, the user convenience can be further enhanced.

In particular, when one pair of doors are disposed in parallel, a distance between the rear surface of the automatically opened door and the front surface of the closed door can be sufficiently provided, and thus the additional opening can be easily performed.

And the driving motor which provides power for the movement of the push rod is provided at the door opening device, and the driving motor can control the speed using the FG count, and thus the inserting and withdrawing speed of the push rod can be controlled. Therefore, opening and closing speed of the door can be controlled, and the rolling of the door is prevented when the door is opened and closed, and thus opening and closing performance of the door can be enhanced.

Also, in an abnormal state, returning or emergency returning of the push rod is allowed, and the shock or the damage of the door opening device upon the opening and closing of the door can be prevented, and thus safety can be enhanced.

And even when the automatic opening of the door is completed, the rotation of the driving motor is maintained at a constant speed in the direction in which the door is opened, and the door is prevented from being closed by its own weight, and a sufficient period of time for performing an additional operation is provided to the user, and thus the user convenience can be enhanced.

And when an abnormal state occurs while the door is being opened and closed, the error indication is output through the display unit so that the user easily recognizes the abnormal state. Also, the error state is coded and indicated through the display unit so as to enable the user to easily recognize the error state and to take appropriate follow-up measures, and thus the user convenience can be enhanced.

Meanwhile, the refrigerator according to the present disclosure may possible in various other implementations in addition to the above described implementations. Hereinafter, describing the other implementations of the present disclosure.

Other implementations of the present disclosure may have a different structure of a door opening device and various different arrangements of the first detection device and the second detection device. Among the configuration of other implementations of the present disclosure, using same reference number and omitting the detailed description about the configurations which is same with the described implementation.

FIG. 44 is a perspective view of a refrigerator according to a second implementation, FIG. 45 is a lateral view of the refrigerator shown in FIG. 44, and FIG. 46 is a block diagram of the refrigerator according to the second implementation.

With reference to FIGS. 44 to 46, a refrigerator 1, according to a second implementation may include a cabinet 10 provided with a storage space therein, and a door coupled to a front surface of the cabinet 10 in a rotatable or a slidable manner to selectively open and close the storage space.

In particular, the storage space may include one or more compartments of a refrigerator compartment 12 and a freezer compartment 13.

The refrigerator compartment 12 may be opened and closed by a refrigerator compartment door 20, and the freezer compartment 13 may be selectively opened and closed by a freezer compartment door 30.

Also, if a refrigerator compartment door 20 for opening and closing the refrigerator compartment 12 is a rotary-type door, the refrigerator compartment door 20 may be a pair of French-style doors 203 and 204 which are rotatably connected to a front left edge and a front right edge of the cabinet 10.

Further, at least one of the pair of French-style doors 203 and 204 may include a first door 201 contacting tightly to the front surface of the cabinet 10, and a second door 202 connected rotatably to the first door 201 at a front surface thereof.

If a freezer compartment door 30 for opening and closing the freezer compartment 13 is a rotary-type door, the freezer compartment door 30 may be a pair of French-style doors 301 and 302 which are rotatably connected to the front left edge and the front right edge of the cabinet 10.

Furthermore, if the freezer compartment door 30 is a drawer-type door for opening and closing the freezer compartment 13 in a sliding manner, a plurality of freezer compartment doors may be arranged in upward and downward directions or in left and right directions.

The refrigerator 1 may further include a second detection device 81 capable of detecting a person.

The refrigerator 1 may further include a sensing assembly 90 for projecting an optical pattern on a bottom surface at which the refrigerator 1 is placed w 91hen the second detection device 81 detects a person. The sensing assembly 90 may include a first detection device 92. Alternatively, the first detection device 92 may be provided as a unit separated from the sensing assembly 90.

The refrigerator 1 may further include a door opening device 70' for opening doors of the refrigerator, and a main control part 2 for controlling door opening device 70' and the sensing assembly 90.

Hereinafter, an example in which the door opening device 70' automatically opens the second door 202 of the doors of the refrigerator will be described, and door opening device 70' may be arranged at a door of the refrigerator to which an opening is required.

However, in the present disclosure, a position of the door opening device 70' is not limited to the door of the refrigerator, and thus it may be possible to arrange the door opening device 70' at the cabinet 10.

The second detection device 81 detects an approach of a person to the refrigerator 1, or a position of the person in front of the refrigerator 1.

At this point, it may be preferable that the second detection device 81 detect a person's intent to approach the refrigerator 1 for opening the door of the refrigerator 1, or to position in front of the refrigerator 1.

In general, a door of a refrigerator may be opened by adults and it may be preferable to prevent the door of the refrigerator from being opened unintentionally by children.

Therefore, in order to exactly detect an adult's intent to open the door of the refrigerator, the second detection device 81 should be positioned at a predetermined height H1 from the bottom surface at which the refrigerator 1 is placed.

The height H1 of the second detection device 81 may be equal to or greater than one-half of a height H2 of the refrigerator 1 (or the cabinet 10), but it is not limited thereto.

As an example, the second detection device 81 may be arranged at the refrigerator compartment door 20. FIG. 44 illustrates the second detection device 81 arranged at the second door 202, for example.

If the second detection device 81 is arranged at the second door 202, the second detection device 81 may detect a person of a predetermined height when approaching the refrigerator 1. Therefore, it may be possible to prevent the second detection device 81 from detecting children or animals in house.

The second detection device 81 may be a capacitive sensor or a non-capacitive sensor for detecting presence of a person.

The capacitive sensor may be an electrode or a set of electrodes which are arranged on a body frame of a vehicle in a suitable manner so as to generate an electromagnetic field forming a detection zone.

In particular, the electrode (or electrodes) may be mounted on an opening panel to be opened so as to generate a detection zone having a wider angle. Therefore, when a person is approaching the refrigerator 1, detection across a wider approach angle may be performed. In other words, there is no need for a person to substantially face the capacitive sensor (or sensors) so as to be detected by the sensor.

The detection may be performed when a part, for example, a hand, a head, or other part of a person is entering the detection zone to change electromagnetic field.

The non-capacitive sensor may be an optical sensor including a lamp related to an optical transistor and the like, and there is no limitation to kinds of the optical sensors.

The sensing assembly 90 may be positioned at a height equal to or lower than the height H1 of the second detection device 81, but it is not limited thereto.

As an example, the sensing assembly 90 may be arranged at the freezer compartment door 30. An inclined surface 35 may be provided at a lower side of the freezer compartment door 30. With the inclined surface 35, a space where a foot of a person is placed may be formed between the inclined surface 35 and the bottom surface. As another example, even though a lower surface of the freezer compartment door 30 is a flat surface in parallel with the bottom surface, or a distance between the lower surface of the freezer compartment door 30 and the bottom surface is greater than a thickness of a foot of a person, a space where the foot of the person is placed may be formed at a lower portion of the freezer compartment door 30.

The sensing assembly 90 may be provided on the inclined surface 35. Otherwise, when the sensing assembly 90 has been provided at the freezer compartment door 30, the optical pattern irradiated from the sensing assembly 90 may penetrate the inclined surface 35.

FIG. 47 is a cross-sectional view of the refrigerator compartment door according to the second implementation.

As described above in detail, with reference to FIG. 47, the refrigerator compartment door 20 may include the first door 201 and the second door 202.

The first door 201 may include an opening 2011 for loading and retrieving food and drink, and the second door 202 may open and close the opening 2011.

A housing 2012 forming a space for storing food and drink may be coupled to the first door 201. An inner space of the housing 2012 may be communicated with the refrigerator compartment 12.

One or more baskets 2013 for storing food and drink may be provided at the housing 2012.

The door opening device 70' may be positioned inside the second door 202. The door opening device 70' may include a case 72'.

The door opening device 70' may include a driving motor 73' accommodated in the frame 72', a push road 77' configured to be operated by receiving power of the driving motor 73', and a power transmission for transmitting the power of the driving motor 73' to the push road 77', but any configuration may be applicable to the door opening device 70' according to the present disclosure without limitation thereto.

The power transmission may include a worm gear 732' rotated by the driving motor 73', and one or more pinion gears 751', 752', and 753' connected to the worm gear 732' to transmit the power of the driving motor 73' to the push road 77'.

The push road 77' may include a rack gear 771' capable of being in engagement with the one or more pinion gears 751', 752' and 753'. Therefore, upon activation of the driving motor 73', the push road 77' may perform a rectilinear movement.

When performing a rectilinear movement toward the first door 201, the push road 77' contacts to and pushes at the first door 201 and thus the second door 202 is spaced apart from the first door 201 by a pushing force applied from the push rod 77' to the first door 201, such that the second door 202 may be automatically opened.

After completing the door opening, the push rod 77' may be returned to an original position by an operation of the driving motor 73'. If the driving motor 73' is a motor, for example, the motor may rotate in one direction so as to open the second door 202 and then may rotate in a reverse direction so as to return the push rod 77' to the original position thereof.

Hereinafter, an opening method of the door of the refrigerator will be described.

FIG. 48 is a flowchart illustrating the opening method of the door of the refrigerator according to the second implementation, FIG. 49 is a view illustrating a state in which a person holding food and drink in both hands is approaching the refrigerator 1, FIG. 50 is a view illustrating the foot of a person positioned at an upward portion of a virtual switch, and FIG. 51 is a view illustrating an opening state of the second door 202 according to the second implementation.

With reference to FIGS. 46 and 48 to 51, the opening method of the door of the refrigerator may include Step S1 in which the second detection device 81 detects a person, Step S2 in which the sensing assembly 90 projects the optical pattern on the bottom surface at which the refrigerator 1 is placed, Step S3 for determining whether or not the first detection device 92 detects a door opening signal before a reference time passes from a time when the second detection device 81 detects the person, and Step S4 in which the door opening device 70' opens the door of the refrigerator if the first detection device 92 detects the door opening signal.

Step S2 may be performed immediately when the second detection device 81 detects a person in Step S1, or may be performed when the second detection device 81 detects the person and then the detection time is accumulated during a predetermined time interval.

Also, Step S3 may be substituted with Step in which the first detection device 92 detects the door opening signal before the reference time passes from the time when the sensing assembly 90 projects the optical pattern.

In Step S3, the main control part 2 may determine whether or not the door opening signal is detected.

An optical pattern T projected from the sensing assembly 90 may be in an arbitrary shape including a wide circle, an arrow representing a foot movement direction, a cross shape, or the like.

The optical pattern T may have one shape or multiple shapes, for example, a set of circles or arrows. Otherwise, the optical pattern T may include a text message. The text message may include "Open Door", but it is not limited thereto.

The optical pattern T may have an arbitrary color, especially, a discriminative color including a green, a red, or a white color against the bottom surface, but it is not limited thereto. For example, the text message may read "Open," "Auto Door," or the like.

The sensing assembly 90 may include a laser and/or one or more diodes so as to generate light beams forming the optical pattern T.

The optical pattern T projected on the bottom surface may serve as the virtual switch. A person intending to automatically open the refrigerator door may place the foot at an upward portion of the virtual switch, or may move the foot in a predetermined manner at the upward portion thereof.

In order to prevent the virtual switch from being occluded by objects or animals besides a person, at least portions of the virtual switch may be arranged to be superposed with one or more doors of the refrigerator in upward and downward directions.

That is, at least a portion of the virtual switch may be positioned at the lower portion of the freezer compartment door 30. As shown in FIG. 49, at least a portion of the virtual switch is positioned at a lower portion of the inclined surface 35 such that the virtual switch may be occluded by placing the foot of a person between the inclined surface 35 and the bottom surface. As illustrated, the projected image may be positioned rearward of the front surface of the refrigerator. In some cases, a portion of the projected image may be positioned rearward of the front surface of the refrigerator.

In this case, it may possible to prevent the virtual switch from being occluded by the objects, the animals, or the like besides the foot of a person.

The door opening signal detected by the first detection device 92 may be implemented by a position of the foot of a person on the virtual switch, or a movement of the foot of the person at the upward portion of the virtual switch in a predetermined manner, for example.

The first detection device 92 may include one or more optical sensors configured to detect optical variation caused by an occlusion of the virtual switch.

The optical sensor may determine whether or not an object occluding the optical pattern T has a foot shape on the basis of a predetermined size and a predetermined geometric shape.

It may be preferable to sustain the occlusion of the virtual switch by the foot of a person during a predetermined reference time interval.

This is because of preventing the door of the refrigerator from being opened due to an occlusion of the virtual switch by objects, a foot of another person, or animals besides a person before a person intending to open the door of the refrigerator places the foot at the upward portion of the virtual switch.

Meanwhile, the predetermined manner may include a movement direction, a size, and/or a set of geographical shapes of the foot, and an occlusion time interval of the optical pattern T by the foot.

When the first detection device 92 detects a movement direction of the foot of a person, a guide means for guiding the movement direction of the foot of a person may be displayed on the virtual switch.

The guide means may be an arbitrary shape or a text message centering on the virtual switch so as to define a movement direction for the foot of a person. As an example, the guide means may be an arc centering on the virtual switch.

In order to open the door of the refrigerator, the second detection device 81 should be continuously detecting a person when the first detection device 92 detects the door opening signal. In other words, if the first detection device 92 detects the door opening signal while the second detection device 81 is continuously detecting a person, the door of the refrigerator may be opened.

This is because of preventing the door of the refrigerator from being opened due to an occlusion of the virtual switch by objects, a foot of another person, or animals besides a person in spite of not intending to open the door of the refrigerator when the person temporarily approaches the refrigerator 1 and immediately is away therefrom.

Therefore, in accordance with the present implementation, opening the door of the refrigerator may be prevented when a person not intending to open the door of the refrigerator approaches the refrigerator 1.

If the determination result in Step S3 is that the first detection device 92 does not detect the door opening signal until the reference time has passed from the time when the second detection device 81 detects a person, projection of the optical pattern T from the sensing assembly may be terminated (S5).

Otherwise, if the second detection device 81 detected a person and then does not detect the person before the reference time passes while the optical pattern T is being projected from the sensing assembly 90, the projection of the optical pattern T from the sensing assembly 90 may be terminated.

Illustratively, before the projection termination of the sensing assembly 90, a shape or a color of the optical pattern T may be changed or the virtual switch may flicker. This serves to call a person attention to placing the foot on the virtual switch.

FIG. 52 is a view illustrating a refrigerator according to a third implementation.

The present implementation is the same as the second implementation except a number of sensing assemblies and positions thereof. Therefore, only features of the present implementation will be described below.

With reference to FIG. 52, in the refrigerator 1 according to the present implementation, the second detection device 81 may be arranged at one of the two refrigerator compartment doors 203 and 204, and sensing assemblies 90a and 90b may be respectively arranged at the two freezer compartment doors 301 and 302.

That is, the first sensing assembly 90a may be arranged at the left freezer compartment door 301, and the second sensing assembly 90b may be arranged at the right freezer compartment door 302.

In some cases, the door opening device 70' may be arranged at each of the two refrigerator compartment doors 203 and 204.

When a person approaches the refrigerator 1 to be detected by the second detection device 81, the two sensing assemblies 90a and 90b may respectively project the optical pattern T.

Therefore, two virtual switches may be generated on the bottom surface, and a person may place the foot at the upward portion of one of the two virtual switches corresponding to one of the refrigerator compartment doors 203 and 204 to be opened.

And then, one of the refrigerator compartment doors 203 and 204 corresponding to the virtual switch at which the foot is being placed may be opened by the door opening device 70'.

In the present implementation, in order to allow a person to select one of the refrigerator compartment doors 203 and 204 to be opened using the second detection device 81, the first sensing assembly 90a arranged at the left freezer compartment door 301 may be positioned adjacent to the right freezer compartment door 302, and the second sensing assembly 90b arranged at the right freezer compartment door 302 may be positioned adjacent to the left freezer compartment door 301.

As an example, the first sensing assembly 90a may be positioned at a side adjacent to the right freezer compartment door 302 from the left freezer compartment door 301 on the basis of an imaginary line L1 bisecting the left freezer compartment door 301 in left and right directions.

Similarly, the second sensing assembly 90b may be positioned at a side adjacent to the left freezer compartment door 301 from the right freezer compartment door 302 on the basis of an imaginary line L2 bisecting the right freezer compartment door 302 in the left and right directions.

Therefore, a distance between the first sensing assembly 90a and the second sensing assembly 90b may be shorter than left and right lengths of the freezer compartment doors 301 and 302.

In general, the foot of a person may be placed at the upward portion of one of the two virtual switches, but the two refrigerator compartment doors 203 and 204 may be opened together when a left foot of the person is placed at the upward portion of one of the two virtual switches and a right foot of the person is placed at the upward portion of the other virtual switch.

Also, if the reference time described in FIG. 48 does not pass, the two refrigerator compartment doors 203 and 204 may be sequentially opened by placing one of the feet at the upward portion of one of the virtual switch and then the other foot at the upward portion of the other virtual switch.

Although opening the two refrigerator compartment doors 203 and 204 by the door opening device 70' is described in FIG. 52, opening the two freezer compartment doors 301 and 302 by the door opening device 70' may also be possible.

Otherwise described in FIG. 52, if a plurality of freezer compartment doors are arranged in upward and downward directions, multiple sensing assemblies may be provided at ones, which are arranged at a lower side, among the plurality of freezer compartment doors.

In this case, when the foot is placed at an upward portion of a virtual switch corresponding to one of the multiple sensing assemblies, a freezer compartment door or a refrigerator compartment door, which corresponds to the virtual switch at which the foot is placed, may be opened.

FIG. 53 is a view illustrating a refrigerator according to a fourth implementation.

The present implementation is the same as the second implementation except a number of sensing assemblies and positions thereof. Therefore, only features of the present disclosure will be described below.

With reference to FIG. 53, in the refrigerator 1 according to the present implementation, the second detection device 81 may be arranged at one of the two refrigerator compartment doors 203 and 204, and sensing assemblies 90c and 90d may be arranged at the two freezer compartment doors 301 and 302, respectively.

The third sensing assembly 90c may be arranged at the left freezer compartment door 301, and the fourth sensing assembly 90d may be arranged at the right freezer compartment door 302.

One or more units of the third sensing assembly 90c and the fourth sensing assembly 90d may project a plurality of optical patterns. In other words, two or more virtual switches may be generated by one sensing assembly.

A plurality of optical switches may be used to select a door to be opened. For example, when the foot is placed at an upward portion of a first virtual switch of two virtual switches generated by the fourth sensing assembly 90d, the right refrigerator compartment door 203 may be opened, whereas the right freezer compartment door 302 may be opened when the foot is placed at an upward portion of a second virtual switch of the two virtual switches.

Also, when the foot is placed at an upward portion of a first virtual switch of two virtual switches generated by the third sensing assembly 90c, the left refrigerator compartment door 204 may be opened, whereas the left freezer compartment door 301 may be opened when the foot is placed at an upward portion of a second virtual switch of the two virtual switches.

At this point, in order to allow a person to easily select a door to be opened after the person verifies the plurality of virtual switches, each of the virtual switches may include a text message. The text message may be "upper" and "lower", but it is not limited thereto.

According to the present implementation, there may be advantages capable of opening all doors and allowing a person to easily select a door to be opened.

Otherwise described in FIG. 53, a number of sensing assemblies the same as a number of doors to be automatically opened may be provided at the freezer compartment doors 301 and 302. As an example shown in FIG. 53, when the refrigerator 1 includes four doors, four sensing assemblies may be provided.

As another example, one sensing assembly projects one optical pattern, but a door to be opened may be selected depending on a pattern (an occlusion pattern of a virtual switch) of a foot movement.

For example, a refrigerator compartment door at an upper side may be selected by a pattern of a foot movement from right to left, and a freezer compartment door at a lower side may be selected by a pattern of a foot movement from left to right.

FIG. 54 is a view illustrating a refrigerator according to a fifth implementation.

The present implementation is the same as the second implementation except a type of a refrigerator. Therefore, only features of the present implementation will be described below.

With reference to FIG. 54, a refrigerator 1a according to the present implementation may be a side-by-side type refrigerator, for example. In other words, the freezer compartment door 30 and the refrigerator compartment door 20 may be arranged at the refrigerator 1a in left and right directions.

The second detection device 81 may be arranged at one of the refrigerator compartment door 20 and the freezer compartment door 30.

As described in the second implementation, the second detection device 81 may be arranged at a position equal to or greater than one-half of a height of the refrigerator 1a.

The first sensing assembly 90a may be arranged at the freezer compartment door 30 and the second sensing assembly 90b may be arranged at the refrigerator compartment door 20.

Therefore, when the second detection device 81 detects a person, the two sensing assemblies 90a and 90b may project optical patterns, respectively.

In the present implementation, each of the freezer compartment door 30 and the refrigerator compartment door 20 may be automatically opened.

Therefore, two virtual switches may be generated on the bottom surface, and thus a person may place the foot at an upward portion of one, which corresponds to a door to be opened, of the two virtual switches.

And then, the freezer compartment door 30 or the refrigerator compartment door 20, which corresponds to the virtual switch at which the foot is placed, may be automatically opened by the door opening device 70'.

Of course, it may be possible to open only one of the freezer compartment door 30 and the refrigerator compartment door 20. In this case, the second detection device 81 and the sensing assembly may be arranged at a door to be automatically opened.

FIG. 55 is a view illustrating a refrigerator according to a sixth implementation.

The present implementation is the same as the fifth implementation except a number of the second detection devices 81. Therefore, only features of the present implementation will be described below.

With reference to FIG. 55, in the refrigerator 1a according to the present implementation, the second detection device 81 may be arranged at each of the freezer compartment door 30 and the refrigerator compartment door 20.

And, the first sensing assembly 90a may be provided at the freezer compartment door 30, and the second sensing assembly 90b may be provided at the refrigerator compartment door 20.

Therefore, in order to open the freezer compartment door 30, a person may position in front of the freezer compartment door 30. In this case, the second detection device 81 provided at the freezer compartment door 30 may detect the person, and then the first sensing assembly 90a may project an optical pattern.

On the other hand, in order to open the refrigerator compartment door 20, a person may position in front of the refrigerator compartment door 20. In this case, the second detection device 81 provided at the refrigerator compartment door 20 may detect the person, and then the second sensing assembly 90b may project an optical pattern.

In order not to simultaneously detect a person by the second detection device 81 arranged at each of the refrigerator compartment door 20 and the freezer compartment door 30 a separation distance of the two second detection devices 81 should be secured by a predetermined distance. As an example, the separation distance may be set to a distance greater than a width of an ordinary person in left and right directions.

Alternatively, when one of the two second detection devices 81 detects a person and then the other sensor also detects a person, information detected by the other sensor may be disregarded.

FIG. 56 is a view illustrating a refrigerator according to a seventh implementation.

The present implementation is the same as the fifth implementation except a shape of a refrigerator compartment door. Therefore, only features of the present implementation will be described below.

With reference to FIG. 56, in a refrigerator 1b according to the present implementation, the refrigerator compartment door 20 may include a home bar door 205 (or an auxiliary door). Alternatively, the refrigerator compartment door 20 may include a first door and a second door serving as a home bar door.

The second detection device 81 may be arranged at the home bar door 205, but it is not limited thereto.

In the present implementation, the refrigerator compartment door 20, the freezer compartment door 30, and the home bar door 205 may be automatically opened.

The first sensing assembly 90a may be arranged at the freezer compartment door 30, and the third sensing assembly 90c may be arranged at the refrigerator compartment door 20.

The third sensing assembly 90c may project two optical patterns so as to allow a person to select one to be opened of the refrigerator compartment door 20 and the home bar door 205. Therefore, two virtual switches may be generated on the bottom surface.

In order to allow a person to verify the two virtual switches and to easily select a door to be opened, each of the two virtual switches may include a text message. The text message may be "Home Bar Door" and "Refrigerator compartment Door", but it is not limited thereto.

When the second detection device 81 detects a person, the first sensing assembly 90a may project an optical pattern and the third sensing assembly 90c may project two optical patterns.

That is, three virtual switches may be generated on the bottom surface, and thus a person may place the foot at an upward portion of one among the three virtual switches.

As an example, although a length of the home bar door 205 in upward and downward directions is shorter than that of the refrigerator compartment door 20 as shown in FIG. 56, the explanation described in FIG. 55 may be identically applicable when the length of the home bar door 205 is the same as that of the refrigerator compartment door 20.

In this case, however, the third sensing assembly 90c may be arranged at the home bar door 205.

Also, even though the freezer compartment door 30 includes the home bar door 205, the freezer compartment door 30 or the home bar door 205 may be automatically opened as described above.

FIG. 57 is a view illustrating a refrigerator according to an eighth implementation.

The present implementation is the same as the seventh implementation except a number of the second detection devices. Therefore, only features of the present implementation will be described below.

With reference to FIG. 57, in the refrigerator 1b according to the present implementation, the refrigerator compartment door 20 may include the home bar door 205 (or an auxiliary door). The second detection device 81 may be arranged at the home bar door 205, but it is not limited thereto. Also, the second detection device 81 may be arranged at the freezer compartment door 30.

The first sensing assembly 90a may be arranged at the freezer compartment door 30, and the second sensing assembly 90b may be arranged at the refrigerator compartment door 20.

The second sensing assembly 90b may project two optical patterns so as to allow a person to select one to be opened of the refrigerator compartment door 20 and the home bar door 205. Therefore, two virtual switches may be generated on the bottom surface.

Therefore, when opening the freezer compartment door 30, a person may position in front of the freezer compartment door 30. In this case, the second detection device 81 provided at the freezer compartment door 30 may detect the person and the first sensing assembly 90a may project an optical pattern.

On the other hand, when opening the refrigerator compartment door 20 or the home bar door 205, a person may position in front of the refrigerator compartment door 20. In this case, the second detection device 81 provided at the refrigerator compartment door 20 or the home bar door 205 may detect the person and the second sensing assembly 90b may project two optical patterns.

A person may place the foot at an upward portion of one of two virtual switches, and thus the home bar door 205 or the refrigerator compartment door 20 may be automatically opened.

FIG. 58 is a view illustrating a refrigerator according to a ninth implementation.

The present implementation is the same as the second implementation except a type of a refrigerator. Therefore, only features of the present implementation will be described below.

With reference to FIG. 58, a refrigerator 1c according to the present implementation may be a top mount type refrigerator, for example. That is, in the refrigerator 1c, the freezer compartment door 30 and the refrigerator compartment door 20 may be arranged in upward and downward directions, and the refrigerator compartment door 20 may be positioned at a downward portion of the freezer compartment door 30.

In the present implementation, each of the freezer compartment door 30 and the refrigerator compartment door 20 may be automatically opened, but they are not limited thereto.

The second detection device 81 may be arranged at the freezer compartment door 30, and a sensing assembly 90e may be provided at the refrigerator compartment door 20.

At this point, in order to allow a person to select one to be opened of the freezer compartment door 30 and the refrigerator compartment door 20, the sensing assembly 90e may project two optical patterns.

FIG. 59 is a view illustrating a refrigerator according to a tenth implementation.

The present implementation is the same as the ninth implementation except a type of a refrigerator. Therefore, only features of the present implementation will be described below.

With reference to FIG. 59, in the refrigerator 1c according to the present implementation, the second detection device 81 may be arranged at the freezer compartment door 30, and the first sensing assembly 90a and the second sensing assembly 90b may be arranged at the refrigerator compartment door 20.

Therefore, when the second detection device 81 detects a person, the first and second sensing assemblies 90a and 90b may respectively project an optical pattern.

Thus, two virtual switches may be generated on the bottom surface, and a person may place the foot at an upward portion of one, which corresponds to a door to be opened, of the two virtual switches.

Thereafter, the freezer compartment door 30 or the refrigerator compartment door 20 corresponding to the virtual switch at which the foot is placed may be automatically opened by the door opening device 70'.

Of course, it may be possible to open only one of the freezer compartment door 30 and the refrigerator compartment door 20. In this case, the second detection device 81 is arranged at the freezer compartment door 30, the first and second sensing assemblies 90a and 90b are arranged at the refrigerator compartment door 20, and the door opening device 70' may be arranged at the door to be opened or the cabinet.

In the aforementioned implementations, the examples of the refrigerators including a plurality of doors have been described, but one door may be automatically opened when the refrigerator includes the one door.

In this case, the second detection device, a door opening device, and a sensing assembly may be arranged at the one door. Alternatively, the door opening device may be arranged at a cabinet.

In some cases, the refrigerator disclosed herein may further include an alarm for notifying an automatic opening of a door when the door is being opened automatically.

In accordance with the proposed disclosure, there may be an advantage capable of opening a door to be opened without a manipulation of a person.

In particular, when a person cannot afford to freely use both hands, there may be an advantage capable of automatically opening a door of a refrigerator without a door opening action.

Also, when a refrigerator includes a plurality of doors, there may be advantage capable of easily selecting a door to be opened among the plurality of doors.

Although a few implementations of the present disclosure have been shown and described, it would be appreciated by those skilled in the art that changes may be made in these implementations without departing from the principles and spirit of the disclosure, the scope of which is defined in the claims and their equivalents.

INDUSTRIAL APPLICABILITY

According to embodiments, use convenience is improved, thereby achieving high industrial applicability.

The invention claimed is:

1. A refrigerator comprising:
a cabinet defining a storage compartment;
one or more doors connected to the cabinet and configured to open and close the storage compartment, at least one of the one or more doors being configured to be rotatably opened by an actuator;
a sensor assembly provided at the one or more doors, the sensor assembly comprising:
a first sensor provided at a surface of the one or more doors that crosses a front surface of the one or more doors and configured to detect a movement of a user after a second sensor detects a presence of the user within a predetermined distance, and
a projection unit is provided at the surface of the one or more doors that crosses the front surface of the one or more doors and configured to project an image at a ground surface in front of the refrigerator; and
the second sensor provided at a front side of the refrigerator and configured to detect the presence of the user within the predetermined distance,
wherein the at least one of the one or more doors is configured, based upon detection by the first sensor of the movement of the user, to be opened by the actuator.

2. The refrigerator according to claim 1, wherein at least a portion of the projected image falls within a detection range of the first sensor.

3. The refrigerator according to claim 1, wherein the first sensor is provided at a position that is vertically lower than the second sensor.

4. The refrigerator according to claim 1, wherein the actuator includes a driving motor that is positioned within the one or more doors.

5. The refrigerator according to claim 1, wherein the actuator is configured to open the one or more doors by providing a pushing force on the cabinet.

6. The refrigerator according to claim 1, wherein the storage compartment includes a top compartment and a bottom compartment,
wherein the one or more doors include a top compartment door configured to cover the top compartment and a bottom compartment door configured to cover the bottom compartment, and
wherein the actuator is configured to open the top compartment door.

7. The refrigerator according to claim 6, wherein the second sensor is provided at the top compartment door.

8. The refrigerator according to claim 1, wherein the surface of the one or more doors includes an inclined surface that extends rearward and downward from the front surface of the one or more doors, and the sensor assembly is provided at the inclined surface.

9. The refrigerator according to claim 6, wherein the surface of the one or more doors is disposed at the bottom compartment door.

10. The refrigerator according to claim 9, wherein the surface of the one or more doors is disposed at a lower end of the bottom compartment door.

11. The refrigerator according to claim 8, wherein the projection unit is positioned vertically lower than the first sensor on the inclined surface.

12. The refrigerator according to claim 1, wherein the first sensor is configured to determine whether a part of the user is present between the projected image and the first sensor.

13. The refrigerator according to claim 1, wherein one or both of the first and second sensors is a position sensing device that is configured to determine whether the user or a part of the user is present within a detection range of the position sensing device.

14. The refrigerator according to claim 13, wherein the first sensor includes a first position sensing device, the detection range of the first position sensing device being less than 15 cm.

15. The refrigerator according to claim 13, wherein the second sensor includes a second position sensing device, the detection range of the second position sensing device being between approximately 15 and 100 cm.

16. The refrigerator according to claim 1, wherein the at least one of the one or more doors is configured to rotatably open to a preset manual range upon rotation by a user and to rotatably open to a preset automatic range that is less than the preset manual range upon rotation by the actuator.

17. The refrigerator according to claim 16, wherein the preset automatic range is approximately 25°.

18. The refrigerator according to claim 16, wherein the preset manual range is approximately 180° or greater.

19. The refrigerator according to claim 1, wherein the projection unit is configured, based upon earlier of the opening of the at least one of the one or more doors by the actuator or elapsing of a preset time, to stop projecting the image on the ground surface.

20. The refrigerator according to claim 1, wherein at least a portion of the projected image extends rearward of the front surface of the the one or more doors.

21. A refrigerator comprising:
a cabinet defining a storage compartment;
one or more doors connected to the cabinet and configured to open and close the storage compartment, at least one of the one or more doors being configured to be rotatably opened by an actuator; and
a sensor assembly provided at a recessed portion of the refrigerator, the recessed portion extending rearward from a front surface of the refrigerator, the sensor assembly comprising:
a first sensor configured to detect a movement of a user when a second sensor detects a presence of the user within a predetermined distance, the first sensor comprising a light emitting part disposed at a first height with respect to a bottom of the refrigerator, and
a projection unit configured to project an image at a ground surface in front of the refrigerator, the projection unit comprising a light emitting part disposed at a second height different from the first height with respect to the bottom of the refrigerator, wherein the at least one of the one or more doors is configured to, based upon detection by the first sensor of the movement of the user, to be opened by the actuator.

* * * * *